US006996117B2

(12) United States Patent
Lee et al.

(10) Patent No.: US 6,996,117 B2
(45) Date of Patent: Feb. 7, 2006

(54) VERTICAL INSTRUCTION AND DATA PROCESSING IN A NETWORK PROCESSOR ARCHITECTURE

(75) Inventors: Barry Lee, Union City, CA (US); Golchiro Ono, San Jose, CA (US); Man Dieu Trinh, San Jose, CA (US); Ryszard Bleszynski, Saratoga, CA (US)

(73) Assignee: Bay Microsystems, Inc., San Jose, CA (US)

( * ) Notice: Subject to any disclaimer, the term of this patent is extended or adjusted under 35 U.S.C. 154(b) by 383 days.

(21) Appl. No.: 10/251,946

(22) Filed: Sep. 19, 2002

(65) Prior Publication Data

US 2003/0152076 A1    Aug. 14, 2003

Related U.S. Application Data

(60) Provisional application No. 60/382,437, filed on May 20, 2002, provisional application No. 60/372,507, filed on Apr. 14, 2002, provisional application No. 60/323,627, filed on Sep. 19, 2001.

(51) Int. Cl.
  *H04L 12/54* (2006.01)
(52) U.S. Cl. .................. 370/429; 370/412; 370/465
(58) Field of Classification Search ............. 370/389, 370/392, 412, 465, 466, 471, 472, 474, 401, 370/229, 230, 235, 470, 429; 712/1, 245, 712/228, 235; 709/230, 236
  See application file for complete search history.

(56) References Cited

U.S. PATENT DOCUMENTS

| | | | |
|---|---|---|---|
| 6,259,699 B1 | 7/2001 | Opalka et al. | |
| 6,421,730 B1 * | 7/2002 | Narad et al. | 709/236 |
| 6,477,166 B1 | 11/2002 | Sanzi et al. | |
| 6,553,000 B1 | 4/2003 | Ganesh et al. | |
| 6,570,875 B1 | 5/2003 | Hegde | |
| 6,668,317 B1 * | 12/2003 | Bernstein et al. | 712/245 |
| 6,721,271 B1 * | 4/2004 | Beshai et al. | 370/232 |
| 6,807,193 B1 * | 10/2004 | Beser | 370/498 |
| 2002/0163905 A1 * | 11/2002 | Brabrand | 370/347 |
| 2002/0181455 A1 * | 12/2002 | Norman et al. | 370/389 |

OTHER PUBLICATIONS

International Search Report mailed on Oct. 6, 2003, for PCT patent application number PCT/US03/11617 filed on Apr. 14, 2003, 8 pages.

* cited by examiner

Primary Examiner—Brian Nguyen

(57) ABSTRACT

An embodiment of this invention pertains to a network processor that processes incoming information element segments at very high data rates due, in part, to the fact that the processor is deterministic (i.e., the time to complete a process is known) and that it employs a pipelined "multiple instruction single date" ("MISD") architecture. This MISD architecture is triggered by the arrival of the incoming information element segment. Each process is provided dedicated registers thus eliminating context switches. The pipeline, the instructions fetched, and the incoming information element segment are very long in length. The network processor includes a MISD processor that performs policy control functions such as network traffic policing, buffer allocation and management, protocol modification, timer rollover recovery, an aging mechanism to discard idle flows, and segmentation and reassembly of incoming information elements.

66 Claims, 50 Drawing Sheets

Rollover Recovery Logic
374

Fig. 11
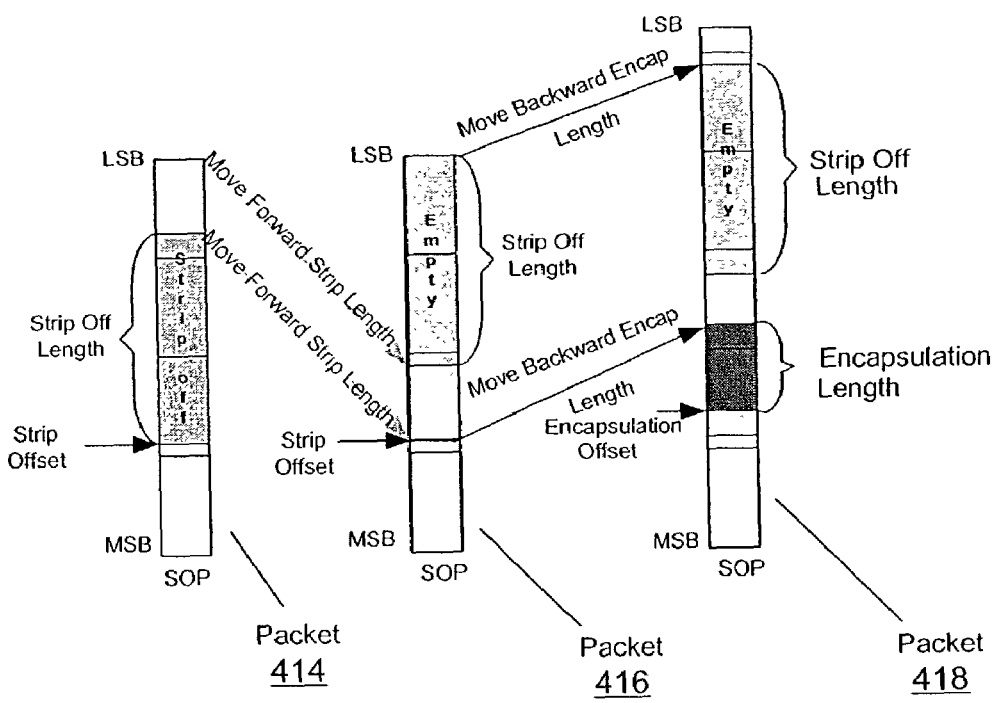
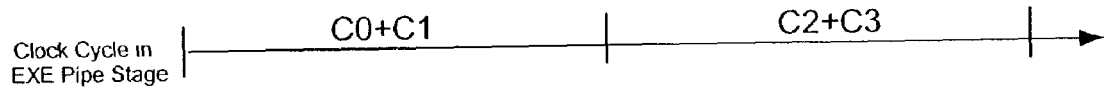

440

490

Fig. 25
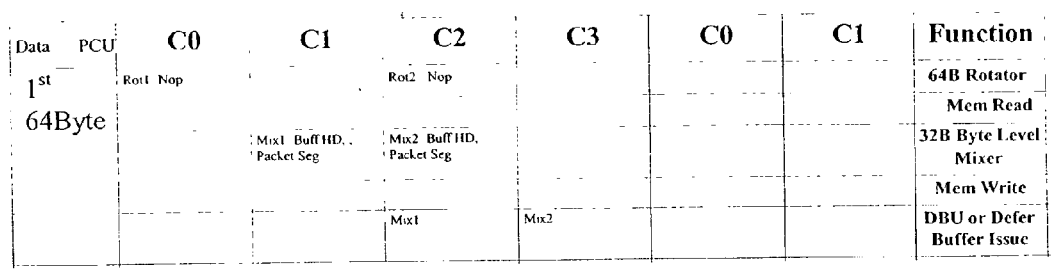
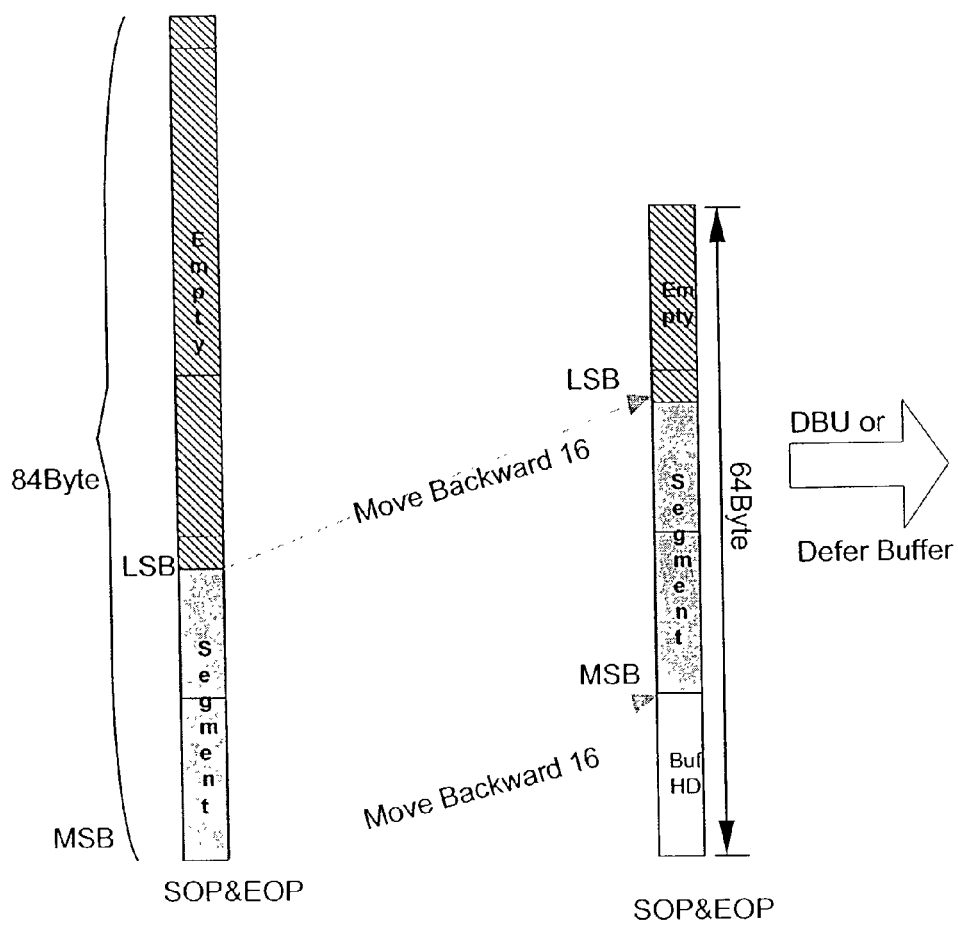

Fig. 26
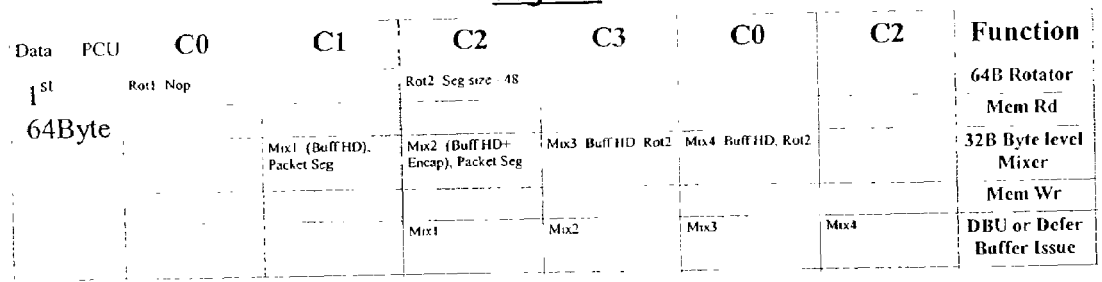
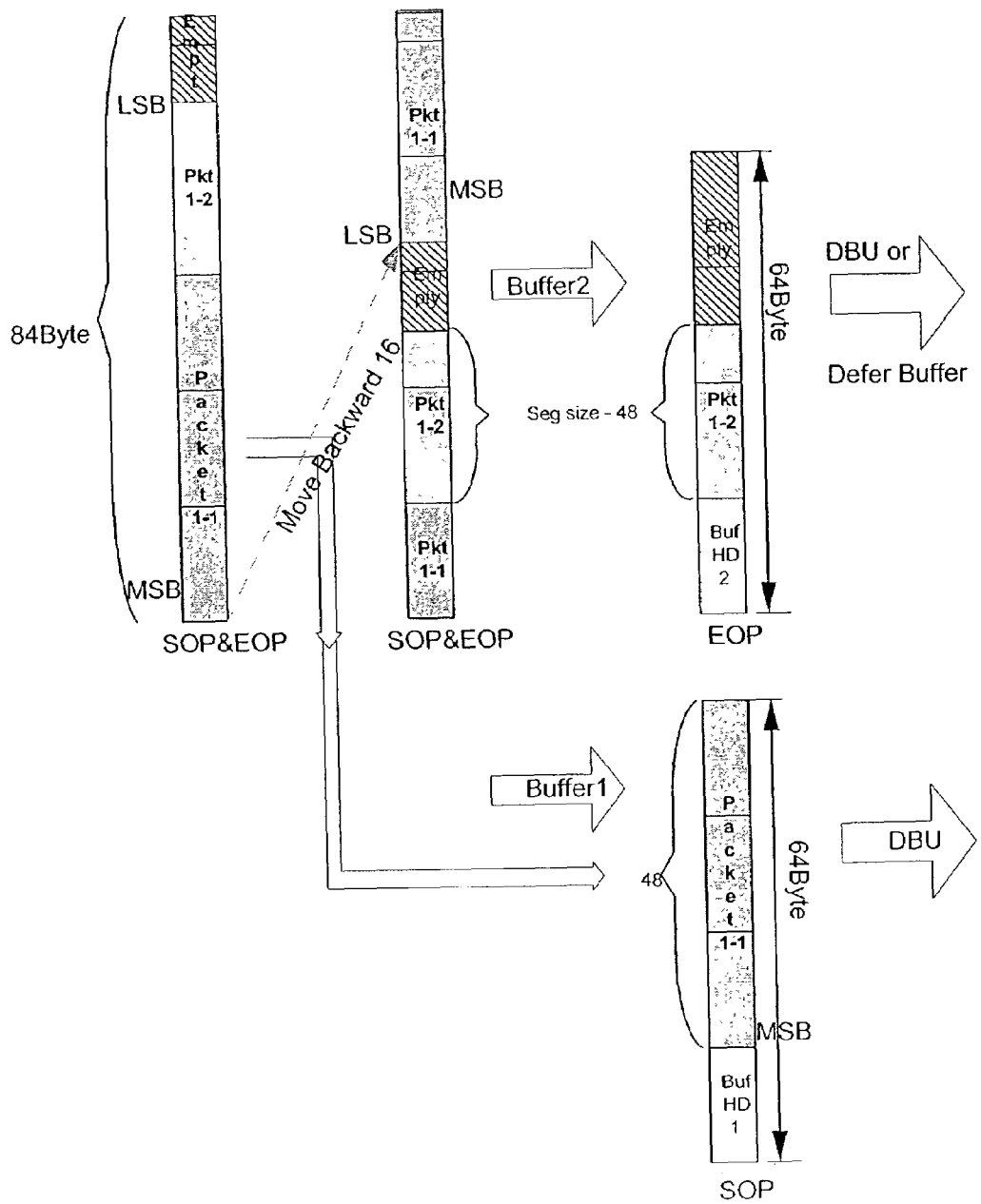

Fig. 27a

| Data | PCU | C0 | C1 | C2 | C3 | C0 | C1 | Fuention |
|---|---|---|---|---|---|---|---|---|
| 1st 84Byte | | Rot1 Nop | | Rot2 36 | | | | Rotator 545 |
| | | | | | | | | Mem Rd |
| | | | Mix1 Buff HD, Packet Seg | Mix2 Buff HD, Packet Seg | Mix3 Buff HD, Rot2 | Mix4 Buff HD, Rot2 | | Mixer 544 |
| | | | | | | Mix3 @ PortOff+0 | Mix4 @PortOff+32 | Mem Wr |
| | | | | Mix1 | Mix2 | | | DBU or Defer Buffer Issue |
| 1st 64Byte | | Rot1 SegSize - 32 | | Rot2 Nop | | | | Rotator 545 |
| | | Mem1 @PortOff+0 | Mem2 @PortOff+32 | | | | | Mem Rd |
| | | | Mix1 Mem1, Rot1 | Mix2 Mem2, Rot1 | | | | Mixer 544 |
| | | | | | | | | Mem Wr |
| | | | | Mix1 | Mix2 | | | DBU or Defer Buffer Issue |
| Bubble | | Rot1 16 | | Rot2 16 | | | | Rotator 545 |
| | | | | | | | | Mem Rd |
| | | | Mix1 Buff HD, Rot1 | Mix2 Buff HD, Rot1 | Mix3 Buff HD, Rot2 | Mix4 Buff HD, Rot2 | | Mixer 544 |
| | | | | | | Mix3 @PortOff+0 | Mix4 @PortOff+32 | Mem Wr |
| | | | | Mix1 | Mix2 | | | DBU or Defer Buffer Issue |
| 2nd 64Byte | | Rot1 SegSize - 72 | | Rot2 16 | | | | Rotator 545 |
| | | Mem1 @PortOff+0 | Mem2 @ProtOFF+32 | | | | | Mem Rd |
| | | | Mix1 Mem1, Rot1 | Mix2 Mem2, Rot1 | Mix3 Buff HD, Rot2 | Mix4 Buff HD, Rot2 | | Mixer 544 |
| | | | | | | Mix3 @PortOff+0 | Mix4 @PortOff+32 | Mem Wr |
| | | | | Mix1 | Mix2 | | | DBU or Defer Buffer Issue |
| 3rd 64Byte | | Rot1 SegSize - 56 | | Rot2 16 | | | | Rotator 545 |
| | | Mem1 @PortOff+0 | Mem2 @PortOff+32 | | | | | Mem Rd |
| | | | Mix1 Mem1, Rot1 | Mix2 Mem2, Rot1 | Mix3 Buff HD, Rot2 | Mix4 Buff HD, Rot2 | | Mixer 544 |
| | | | | | | Mix3 @PortOff+0 | Mix4 @PortOff+32 | Mem Wr |
| | | | | Mix1 | Mix2 | | | DBU or Defer Buffer Issue |

Fig. 28a

| Data PCU | C0 | C1 | C2 | C3 | C0 | C2 | Fucntion |
|---|---|---|---|---|---|---|---|
| 1st 84Byte | Rot1 Nop | | Rot2 36 | | | | Rotator 545 |
| | | | | | | | Mem Rd |
| | | Mix1 BuffHD, Packet Seg | Mix2 BuffHD, Packet Seg | Mix3 BuffHD, Rot2 | Mix4 BuffHD, Rot2 | | Mixer 544 |
| | | | | | Mix3 @PortOff+0 | Mix4 @PortOff+32 | Mem Wr |
| | | | Mix1 | Mix2 | | | DBU or Defer Buffer Issue |
| 1st 64Byte | Rot1 SegSize - 32 | | Rot2 16 | | | | Rotator 545 |
| | Mem1 @PortOff+0 | Mem2 @PortOff+32 | | | | | Mem Rd |
| | | Mix1 Mem1, Rot1 | Mix2 Mem2, Rot1 | Mix3 BuffHD, Rot2 | Mix4 BuffHD, Rot2 | | Mixer 544 |
| | | | | | Mix3 @PortOff+0 | Mix4 @PortOff+32 | Mem Wr |
| | | | Mix1 | Mix2 | | | DBU or Defer Buffer Issue |
| 2nd 64Byte | Rot1 SegSize - 16 | | Rot2 Nop | | | | Rotator 545 |
| | Mem1 @PortOff+0 | Mem2 @PortOff+32 | | | | | Mem Rd |
| | | Mix1 Mem1, Rot1 | Mix2 Mem2, Rot1 | | | | Mixer 544 |
| | | | | | | | Mem Wr |
| | | | Mix1 | Mix2 | | | DBU or Defer Buffer Issue |
| Bubble | Rot1 16 | | Rot2 16 | | | | Rotator 545 |
| | | | | | | | Mem Rd |
| | | Mix1 BuffHD, Rot1 | Mix2 BuffHD, Rot1 | Mix3 BuffHD, Rot2 | Mix4 BuffHD, Rot2 | | Mixer 544 |
| | | | | | Mix3 @PortOff+0 | Mix4 @PortOff+32 | Mem Wr |
| | | | Mix1 | Mix2 | | | DBU or Defer Buffer Issue |
| 3rd 64Byte | Rot1 SegSize - 64 | | Rot2 16 | | | | Rotator 545 |
| | Mem1 @PortOff+0 | Mem2 @PortOff+32 | | | | | Mem Rd |
| | | Mix1 Mem1, Rot1 | Mix2 Mem2, Rot1 | Mix3 BuffHD, Rot2 | Mix4 BuffHD, Rot2 | | Mixer 544 |
| | | | | | Mix3 @PortOff+0 | Mix4 @PortOff+32 | Mem Wr |
| | | | Mix1 | Mix2 | | | DBU or Defer Buffer Issue |

Fig. 29a

| Data PCU | C0 | C1 | C2 | C3 | C0 | C2 | Fucntion |
|---|---|---|---|---|---|---|---|
| 84Byte | Rot1 Nop | | Rot2 36 | | | | Rotator 545 |
| | | | | | | | Mem Rd |
| | | Mix1 Buff HD, Packet Segment | Mix2 Buff HD, Packet Segment | Mix3 Nop, Rot2 | Mix4 Nop, Rot2 | | Mixer 544 |
| | | | Mix1 @ PortOff+0 | Mix2 @ PortOff+32 | Mix3 @ PortOff+64 | Mix4 @PortOff+96 | Mem Wr |
| | | | | | | | DBU or Defer Buffer Issue |
| 1st 64Byte | Rot1 SegSize - 48 | | Rot2 16 | | | | Rotator 545 |
| | Mem1 @ PortOff+0 | Mem2 @PortOff+32 | Mem3 @PortOff+64 | Mem4 @PortOff+96 | | | Mem Rd |
| | | Mix1 Mem1, nop | Mix2 Mem2, nop | Mix3 Mem3, Rot1 | Mix4 Mem4, Rot1 | | Mixer 544 |
| | | | | | Rot2 @ PortOff+0 | Rot2 @PortOff+32 | Mem Wr |
| | | | Mix1 | Mix2 | Mix3 | Mix4 | DBU or Defer Buffer Issue |
| 2nd 64Byte | Rot1 SegSize - 32 | | Rot2 Nop | | | | Rotator 545 |
| | Mem1 @ PortOff+0 | Mem2 @ProtOff+32 | | | | | Mem Rd |
| | | Mix1 Mem1, Rot1 | Mix2 Mem2, Rot1 | Mix3 Nop, Rot1 | Mix4 Nop, Rot1 | | Mixer 544 |
| | | | Mix1 @PortOff+0 | Mix2 @PortOff+32 | Mix3 @PortOff+64 | Mix4 @PortOff+96 | Mem Wr |
| | | | | | | | DBU or Defer Buffer Issue |
| 3rd 64Byte | Rot1 SegSize + 32 | | Rot2 Nop | | | | Rotator 545 |
| | Mem1 @ PortOff+0 | Mem2 @PortOff+32 | Mem3 @PortOff+64 | Mem4 @PortOff+96 | | | Mem Rd |
| | | Mix1 Mem1, nop | Mix2 Mem2, nop | Mix3 Mem3, Rot1 | Mix4 Mem4, Rot1 | | Mixer 544 |
| | | | | | | | Mem Wr |
| | | | Mix1 | Mix2 | Mix3 | Mix4 | DBU or Defer Buffer Issue |
| Bubble | Rot1 16 | | | | | | Rotator 545 |
| | | | | | | | Mem Rd |
| | | Mix1 Buff HD, Rot1 | Mix2 Buff HD, Rot1 | Mix3 Nop, Rot1 | Mix4 Nop, Rot1 | | Mixer 544 |
| | | | Mix1 @PortOff+0 | Mix2 @PortOff+32 | Mix3 @PortOff+64 | Mix4 @PortOff+96 | Mem Wr |
| | | | | | | | DBU or Defer Buffer Issue |

Fig. 29b

| Data PCU | C0 | C1 | C2 | C3 | C0 | C2 | Function |
|---|---|---|---|---|---|---|---|
| 4th 64Byte | Rot1 SegSize - 80 | | Rot2 16 | | | | Rotator 545 |
| | Mem1 @PortOff+0 | Mem2 @PortOff+32 | Mem3 @PortOff+64 | Mem4 @PortOff+96 | | | Mem Rd |
| | | Mix1 Mem1, Nop | Mix2 Mem2, Nop | Mix3 Mem3, Rot1 | Mix4 Mem4, Rot1 | | Mixer 544 |
| | | | | | Rot2 @PortOff+0 | Rot2 @PortOff+32 | Mem Wr |
| | | | Mix1 | Mix2 | Mix3 | Mix4 | DBU or Defer Buffer Issue |
| 5th 64Byte | Rot1 SegSize - 64 | | Rot2 Nop | | | | Rotator 545 |
| | Mem1 @PortOff+0 | Mem2 @PortOff+32 | | | | | Mem Rd |
| | | Mix1 Mem1, Rot1 | Mix2 Mem2, Rot1 | Mix3 Nop, Rot1 | Mix4 Nop, Rot1 | | Mixer 544 |
| | | | Mix1 @PortOff+0 | Mix2 @PortOff+32 | Mix3 @PortOff+64 | Mix4 @PortOff+96 | Mem Wr |
| | | | | | | | DBU or Defer Buffer Issue |
| 6th 64Byte | Rot1 SegSize - 64 | | Rot2 16 | | | | Rotator 545 |
| | Mem1 @PortOff+0 | Mem2 @PortOff+32 | Mem3 @PortOff+64 | Mem4 @PortOff+96 | | | Mem Rd |
| | | Mix1 Mem1, Nop | Mix2 Mem2, Nop | Mix3 Mem3, Rot1 | Mix4 Mem4, Rot1 | | Mixer 544 |
| | | | | | Rot2 @PortOff+0 | Rot2 @PortOff+32 | Mem Wr |
| | | | Mix1 | Mix2 | Mix3 | Mix4 | DBU or Defer Buffer Issue |
| 7th 64Byte | Rot1 SegSize - 48 | | Rot2 Nop | | | | Rotator 545 |
| | Mem1 @PortOff+0 | Mem2 @PortOff+32 | | | | | Mem Rd |
| | | Mix1 Mem1, Rot1 | Mix2 Mem2, Rot1 | Mix3 Nop, Rot1 | Mix4 Nop, Rot1 | | Mixer 544 |
| | | | Mix1 @PortOff+0 | Mix2 @PortOff+32 | Mix3 @PortOff+64 | Mix4 @PortOff+96 | Mem Wr |
| | | | | | | | DBU or Defer Buffer Issue |

Fig. 30a

| Data PCU | C0 | C1 | C2 | C3 | C0 | C1 | Fuention |
|---|---|---|---|---|---|---|---|
| 84Byte | Rot1 Nop | | Rot2 36 | | | | Rotator 545 |
| | | | | | | | Mem Rd |
| | | Mix1 BuffHD, Packet Segment | Mix2 BuffHD, Packet Segment | Mix3 Nop, Rot2 | Mix4 Nop, Rot2 | | Mixer 544 |
| | | | Mix1 @ PortOff+0 | Mix2 @ PortOff+32 | Mix3 @ PortOff+64 | Mix4 @PortOff+96 | Mem Wr |
| | | | | | | | DBU or Defer Buffer Issue |
| 1st 64Byte | Rot1 SegSize -48 | | Rot2 16 | | | | Rotator 545 |
| | Mem1 @ PortOff+0 | Mem2 @PortOff+32 | Mem3 @PortOff+64 | Mem4 @PortOff+96 | | | Mem Rd |
| | | Mix1 Mem1, nop | Mix2 Mem2, nop | Mix3 Mem3, Rot1 | Mix4 Mem4, Rot1 | | Mixer 544 |
| | | | | | Rot2 @ PortOff+0 | Rot2 @PortOff+32 | Mem Wr |
| | | | Mix1 | Mix2 | Mix3 | Mix4 | DBU or Defer Buffer Issue |
| 2nd 64Byte | Rot1 SegSize - 32 | | Rot2 Nop | | | | Rotator 545 |
| | Mem1 @ PortOff+0 | Mem2 @ProtOFF+32 | | | | | Mem Rd |
| | | Mix1 Mem1, Rot1 | Mix2 Mem2, Rot1 | Mix3 Nop, Rot1 | Mix4 Nop, Rot1 | | Mixer 544 |
| | | | Mix1 @PortOff+0 | Mix2 @PortOff+32 | Mix3 @PortOff+64 | Mix4 @PortOff+96 | Mem Wr |
| | | | | | | | DBU or Defer Buffer Issue |
| 3rd 64Byte | Rot1 SegSize - 32 | | Rot2 16, BuffHD | | | | Rotator 545 |
| | Mem1 @ PortOff+0 | Mem2 @PortOff+32 | Mem3 @PortOff+64 | Mem4 @PortOff+96 | | | Mem Rd |
| | | Mix1 Mem1, nop | Mix2 Mem2, nop | Mix3 Mem3, Rot1 | Mix4 Mem4, Rot1 | | Mixer 544 |
| | | | | | Rot2 @ PortOff+0 | Rot2 @ PortOff+32 | Mem Wr |
| | | | Mix1 | Mix2 | Mix3 | Mix4 | DBU or Defer Buffer Issue |

Fig. 30b

| Data | PCU | C0 | C1 | C2 | C3 | C0 | C2 | Function |
|---|---|---|---|---|---|---|---|---|
| 4th 64Byte | | Rot1 SegSize - 16 | | Rot2 nop | | | | Rotator 545 |
| | | Mem1 @PortOff+0 | Mem2 @PortOff+32 | | | | | Mem Rd |
| | | | Mix1 Mem1, Rot1 | Mix2 Mem2, Rot1 | Mix3 Nop, Rot1 | Mix4 Nop, Rot1 | | Mixer 544 |
| | | | | Mix1 @PortOff+0 | Mix2 @PortOff+32 | Mix3 @PortOff+64 | Mix4 @PortOff+96 | Mem Wr |
| | | | | | | | | DBU or Defer Buffer Issue |
| 5th 64Byte | | Rot1 SegSize - 16 | | Rot2 Nop | | | | Rotator 545 |
| | | Mem1 @PortOff+0 | Mem2 @PortOff+32 | Mem3 @PortOff+64 | Mem4 @PortOff+96 | | | Mem Rd |
| | | | Mix1 Mem1, Nop | Mix2 Mem2, Nop | Mix3 Mem3, Rot1 | Mix4 Mem4, Rot1 | | Mixer 544 |
| | | | | | | | | Mem Wr |
| | | | | Mix1 | Mix2 | Mix3 | Mix4 | DBU or Defer Buffer Issue |
| Bubble | | Rot1 16 | | | | | | Rotator 545 |
| | | | | | | | | Mem Rd |
| | | | Mix1 BuffHD, Rot1 | Mix2 BuffHD, Rot1 | Mix3 Nop, Rot1 | Mix4 Nop, Rot1 | | Mixer 544 |
| | | | | Mix1 @PortOff+0 | Mix2 @PortOff+32 | Mix3 @PortOff+64 | Mix4 @PortOff+96 | Mem Wr |
| | | | | | | | | DBU or Defer Buffer Issue |
| 6th 64Byte | | Rot1 SegSize - 64 | | Rot2 16, BuffHD | | | | Rotator 545 |
| | | Mem1 @PortOff+0 | Mem2 @PortOff+32 | Mem3 @PortOff+64 | Mem4 @PortOff+96 | | | Mem Rd |
| | | | Mix1 Mem1, Nop | Mix2 Mem2, Nop | Mix3 Mem3, Rot1 | Mix4 Mem4, Rot1 | | Mixer 544 |
| | | | | | | Rot2 @PortOff+0 | Rot2 @PortOff+32 | Mem Wr |
| | | | | Mix1 | Mix2 | Mix3 | Mix4 | DBU or Defer Buffer Issue |
| 7th 64Byte | | Rot1 SegSize - 48 | | Rot2 Nop | | | | Rotator 545 |
| | | Mem1 @PortOff+0 | Mem2 @PortOff+32 | | | | | Mem Rd |
| | | | Mix1 Mem1, Rot1 | Mix2 Mem2, Rot1 | Mix3 Nop, Rot1 | Mix4 Nop, Rot1 | | Mixer 544 |
| | | | | Mix1 @PortOff+0 | Mix2 @PortOff+32 | Mix3 @PortOff+64 | Mix4 @PortOff+96 | Mem Wr |
| | | | | | | | | DBU or Defer Buffer Issue |

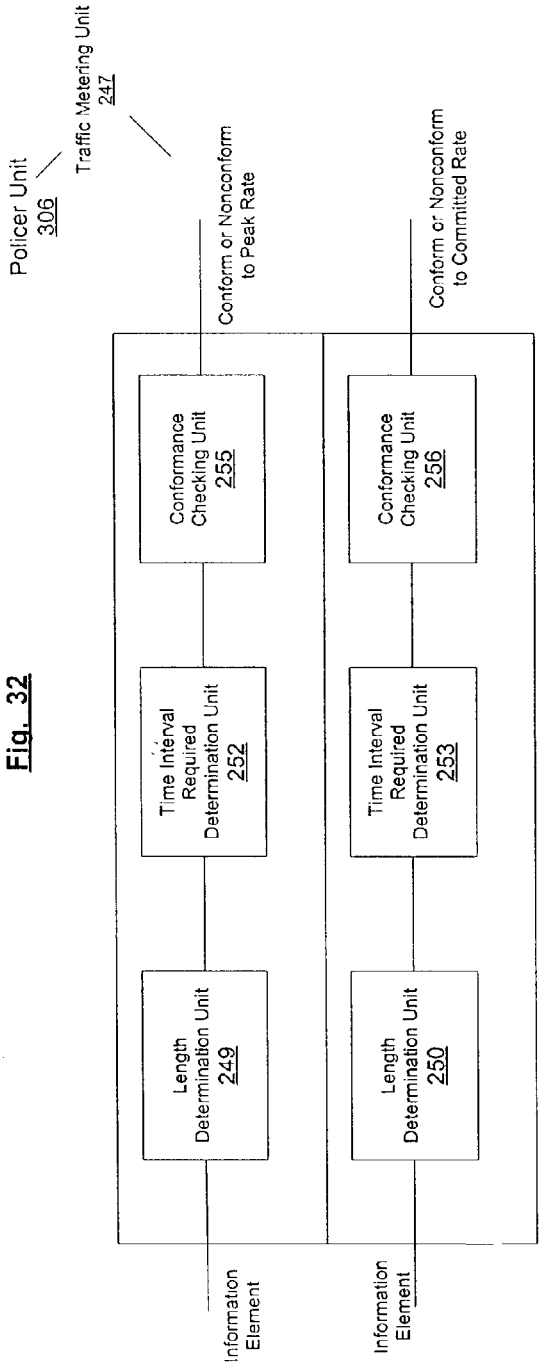
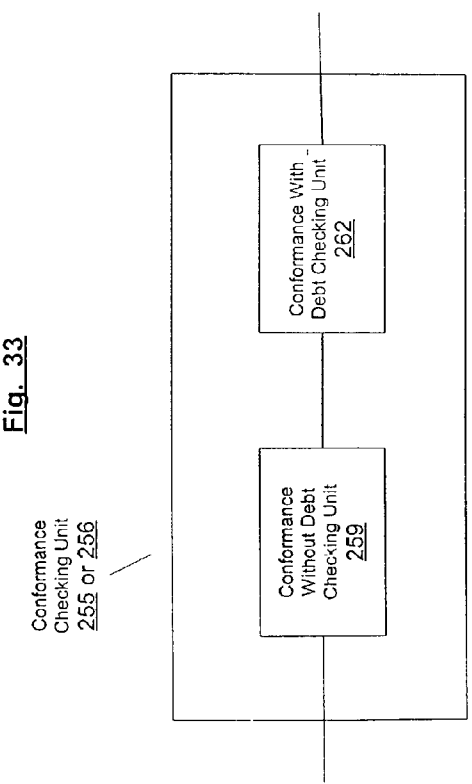

VERTICAL INSTRUCTION AND DATA PROCESSING IN A NETWORK PROCESSOR ARCHITECTURE

CROSS-REFERENCE TO RELATED APPLICATIONS

This application claims the benefits of U.S. Provisional Application Ser. Nos. 60/323,627, 60/372,507, and 60/382,437, filed Sep. 19, 2001, Apr. 14, 2002, and May 20, 2002, respectively, and entitled "System And Method For Vertical Instruction And Data Processing In A Network Processor Architecture," "Differentiated Services For A Network Processor," and "Vertical Instruction And Data Processing In A Network Processor Architecture," respectively, all of which are incorporated herein by reference.

BACKGROUND OF THE INVENTION

Among the single biggest limiting factors for a network processor to scale and meet the internet bandwidth demand is Moore's law. Moore's law limits the advancement in semiconductor process technology to 18 months in order to achieve a 100% performance improvement. FIG. 1 shows Moore's law versus the internet bandwidth demand curve.

As shown in FIG. 1, doubling every 18 months is far below the internet bandwidth demand which doubles every four to six months. Current generation of network processors cannot scale by 4 times or 16 times within a two to three years window to meet the demand in internet bandwidth. The lifetime of today's network processors is short due to the dependency upon Moore's law. Breaking the Moore's law barrier is a non-trivial process.

The current techniques in network processor architectures are bounded by Moore's law. In general there are three approaches to the network processor architecture: (1) using multiple reduced instruction set computing ("RISC") processors, (2) using configurable hardware, and (3) using a mix of RISC and configurable hardware.

With regards to the first approach of using multiple RISC processors, the RISC processor architecture focuses on rapid and efficient processing of a relatively small set of simple instructions that includes most of the instructions a processor decodes and executes. The RISC processor architecture and instruction set are optimized for human-to-machine interaction. They are, however, not optimized for the high-bandwidth machine-to-machine interaction occurring in network equipment. Using multiple RISC processors within the network equipment will not deliver the desired processing power to meet the internet bandwidth demand. In this approach, another severe limiting factor is the complexity of the software compiler, scheduler, and kernel to efficiently control the processor's operation. Creating a new customized network processor operating system ("NPOS") is not the solution to the explosive demand in bandwidth, especially when Moore's law (hardware) cannot even meet this demand. Use of the NPOS requires significant software resources to architect, create, implement, test, support and maintain it. Use of the NPOS results in significant performance degradation coupled with a non-deterministic architecture.

Use of configurable hardware results in the highest performance processor. In addition, the simple software interface usually used in configurable hardware minimizes performance degradation. Eliminating any software within the information path and replacing them with configurable gates and transistors significantly boosts the performance of the network processor. This approach, without any creativity within the architecture, is still bound by Moore's law.

Using a mix of RISC processors and configurable hardware has two different variations. The first variation uses the RISC processor in a portion of the data path and the other variation uses the RISC processor in the control path only.

Given the ever increasing bandwidth demand, RISC processors should be removed from the data path because they are not designed to optimally process the high-bandwidth data traffic coming from network equipment. Currently, RISC processors are being used as graphics processors and digital signal processors ("DSPs") and have been tailored to meet the demands of these applications. Unfortunately, the general nature of network traffic processing is completely different than graphics processing or digital signal processing and the RISC processor architecture, which is based on techniques created decades ago, becomes a big burden for network traffic processing. For example, in a DSP, the execution unit is processing at a rate that is orders of magnitude faster than the data it is executing (i.e., the execution unit can easily process the incoming data). In other words, the data is relatively static in comparison to the execution unit. This is the case in both graphics and digital signal processing. In contrast, the information, data, voice and video entering at the ingress of a network processor is traveling at a very high speed and the growth rate of the line rate is in correlation with the bandwidth demand curve.

In addition, the RISC processor operands are typically either 32 or 64-bits, but these sizes are not suitable for network traffic processing where the information (operand) is much larger than 64-bits. In the prior art RISC processor architecture, the execution unit not only operates on short and fixed operands but also performs very simple and primitive functions such as load and store.

The typical RISC instruction set is designed to process algorithms. Many critical networking functions cannot efficiently utilize the arithmetic logic unit found in RISC processors. As a result, in addition to the low performance provided when performing networking functions, these arithmetic logic units waste silicon space. Moreover, the RISC instruction set is optimized for register-to-register operations. Performance of memory and input and output ("I/O") operations are magnitude of orders behind the performance of register-to-register operations. When processing network traffic, the performance of memory and I/O operations are as important or more important than register-to-register operations.

When RISC processors are used in networking applications, they do not take advantage of the memory hierarchy of the RISC processor (e.g., in a RISC processor, the memory hierarchy may include a cache memory, main memory, etc.) that is optimized for memory locality. In networking applications, the traffic flows through the RISC processor without any locality. Placing a RISC processor in the data path causes only a small number of registers within the processor to be used by the traffic in the data path. In this case, the memory performance is almost as bad as the I/O performance.

Minimizing or eliminating context switching is important when processing dynamic traffic patterns of multiple streams and multiple services. Context switching is the act of turning the processor's resources from one task to another. An additional problem of using RISC processors in the data path is the context-switching penalty. When multiple processes share the same processor, the small register set and window of the processor causes frequent context switching. The frequent context switching takes away useable bandwidth from the processor. In networking functions, thousands of unpredictable traffic streams enter the processor and utilize different services and thus different processing units are invoked which, when using the RISC processor, results in a large number of context switches.

In addition to taking up otherwise useful processing bandwidth, context switching introduces a non-deterministic nature when processing networking functions. The non-deterministic nature includes, for example, not being able to predict or know when a packet will be output from the egress point. It is desirable that the processing of real time networking functions be deterministic.

FIG. 2 shows the processing and context switching occurring in a prior art RISC processor 200 performing networking functions. Here, an information element 204 (the information element is described below) belonging to a first flow is processed by a process 205. The process 205 executes primitive instruction set 202 such as "load", "store", "add", and "sub" instructions to accomplish complex networking functions such as policing, encapsulation, forwarding, and switching. An information element 208 belonging to a second flow is processed by process 207. Similar to the process 205, the process 207 also executes a primitive instruction set 210 such as "load", "store", "add", and "sub" instructions.

Processes 205 and 207 use a common set of registers 211 to store information specific to that process. When the prior art processor changes from servicing process 205 to servicing process 207, a context switch occurs in which the information pertaining to process 205 is removed from the registers 211 and stored in a stack and the information pertaining to process 207 is moved into the registers 211. The context switch 213 results in a register swap 214. The register swap 214 is the act of replacing, in the registers 211, the data of the old process with the data of the new process (i.e., the data in the registers for the old process is saved and the data for the new process is loaded into the registers). Because an indeterminate number of context switches occur before either the process 205 or the process 207 completes, these processes are non-deterministic as their time for completion is unknown. In addition to this non-deterministic nature, the context switching of processes that is inherent within the prior art RISC processor adds a substantial number of non-productive clock cycles (i.e., clock cycles are wasted storing the register data of the old process and loading the data of the new process into the registers).

As the number of flows supported increases, the number of different processes that the RISC processor supports also increases (each flow usually executes a different process since each flow uses a different service) resulting in the RISC processor performing more context switches. The flow is a connection of two end nodes in a connectionless protocol. The end node can be two computers or the software running in the computers. As more context switches occur, the performance of the RISC processor degrades due in part to the overhead involved with increased context switching. This overhead includes the time used for scheduling and the time used to perform the register swaps.

Currently, some network processor implementations employ the multiple RISC processor approach. In this approach, it is not clear whether there is an actual increase in performance due to the parallel processing. The multiple RISC processors do not increase the performance in a linear fashion due to a decrease in efficiency incurred with the bookkeeping and coordination resulting from the multiple processor implementation. The multiple processor approach may serve aggregated traffic through intelligently distributing threads of traffic to different processors. The balancing of each processor's load itself is an expensive task for the processor to perform. The process of balancing the load uses otherwise productive bandwidth and will not provide enough horsepower for a single heavy traffic stream. The parallelism in such traffic may not exist.

The increasing volume and evolving types of Internet applications have been demanding enhanced services, both in terms of performance and quality of services ("QoS"), from the Internet infrastructure. Best-effort service is the currently used service on the Internet. In best-effort service, everybody gets the service the network is able to provide. The best-effort service is not suitable for fast growing applications such as, continuous media, e-commerce, and several other business services. To provide better services to these important and expanding classes of applications, the Internet infrastructure should provide service differentiation.

The present invention pertains to a processor that overcomes the problems described earlier for processing network traffic. In addition, the processor provides deterministic behavior in processing real time network traffic.

SUMMARY OF THE INVENTION

According to an embodiment of the present invention, a method is described to process an incoming information element segment belonging to a flow. This method includes receiving the incoming information element segment and processing the received information element segment according to an instruction corresponding to the flow to which the information element segment belongs.

According to an embodiment of the present invention, a data pipelined processor is described to process an incoming information element segment belonging to a flow. This processor includes a device to receive the incoming information element segment and an execution ("EXE") stage to execute a number of instructions to perform a function on the incoming information element segment. In one embodiment, the function is a complex function.

A method for updating a count of rollovers of a timer for a flow in order to accurately time stamp an incoming information element belonging to the flow according to an embodiment of the present invention is also described. This method includes determining if the incoming information element conforms to a burst tolerance, resetting a count of timer rollovers to zero if the information element conforms to the burst tolerance, and incrementing by one the count of timer rollovers upon an occurrence of the timer rollover if the count of timer rollovers is less than $(2^{number\ of\ bits\ that\ represent\ the\ number\ of\ timer\ rollovers} - 1)$.

A system for updating a count of rollovers of a timer for a flow in order to accurately time stamp an incoming information element belonging to the flow according to an embodiment of the present invention is described. The system includes the timer for the flow and a time stamp rollover recovery state table that includes one or more entries and one of the entries includes a rollover count of the timer. The system also includes a policing unit to determine if the incoming information element conforms to a burst tolerance, and if the incoming information element conforms to the burst tolerance, to reset the rollover count to zero. A mixer is also included to modify the rollover count of the timer stored within the appropriate entry of the time stamp rollover recovery state table if the rollover count is reset to zero by the policing unit. The system includes a time stamp rollover recovery circuit that increments by one the rollover count within the appropriate entry if the timer for the flow rolls over and if the rollover count is less than ($2^{\text{number of bits used to implement the rollover count}} - 1$), and after incrementing, writes the appropriate entry that includes the rollover count for the flow to the time stamp rollover recovery state table.

According to an embodiment of the present invention, a method to convert a first protocol of an incoming information element having a first length to a second protocol is described. The method includes stripping-off a first number of bytes specified by a policy control instruction ("PCI") from the incoming information element starting at a first offset specified by the PCI to remove the first protocol of the information element and to produce a stripped-off information element. The method also comprises inserting an encapsulated data that includes the second protocol to the stripped-off information element starting at a second offset specified by the PCI to produce an encapsulated information element.

According to an embodiment of the present invention, a system for converting a first protocol of an incoming information element having a first length to a second protocol is also described. The system includes a first rotator to rotate forward the incoming information element by a first number of bytes specified by a PCI to produce a rotated information element. The system also includes a first mixer to combine the rotated information element with the incoming information element to strip-off the first protocol from the incoming information element by removing the first number of bytes starting at a first offset to produce a stripped-off information element. In addition, a second rotator is used to rotate backward the stripped-off information element by a second number of bytes specified by the PCI to produce a rotated information element. A second mixer is also included to combine the incoming information element, the rotated information element, and an encapsulated data in order to insert the encapsulated data in the stripped-off information element starting at a second offset specified by the PCI to produce an encapsulated information element.

According to an embodiment of the present invention, a method for maintaining activity-levels of multiple flows is described. The method includes, upon receiving an information element belonging to a first one of the multiple flows, setting a first one of the bits in a recently-used bitmap that corresponds to the first one of the multiple flows to indicate activity for that flow and, upon an external processor polling the activity-level of a second one of the multiple flows, resetting a second one of the bits corresponding to the second one of the multiple flows to indicate no activity for that flow.

According to an embodiment of the present invention, another method for maintaining activity-levels of multiple flows is described. The method includes, for each of the bits in a recently-used bitmap, determining if a particular one of the bits indicate that a corresponding one of the multiple flows is active, and if the particular one of the bits indicate that the corresponding one of the flows is active, then incrementing by one a particular one of multiple entries in an age table corresponding to the appropriate one of the multiple flows.

According to an embodiment of the present invention, a method to optimally allocate one or more buffers to each one of multiple flow is described. The method includes finding a particular one of the entries in an age table that indicates that a corresponding one of the multiple flows is least active, and deallocating the buffer assigned to the corresponding one of the multiple flows that is least active.

According to an embodiment of the present invention, a system for maintaining a plurality of activity-levels corresponding to a plurality of flows is disclosed. The system includes a recently-used bitmap that holds multiple activity-levels, each one of the multiple activity-levels indicating the activity-level within a time period of a corresponding one of the multiple flows, and an aging circuit, coupled to the recently-used bitmap, that if an external processor polls a first one of the multiple activity-levels of a first one of the flows, then resets the first one of the multiple activity-levels to indicate no activity within the time period, and if an information element belonging to a second one of the flows arrives, then sets a second one of the multiple activity-levels corresponding to the second one of the multiple flows to indicate activity within the time period.

According to an embodiment of the present invention, a method for creating a physical output port based chain of multiple buffers belonging to multiple flows that are in an unassigned bit rate ("UBR") mode and destined for the same physical output port is disclosed. The method includes, upon arrival of an end-of-packet ("EOP") buffer for an information element destined for the physical output port, removing a previously-stored EOP buffer stored within an entry of the deferred buffer indexed by the physical output port. The method includes, if the previously-stored EOP buffer is not also a start-of-packet ("SOP"), linking within the chain the removed-EOP buffer after a second-to-last buffer of the previously stored information element and linking the removed EOP buffer before a first buffer of the information element whose EOP buffer arrived. However, if the previously-stored EOP buffer is also the SOP, linking within the chain the removed-EOP buffer after an EOP buffer of an earlier-to-arrive information element and linking the removed-EOP buffer before a first buffer of the information element whose EOP buffer arrived. The method also includes storing the arrived EOP buffer in the entry of the deferred buffer indexed by the physical output port.

According to an embodiment of the present invention, a description is provided for a method to store within one or more information segment storage units a current one of one or more information elements that all have the same input logical port number and priority, where each one of the one or more information elements includes one or more information element segments. The method includes determining if an immediately earlier arriving one of one or more information element segments of the current one of the one or more information elements has data remaining that did not fit into an earlier-filled one of the one or more information segment storage units and a last one of the one or more information element segments of an immediately earlier arriving one of the one or more information elements has data remaining that did not fit into an earlier-filled one of the one or more information segment storage units. The method also includes rotating backward an incoming one of the one or more information element segments of the current one of the one or more information elements to produce a matching segment portion that combined with any remaining data fills as much as possible a particular one of the one or more information segment storage units and a remainder segment portion that includes any excess data from the combining of the remaining data and the incoming packet segment that could not fit into the particular one of the one or more information segment storage units. In addition, the method includes mixing any remaining data with the matching segment to produce an information segment storage unit.

According to an embodiment of the present invention, a description is provided for a system to store within one or more information segment storage units a current one of one or more information elements that all have the same input logical port number and priority, where each one of the one or more information elements includes one or more information element segments. The system includes an alignment intermediate data fetch ("ALF") unit that determines if an immediately earlier arriving one of the one or more information element segments of the current one of the one or more information element has data remaining that did not fit into an earlier-filled one of the one or more information segment storage units, or a last one of the one or more information element segments of an immediately earlier arriving one of the one or more information elements has data remaining that did not fit into an earlier-filled one of the one or more information segment storage units. The system also includes a rotator, coupled to the ALF unit, to rotate backward an incoming one of the one or more information element segments of the current one of the one or more information elements to produce at least one of a matching segment portion that combined with any remaining data fills as much as possible a particular one of the one or more information segment storage units and a remainder segment portion that includes any excess data from the combining of the remaining data and the incoming packet segment that could not fit into the particular one of the one or more information segment storage units. In addition, the system includes a mixer, coupled to the rotator, to mix any remaining data with the matching segment to produce an information segment storage unit.

BRIEF DESCRIPTION OF THE DRAWINGS

FIG. 11 shows an example of an embodiment of the protocol translator unit performing the strip off and encapsulation functions on a packet in four clock cycles according to the present invention.

FIG. 25 shows the alignment pipeline and an example of aligning the data according to one embodiment of the present invention where the length of the information segment storage unit is 64-bytes and the data segment of the incoming information element segment is less than or equal to 48 bytes.

FIG. 26 shows the alignment pipeline and an example of aligning the data according to one embodiment of the present invention where the length of the information segment storage unit is 64-bytes and the data segment is greater than 48 bytes but less than 64 bytes.

FIGS. 27a–c show the alignment pipeline and an example of aligning the data according to one embodiment of the present invention where the incoming information element is larger than 64 bytes and the first information element segment is larger than 80 bytes.

FIGS. 28a–c show the alignment pipeline and an example of aligning the data according to one embodiment of the present invention where the incoming information element is larger than 64 bytes and the first information element segment is less than 80 bytes.

FIGS. 30a–e show the alignment pipeline and an example of aligning the data according to one embodiment of the present invention where the incoming information element is larger than 64 bytes and the first information element segment is less than 80 bytes.

FIG. 32 shows an embodiment of the policer unit according to the present invention.

FIG. 33 shows an embodiment of the conformance checking unit according to the present invention.

DESCRIPTION OF THE INVENTION

One embodiment of the present invention is a processor that optimally processes network traffic (this processor is hereinafter referred to as a "network processor"). In this embodiment, deterministic behavior is guaranteed by eliminating context switching. Also, multiple instruction single data ("MISD") processors are used. As described below, these processors are configured to directly process the incoming data segments that are in a parallel format (e.g., the bits are parallel to each other in the vertical direction). In order to process the parallelized data segments, the pipeline has a large width. Very long instructions instruct the MISD processor to perform various functions on the data segments. This embodiment is able to guarantee and sustain a particular line rate performance regardless of incoming traffic patterns and network services contracted for by the subscriber. The line rate is guaranteed regardless of the number of processing functions executing in parallel.

Figure 1:
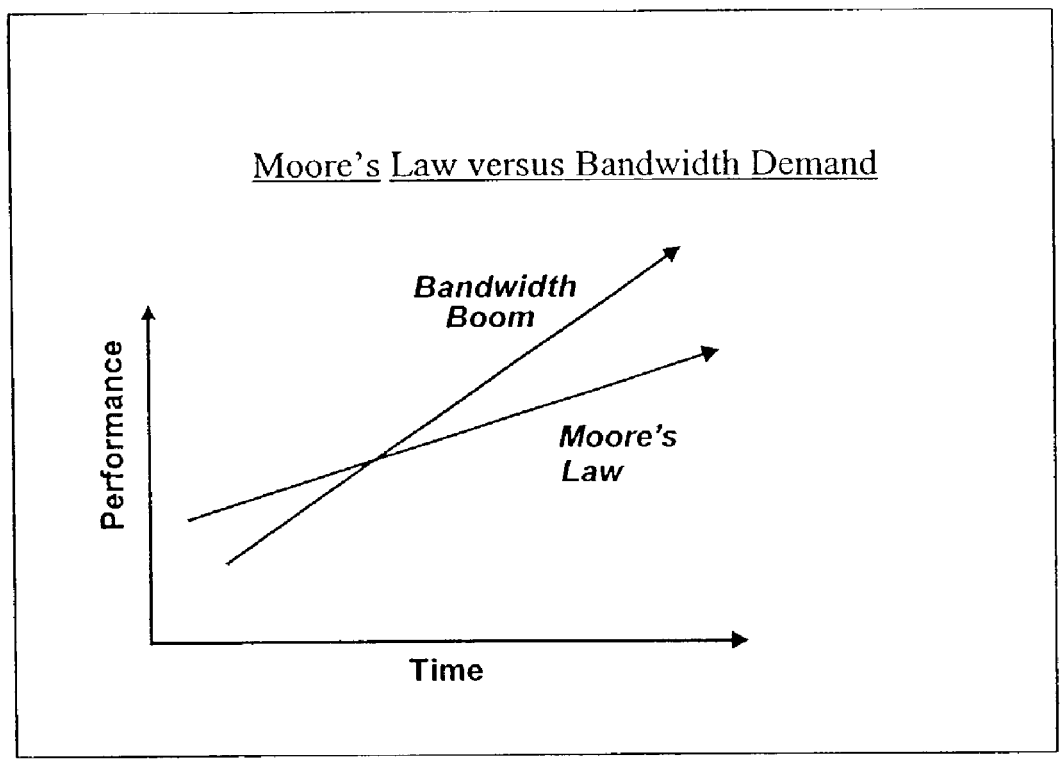
FIG. 1 shows Moore's law versus the internet bandwidth demand curve.
Figure 2:
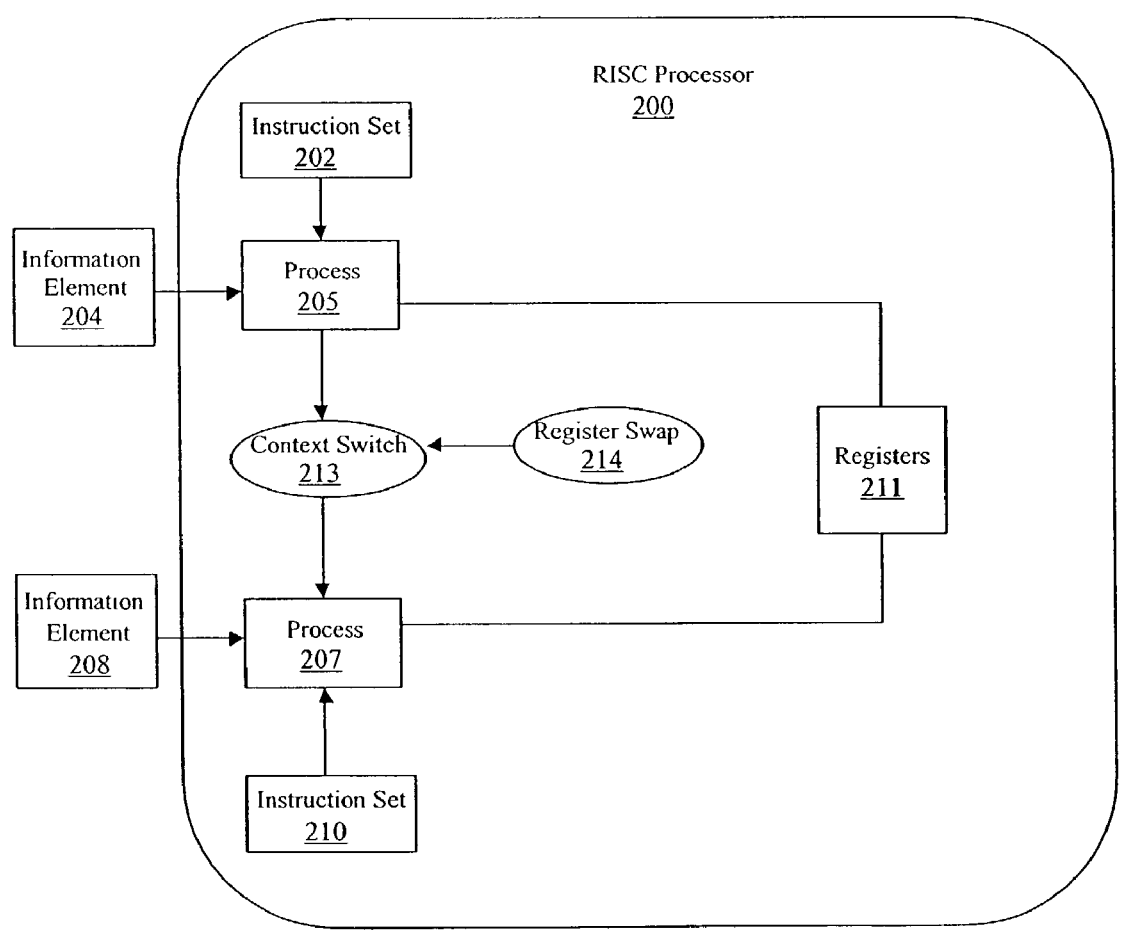
FIG. 2 shows the processing and context switching occurring in a prior art RISC processor performing networking functions.
Figure 3:
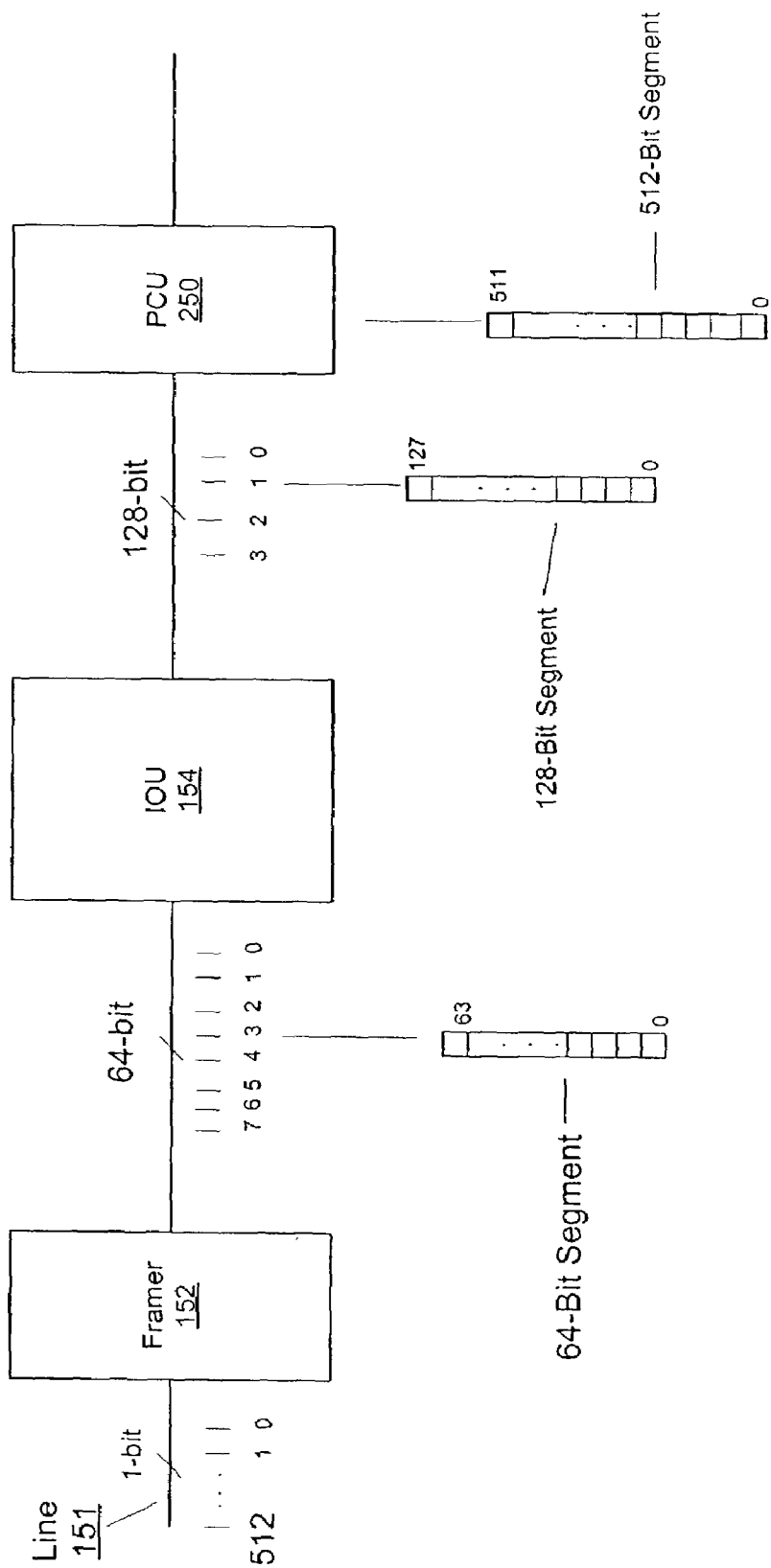
FIG. 3 shows an embodiment of the parallelized segment generator according to the present invention.
Figure 5:
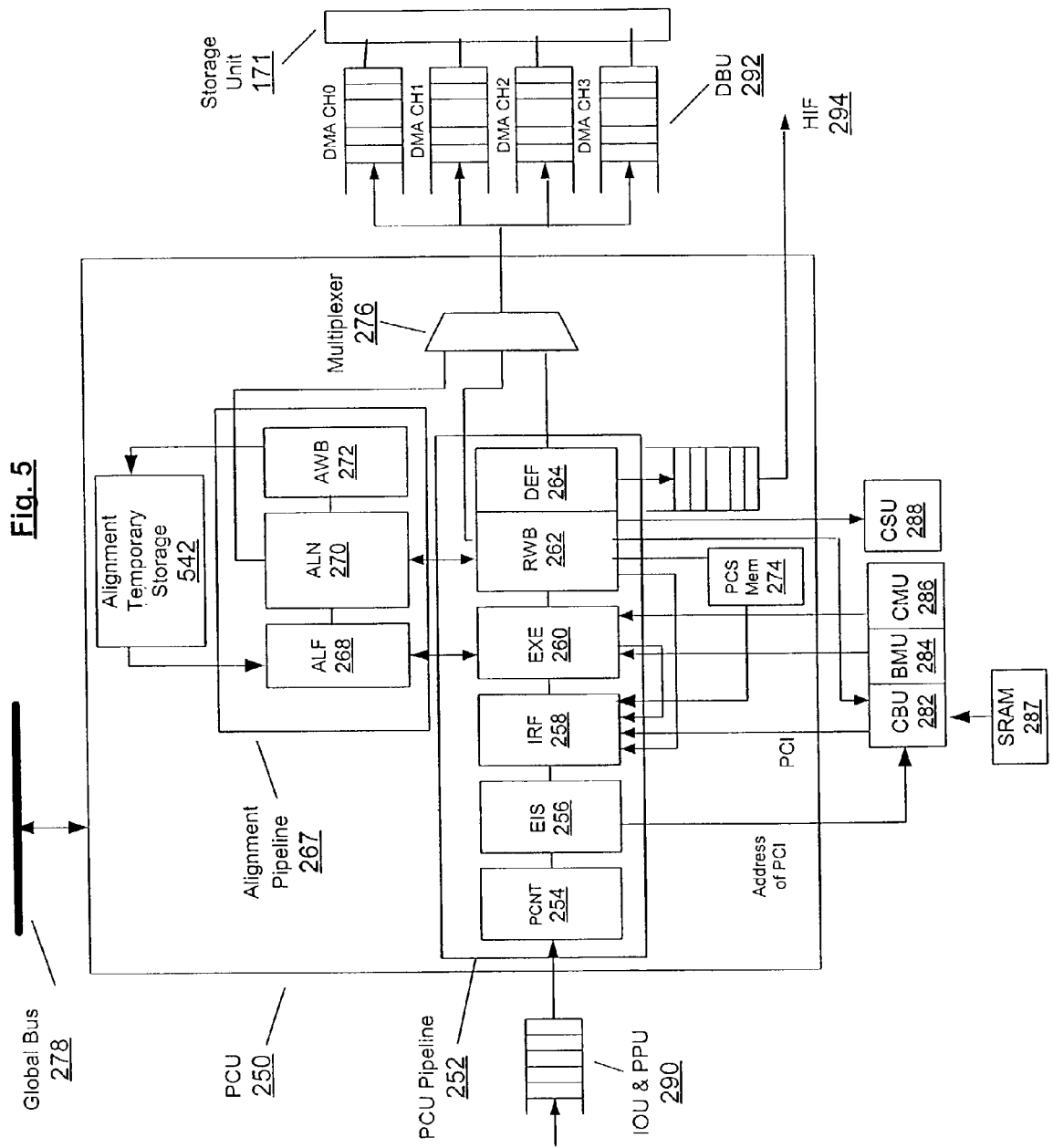
FIG. 5 shows an embodiment of a policy control unit according to the present invention.

This embodiment of the network processor divides the incoming information element into 64-byte segments, stacks each segment, and sends each segment serially through one of several pipelines. The information element segment may include all of the information element or only a portion of the information element. FIG. 3 shows an embodiment of the stacked segment generator according to the present invention. A framer 152 groups the serial bits arriving from a line 151 into segments. In this embodiment, the framer 152 groups 512 serial bits into eight 64-bit segments (e.g., as shown in FIG. 3, each of the segments has a dimension of 64×1 and each of the bits are parallel to each other in the vertical direction). Each of the 64-bit segments are sent to an input/output unit ("IOU") 154 via a 64-bit bus. The IOU unit 154 groups the 8 64-bit segment into 4 128-bit segments (e.g., as shown in FIG. 3, each of the segments has a dimension of 128×1 and each of the bits are parallel to each other in the vertical direction). Each of the 128-bit segments are sent to a policy control unit ("PCU") 250 via a 128-bit bus. The PCU 250 groups the 4 128-bit segments into a single 512-bit segment and sends this 512-bit segment through a PCU pipeline (the PCU pipeline is shown in FIG. 5). The PCU pipeline 252 is 512-bits wide. As shown in FIG. 3, the 512-bit segment has a dimension of 512×1 and each of the bits are parallel to each other in the vertical direction.

As used herein, grouping a segment means that a group of incoming segments arriving serially are combined to create a single segment that includes all the bits of the incoming segments, and stacking a segment means parallelizing the bits of the segment such that all of its bits are parallel to each other in the vertical direction.

All the stages within the PCU pipeline are working on information elements in parallel. As the data moves to the next stage of the PCU pipeline, a new information element segment can be processed by the previous stage. In single instruction multiple data ("SIMD") processing within a multithreaded prior art RISC processor, one instruction is fetched and this instruction operates simultaneously on multiple data streams on multiple processors. By using the present embodiment of the MISD processor, however, multiple instructions are fetched in one memory access and these instructions operate on a single one of the incoming information element segments.

The information element may be, for example, a single cell (a fixed-length packet which is the basic transmission unit on high-speed networks such as an asynchronous transfer mode ("ATM")), portion of a packet (a packet is a bundle of data, usually in binary form, organized in a specific way for transmission), or the entire packet. The size of the information element can be fixed or variable. The information element also includes units of information other than packets or cells. The term information element is interchangeable with data. The information element may be comprised of data, voice and video. The information element can be, for example, an ATM cell, Internet Protocol ("IP") packet, or a portion of a multiprotocol label switching ("MPLS") packet. Unlike the information element of a RISC processor which is either 32-bit or 64-bit data or operand, the size of the information element is much larger than even 64-bit. For example, the information element size may be 512-bit or 1024-bit.

In this embodiment, the MISD processor is a data flow machine that is triggered by the availability of data. The time of executing operational flow (e.g., incoming data) is not decided by instruction sequence, but rather, depends on the arrival and sequence of the data. In the prior art processor, the incoming data is stored in memory and the data is fetched from memory when an instruction references that data. This embodiment of the MISD processor, however, processes the incoming information element segment directly (i.e., it does not first store the data into memory). The arrival of the incoming segment triggers execution of that data (i.e., the arrival of the incoming segment causes it to be sent through the pipeline of the processor). The arrival of the information element segment causes the fetching of a very long instruction and registers corresponding to the flow to which the segment belongs.

In this embodiment, each of the MISD processors within the network processor supports up to 64K (i.e., 65,536) independent and distinct very long instructions. Each very long instruction is treated as a unique process to the MISD processor. Each MISD processor supports up to 64K simultaneous processes by providing an adequate number of registers to each process in order to completely eliminate space resources conflict. Eliminating space resources conflicts eliminates context-switching time. In other words, it reduces context-switching time to zero. Embedded dynamic random access memory ("DRAM") stores the distributed instructions and registers for each process.

Figure 4:
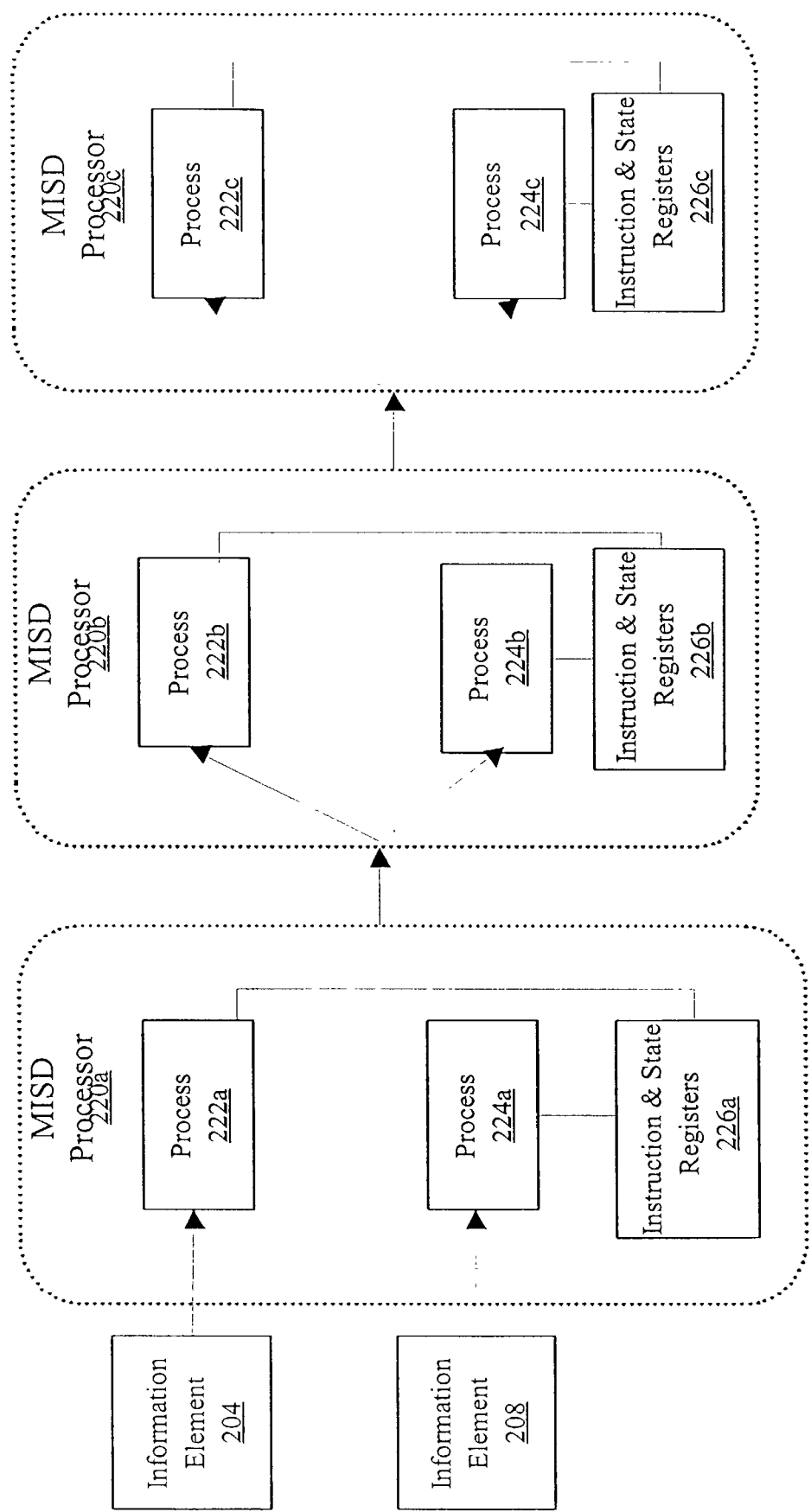
FIG. 4 shows the processing occurring in an embodiment of the network processor utilizing three multiple instruction single data ("MISD") processors 220a–c according to the present invention.

FIG. 4 shows the processing in an embodiment of the network processor utilizing three MISD processors 220a–c according to the present invention. In FIG. 4, the information element 204 belonging to the first flow is processed by a process 222a and the information element 208 belonging to the second flow is processed by a process 224a. The process 222a is given its own set of dedicated registers. The process 224a is also given its own set of dedicated registers. The context switching time is eliminated altogether by giving each of the processes in each of the three MISD processors 220a–c its own dedicated registers from the corresponding instruction & state registers 226a–c (i.e., by giving each process its own set of dedicated registers, context switches are eliminated). In this embodiment, the instruction & state registers 226a–c include 64K very long instructions and also 64K registers for each of the possible 64K different processes supported. The processes 222a–c and 224a–c perform network functions as complex as policing and encapsulation and because each process has adequate register space, no context switches occur in order to perform these complex functions in a multitasking environment.

Referring still to FIG. 4, in this embodiment, the MISD Processor 220a functions as a PCU. The PCU performs functions such as traffic policing, buffer allocation and management, data strip off, header encapsulation, packet segmentation, and statistics data calculation and collection. The Traffic Processing Unit ("TPU") performs traffic engineering functions such as rate shaping, prioritizing traffic, and scheduling different classes of traffic, flow control, and congestion management. The Forwarding Processing Unit ("FPU") performs functions such as packet/cell dequeing, cell re-queuing for hierarchical shaping, UBR traffic processing, encapsulation, and packet header insertion.

Each incoming information element is split into one or more segments and the arrival of the information element at the MISD Processors 220a–c triggers instruction and state fetches from memory (e.g., instruction and state fetches from instruction & state registers 226a–c). A very long instruction corresponding to the flow of the incoming information element segment is fetched from storage. The very long instructions read from memory are encoded machine codes. These very long instructions are compressed and specially coded to fit into a fixed length that is optimal for VLSI implementation. In this embodiment, that fixed length is 32-bytes but other embodiments of this invention are not limited to that specific length. The 32-byte very long instruction is composed of multiple smaller sets of basic instructions. A translator residing within each of the MISD processors 220a–c transforms simple high-level command language into a 32-byte very long instruction.

Based on the very long instruction fetched, the PCU (i.e., the MISD processor 220a) performs functions on the incoming information element segment such as traffic policing, buffer allocation and management, header strip off and encapsulation, packet segmentation, statistics data calculation and statistic collection. In order to perform such a wide variety of processing functions, the PCU employs a 512-bit wide (i.e., 64-byte), 4-stages deep pipeline. The pipeline advances every 4 clocks cycle. If executing at 166 MHz for example, the PCU is able to process a 64-byte information element in 24 ns. In this case, the raw capacity of the PCU pipeline is more than 21 Gbps (i.e., 64-byte*(8 bits/byte)/24 ns). This embodiment is designed to ensure that the PCU can process at least 10 Gbps and maintain this rate even under extreme conditions such as when small packet sizes are processed.

FIG. 5 shows an embodiment of a PCU 250 according to the present invention. The PCU 250 is configured as the MISD processor described earlier. The PCU 250 includes a PCU pipeline 252 that allows for processing multiple information elements at the same time. The PCU pipeline 252 includes the following: a program counter ("PCNT") stage 254, an external issue ("EIS") stage 256, an instruction and register fetch ("IRF") stage 258, an execution ("EXE") stage 260, a register write back ("RWB") stage 262, and a deferred write back ("DEF") stage 264. In this embodiment of the PCU 250, each of the stages of the PCU pipeline 252 are 512-bits wide.

The PCNT stage 254 combines the 4 128-bit segments, as described above with reference to FIG. 3, and stacks the combined segment (i.e., parallelizes the bits of the combined segment such that each of the bits are parallel to each other in the vertical direction) to produce the stacked incoming information element segment. The PCNT stage 254 also determines a PCI location address and a policy control state ("PCS") location address for the incoming information element segment. The EIS stage 256 provides the PCI address (e.g., the flow identifier) to a control buffer unit ("CBU") 282 so that the PCI will be available in the IRF stage 258. There is a delay associated with fetching the PCI since it is stored in an external memory (i.e., it is stored in a static random access memory ("SRAM") 287) outside the PCU 250. In another embodiment, the SRAM 287 may be internal to the PCU 250. The IRF stage 258 fetches the PCS from a PCS memory 274 (noted as PCS Mem 274 in FIG. 5) and fetches the PCI from the SRAM 287. The fetched instruction (i.e., the PCI) is stored in physical memory of the EXE stage 260. The fetched registers (i.e., the PCS) is stored in physical registers of the EXE stage 260. The EXE stage 260, using multiple execution units, performs complex functions such as policing and checking the integrity of the information element segment. The RWB stage 262 updates the PCS if the PCS was modified in the EXE stage 260 and also aligns the incoming information element segment to an information segment storage unit in the case, for example, where the incoming information element segment is a cell. The DEF stage 264 creates output port based chains of information element segments when those segments belong to the UBR mode.

There is another pipeline present that supports the PCU pipeline 252. An alignment pipeline 267 aligns the variable-size incoming information element segments into a fixed size buffer (e.g., the fixed size buffer may have lengths of 64-byte or 128-byte). The alignment pipeline 267 is used to align the incoming information element segment to the fixed size buffers when, for example, the incoming segment is a portion of a packet. The alignment pipeline 267 includes the following units: an ALF unit 268, an alignment ("ALN") unit 270, and an alignment intermediate data write back ("AWB") unit 272. The ALF unit 268 unit checks whether the previous information element segment had "excess" data that could not completely fit into an earlier-filled fixed size buffer and therefore should be included (i.e., mixed) with the current information element segment. The ALN unit 270 aligns the information element segment with the fixed size buffer, for example, the incoming information element segment is mixed with any excess data from the previous information element segment and this is inserted into the fixed size buffer. The ALN unit 270 writes this fixed size buffer to memory by sending it to the multiplexer 276. Any excess data that does not completely fit into this fixed size buffer is sent to the AWB 272 to be mixed with the next-to-arrive information element segment. The AWB 272 unit writes the excess data into an alignment temporary storage 542.

As described in greater detail below, the EXE stage 260 is coupled to the ALF unit 268. The EXE stage 260 passes the size of the incoming information element segment to the ALF unit 268 and also passes to the ALF unit 268 the fixed size buffers used by the current information element segment and any remainder data stored in the alignment temporary storage 542. The RWB stage 262 is coupled to the ALN unit 270. Incoming segments that are, for example, packets are passed from the RWB stage 262 to the ALN unit 270 for alignment to the fixed size buffer.

An input/output unit and a packet parsing unit ("IOU & PPU") 290 passes an information unit to the PCU 250. The IOU & PPU 290 receives an incoming information unit and strips off the overhead added by a switch fabric. The switch fabric is a facility for connecting two or more transmitting or receiving service providers.

The following units interface the PCU 250 with memory: a data buffer unit ("DBU") 292, a CBU 282, a buffer management unit ("BMU") 284, a channel management unit ("CMU") 286, a channel sequence table unit ("CSU") 288, and a host interface ("HIF") unit 294. The DBU 292 writes the fixed size buffers into memory (the fixed size buffers contain data from the incoming information element segment). That is, the DBU 292 stores the fixed size buffers into memory and other functional units (such as the FPU) have access to those buffers. The BMU 284 provides and manages the fixed size buffer pointers; these buffer pointers are passed from the PCU 250 to the DBU 292 and the DBU 292 writes the fixed size buffers to memory. The CMU 286 is used to balance a traffic load across multiple memory channels. When performing this memory bandwidth balancing, the BMU 284 provides the row pointer to a new buffer row and the CMU 286 provides channel pointers to the new buffers in the new buffer row. The CSU 288 is used for recording the order of channel usage in the buffer row.

A multiplexer 276 selects a particular one of the fixed buffers for writing into memory. If the incoming information element segment had to be aligned (e.g., the incoming segment was a portion of a packet), then the multiplexer 276 selects as its output the input from the ALN unit 270 which is the fixed size buffer produced after going through the alignment process. If the flow belongs to the UBR mode, then the multiplexer 276 selects as its output the input from the DEF stage 264. If the incoming information element segment does not have to be aligned (e.g., the incoming segment is a cell) and does not belong to the UBR mode (e.g., a cell belonging to the constant bit rate ("CBR") or the variable bit rate ("VBR") service category), then the multiplexer 276 selects as its output the input from the RWB stage 262.

A global bus 278 carries data between different functional units, i.e., the global bus 278 allows the PCU 250 to communicate with the other functional units. The HIF 294 stores data that have been through the PCU pipeline 252 and destined for an external central processing unit ("CPU").

The PCI is the very long instruction described earlier and is a per-flow instruction to instruct the PCU 250's operation. The PCI is stored in the SRAM 287 and provided to the IRF stage 258 via the CBU 282. The PCS provides state information for a flow and thus also is maintained on a per flow basis. The PCS provides the dedicated registers to each flow so that context switching is eliminated. The PCS is stored in a PCS memory 274. The PCS may be updated in the PCU pipeline 252 and this updated PCS is written back to the PCS memory 274 in the RWB stage 262. If the PCS for a flow is updated after it is fetched in the IRF stage 258, then if another information element segment from the same flow fetches the same PCS, then the updated PCS is bypassed to that information element segment from the stage that has the most-updated value—either the EXE stage 260 or the RWB stage 262.

The elements of FIG. 5 are discussed in greater detail below.

I. PCU Pipeline
  1. The PCU Pipeline Processing Cells
  In this embodiment of the PCU 250, the PCU pipeline 252 can process information elements that are cells (i.e., the pipeline is operating in cell mode as the ingress segments are cells). In cell mode, each pipe stage takes four clock cycles. At any given time, there are up to five different flows in the PCU pipeline 252 (i.e., the PCNT stage 254, the EIS stage 256, the IRF stage 258, the EXE stage 260, and the RWB stage 262 may each be processing an information element from different flows). In cell mode, the alignment pipeline 267 (i.e., the ALF unit 268, the ALN unit 270, and the AWB unit 272) is not employed since cells can be stored in a fixed size buffer without performing any alignment (e.g., an ATM cell has 48-bytes of data and this data can be stored in a 64-byte fixed buffer without performing any alignment).

The PCNT stage 254 determines the PCI location address and the PCS location address for the incoming cell. The PCI is a per-flow instruction to instruct the PCU 250's operation. Various execution units within the PCU 250 are enabled and disabled based on the PCI. For example, the PCI may instruct the PCU 250 to perform the policing function by invoking the policing execution unit. The PCS is the state of the flow to which the incoming cell belongs. Various execution units within the PCU 250 use the PCS to keep the current state of the flow. This is useful in order to process multiple active flows simultaneously. The PCU 250 maintains and controls the fields of the PCS. In addition, the validity of the incoming cell is verified in the PCNT 254. Finally, any special type of cell (e.g., an information element that includes control plane information) is detected in the PCNT 254.

In cell mode, the flow is the cells belonging to a virtual circuit and the flow-ID is the virtual circuit. The flow-ID is a value that uniquely identifies the flow.

Once the PCI location address and the PCS location address is determined, the EIS stage 256 sends the PCI address to the CBU 282 and the CBU 282 returns the PCI to the IRF stage 258.

In the IRF stage 258, the PCI and PCS are fetched from memory using the PCI location address and the PCS location address. In addition to fetching the PCI and PCS, the IRF stage 258 validates the PCI and PCS and the input port where the cell arrived as well as other error checking mechanisms. The ATM cell type and service type are decoded in this stage. The service type is the network processor's mode of operation, i.e., whether the mode is cell-to-cell ("C-C"), where the ingress to the network processor is cells and the egress is also cells, or cell-to-packet ("C-P"), where the ingress is cells and these cells are converted to packets and the output of the network processor is packets. The IRF stage 258 also performs discard state checking in which cells belonging to a flow are discarded if an error has been committed in a previous cell belonging to the same flow.

The EXE stage 260 includes several execution units operating in parallel. These execution units are orthogonal and are completely independent of one another. These execution units perform the actual traffic engineering functions for network processing such as policing (i.e., conformance checking) and congestion control. For example, one execution unit implements the dual leaky bucket algorithm to perform the policing function and another execution unit implements the weighted random early discard ("WRED") algorithm for congestion control. A separate execution unit creates the buffer chain, e.g., buffer link list data structure in memory. Another execution unit provides a recently-used bitmap for 64K flows to determine when a particular flow should be closed and the buffers assigned to that flow should be reassigned. Other functions, such as changing the protocol of the incoming cell and segmentation, are also performed as described later in this specification. When the incoming information element is transformed from cell into packet, an execution unit within this stage checks the entire packet's validity. The packet size is also checked to determine if the packet size is over the predetermined limit. Using the direct memory access ("DMA"), the BMU 284 and the CMU 286 are used to get the correct pointer for buffer memory write.

The RWB stage 262 also includes several execution units. A dedicated execution unit updates the PCS. Another execution unit performs the virtual channel ("VC") merging function. Accounting update for billing purposes is also implemented in this stage. In the C-C mode, the actual cell switching function is performed in this stage. A dedicated execution unit performs the packet re-linking done in the UBR mode. For the UBR mode, the incoming information is linked on a per physical output port basis, and not on a per flow basis such as in the case of CBR and VBR service categories. Packet dropping algorithms such as partial packet discard ("PPD") and early packet discard ("EPD") are implemented in a dedicated execution unit within the RWB stage 262.

The RWB stage 262 also includes a trigger execution unit. The trigger mechanism advances the incoming cell to the next processing unit and prepares the DBU 292 to store the cell. The next processing unit may be the TPU, or in the case of an exception or control cell, an internal CPU.

In cell mode, the alignment pipeline 267 handles for the RWB stage 262 the interfacing to the DBU 292, the internal CPU, and the deferred buffers when in UBR mode. The alignment pipeline 267 also performs statistical counter update in which a packet count, an error count, a cell count, a conformance count, etc. are updated.

Table 1 below summarizes the functions performed by each stage of the PCU pipeline 252 in cell mode.

TABLE 1

Summary of Functions of Each Stage of the PCU Pipeline in Cell Mode

| PCNT | EIS | IRF | EXE | RWB | Alignment Pipeline |
|---|---|---|---|---|---|
| Input port + virtual channel identifier/virtual path identifier ("VCI/VPI") conversion to PCI and PCS address Header Error Check Operations, Administration and Maintenance ("OAM") cell detect Flow-ID table read | Issue PCI fetch | PCI and PCS fetch Valid Instruction and State checking Discard state checking Input port checking OAM cell cyclical redundancy check ("CRC") ATM Adaptation Layer ("AAL") type decode Service type decoding cell-to-cell ("C-C") and cell-to-packet ("C-P") | Conformance checking non-conforming action WRED check Buffer allocation and management Buffer pool request and buffer pointer calculation for Direct memory access ("DMA") Buffer header creation Packet header creation Packet buffer header insertion Oversize packet check Data strip-off and encapsulation when SOP Recent use bitmap update Conformance checking Policer 1, or Policer 1 and Policer 2 For C-P, CRC calculation and comparison | PCS update Prepare entry in packet ready queue ("PRQ") when End-of-packet ("EOP") VC Merging SOP, if PCS DW1[63] = 1 OAM Statistics In C-C mode, UBR defer of writing EOP to memory, and buffers linked according to physical output port Packet Header update preparation Packet dropping Prepare entry in PRQ, including data PRQ, OAM and CPU PRQ | Issue DBU command and data, including DAM command and data, data PRQ, OAM and statistical PRQ entries Issue CPU command and data Statistical Counter update Issue to defer buffers if in UBR mode |

2. The PCU Pipeline Processing Packets

In this embodiment, the PCU pipeline 252 can also process information elements that are packets (i.e., the pipeline is operating in a packet mode). In this mode, each stage again takes four clock cycles to complete. At any given time, there are up to five different flows residing in the PCU pipeline 252. In packet mode, the flow is defined as a connection in the connectionless oriented protocol. In the packet mode, the ALF unit 268, the ALN unit 270, and the AWB unit 272 are deployed for memory buffer alignment purposes. Interleaved packet segments coming into the network processor can be re-assembled and re-segmented into cells. The ALF unit 268, the ALN unit 270, and the AWB unit 272 (i.e., the alignment pipeline 267) together perform this function of converting a packet into a cell if such conversion is desired.

In packet mode, the PCNT stage 254 receives the PCI location address and the PCS location address for the incoming packet from the classification engine. The classification engine may be internal or external to the network processor. The classification engine determines the flow-ID for the packet and provides this information to the PCNT stage 254 within the PCU pipeline 252. The PCNT stage 254 forwards the PCI and PCS addresses to the IRF stage 260. The PCNT stage 254 also determines if an incoming packet belongs to a control flow and if so, then this packet is forwarded to an external processor for further processing.

In the IRF stage 260, the PCI and PCS are fetched. This stage also checks the validity of the flow and input port of the incoming packet. This stage decodes the service type. The service type is the network processor's mode of operation, i.e., whether the mode is packet-to-cell ("P-C") (where the ingress to the network processor is packets, these packets are converted to cells, and the resulting output of the network processor is cells) or packet-to-packet ("P-P") (where the ingress is packets and the egress is also packets).

As is the case with the cell mode, the EXE stage 260 and the RWB stage 262 include many execution units performing a wide variety of functions in parallel. These dedicated execution units perform functions such as: packet policing, congestion control using, for example, WRED, changing the protocol of the incoming packet, using a recently-used bitmap to determine the flows to close, buffer chain creation, and buffer alignment.

The RWB stage 262 includes dedicated execution units for the following functions: PCS update, packet transformation and editing, accounting, dropping, and in the UBR mode, the deferral of writing a packet to memory until the next packet is known and the creation of chains according to the physical output ports. In addition, the RWB stage 262 also includes a trigger execution unit. The trigger execution unit advances the incoming information element to the next processing units and prepares the DBU 292 to store the information element. The next processing units may be the TPU, or in the case of an exception or control packet, an internal CPU. The ALN unit 270 aligns the incoming packet to a fixed size buffer. In the P-C mode, the ALN unit 270 segments the incoming packet into the fixed size buffer such that each fixed size buffer contains a cell. The ALF unit 268 is involved in buffer alignment when, for example, the incoming packets are converted to cells. The ALF unit 268 determines if a temporary storage contains excess data from the previous packet that could not fit into a fixed size buffer.

The AWB unit 272 writes any excess data to a temporary storage if all the data of the previous packet could not fit into a fixed size buffer.

Table 2 below summarizes the PCU pipeline 252 in packet mode. The table lists the functions performed by each of the stages of the PCU pipeline 252 in packet mode.

not generate an address but rather extracts the address information from the tag section of the incoming information element. In this technique, an in-band classifier may tag the incoming traffic with the appropriate connection or flow-ID. If the incoming information element is a cell, the in-band index comes with every cell. If the incoming information element is a packet, the in-band index comes with every packet.

b. Content Addressable Memory ("CAM") Lookup

If the information element is a packet, the PCI and PCS addresses are found using the CAM lookup. The CAM lookup is similar to the in-band indexing except it is side band. With in-band indexing, the flow identifier is attached to the information element and the packet parsing unit ("PPU") extracts this information. With side-band indexing, the flow identifier is found using the CAM lookup. The PPU passes the result of the external CAM lookup to the PCU 250. If the input port is in packet mode, the CAM lookup result is cached in a Port FlowID/ClassID cache. The PCU 250 retrieves the pointer when it receives a SOP and uses it for the rest of the packet from the same logical port c. Virtual Channel Identifier/Virtual Path Identifier ("VCI/VPI") Extraction and Lookup If the information element is a cell, the PCI and PCS addresses are found using a VCI/VPI extraction and lookup. In this technique, the PCNT stage 254 extracts portions of the VCI/VPI field from the ATM cell header. There are two ways to generate the PCI and PCS addresses:

i. Global Registers

Specified in a global register, a "global register one" defines the number of bits extracted from the ATM header

TABLE 2

Summary of Functions of Each Stage of the PCU Pipeline in Packet Mode

| PCNT | EIS | IRF | EXE/ALF | RWB/ALN | AWB | Alignment Pipeline |
|---|---|---|---|---|---|---|
| Control packet detection | Issue PCI fetch | Policy control instruction and state fetch Valid flow checking Discard state checking Input port checking Service type decoding P-C or P-P | Packet policing WRED check DFBA packet mode Oversize packet check Consecutive SOP check Buffer allocation and management Buffer pool request and buffer pointer calculation for DMA Buffer header creation Packet header creation Buffer header insertion Header strip-off and insertion when SOP Recent use bitmap update Determine if leftover data in temporary storage | Policy control state update Data insertion and encapsulation In P-C mode, UBR defer of writing EOP to memory, and buffers linked according to physical output port Prepare entry in PRQ when EOP, SOP, if PCS DW1[63] = 1 Control Statistics Packet header update preparation Packet dropping Prepare entry in PRQ including data PRQ, control and CPU PRQ Buffer alignment Cell segmentation in P-C mode | Write excess data to a temporary storage | Issue DBU command and data, including DAM command and data, data PRQ, OAM and statistical PRQ entries Issue CPU command and data Statistical Counter update Issue to defer buffer if UBR |

3. The PCNT Stage

According to one embodiment of the PCU 250, in the PCNT stage 254, the PCI and PCS addresses are determined. In this embodiment, there are three techniques of generating the PCI and PCS addresses:

a. In-band Indexing

The PCI and PCS addresses are embedded in the tag of the incoming information element. The PCNT stage 254 does for the VCI and a "global register two" defines the number of bits extracted from the ATM header for the VPI.

ii. VCI/VPI Lookup Table

The PCU 250 reads a VCI/VPI Lookup Random Access Memory ("RAM"). There are 4K entries in the VCI/VPI Lookup RAM indexed by VPI or PortID. Each entry is 8-bit wide in which 4 bits define the number of VPI least significant bits and 4 bits define the number of VCI least significant bits extracted from the ATM header as the offset to the program and register memory. The value of the four bit VPI number plus the value of the four bit VCI number may be less than 16. The PCU 250 attaches the most significant bits of the Port ID to the least significant bits of the flow Id. This is to avoid collision of the VPI/VCI space among ports.

4. The IRF Stage

In the IRF stage 258, the PCU 250 fetches the 32-byte PCI from the SRAM memory 287, and the 32-byte PCS from the PCS memory 274.

a. Bypass of PCI and PCS

The PCI and PCS may be bypassed to the IRF stage 258 from other stages of the PCU pipeline 252. The PCS is bypassed to the IRF stage 258 to resolve resource conflicts caused by read after write of the PCS.

Bypassing in the IRF Stage

The PCS may be bypassed from the RWB stage 262 if the flow ID of the information element in the EXE stage 260 does not match the flow ID of the information element in the IRF stage 258, but the flow ID of the information element in the IRF stage 258 does match the flow ID of the information element in the RWB stage 262. When the PCS is passed to the IRF stage 258 from the RWB stage 262, the PCS read in the IRF stage 258 can be cancelled. When the flow ID in the EXE stage 260 matches the flow ID in the IRF stage 258 and the RWB stage 262, the IRF stage 258 also cancels the read from the PCS memory 274 as the PCS obtained from the EXE stage 260 is the most recent and thus used.

Bypassing in the EXE stage

When the PCU 250 fetches the PCS in the IRF stage 258, the previous two operations in the EXE stage 260 and the RWB stage 262 have not updated the PCS yet. If the IRF stage 258 waits until the modified PCS gets written to memory, the PCU 250 has to insert a pipeline bubble in order to stall the PCU pipeline 252. Inserting the pipeline bubble degrades the PCU pipeline 252's performance.

A PCS bypassing structure is used to avoid this resources conflict condition described in the previous paragraph. The PCU 250 detects if the flow ID across the IRF stage 258, the EXE stage 260, and the RWB 262 stage match. If there is a match, the PCU 250 bypasses the modified value of the PCS to the IRF stage 258 from either the EXE stage 260 or the RWB stage 262 depending on which stage has the most recent value.

b. Input Attribute Check

Before proceeding to the EXE stage 260, the PCU 250 checks the following input attributes to ensure that the PCI and PCS fetched are legal for the incoming information element.

i. Valid Instructions.

If the instructions and registers are not setup correctly, the PCU 250 may drop the information element, or send it to a CPU ring depending on the definition in a Port Invalid Description Action Register.

5. The EXE Stage

Figure 6:
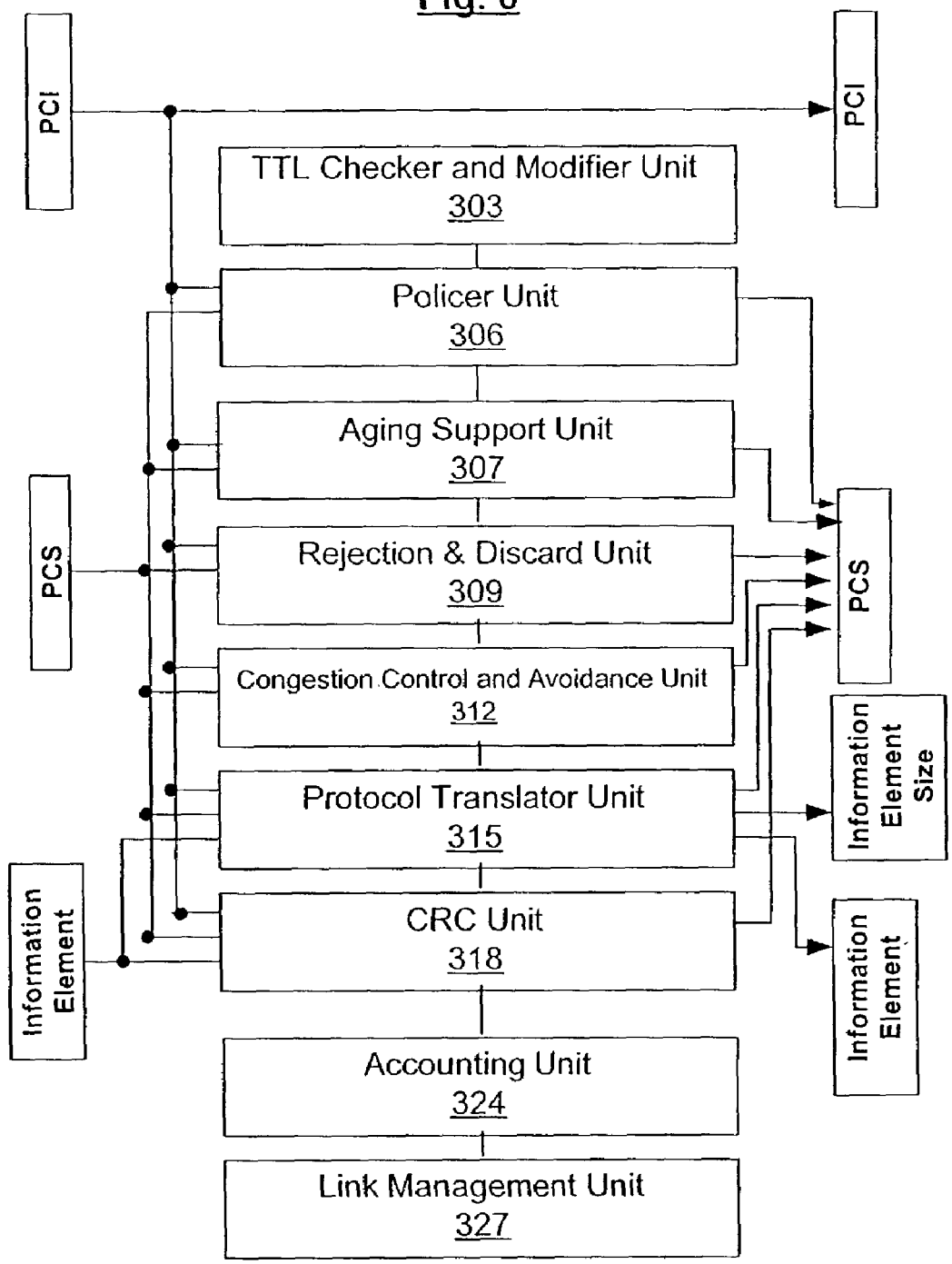
FIG. 6 shows an embodiment of the execution stage according to the present invention.

In the EXE stage 260, multiple execution units execute functions simultaneously. Multiple execution units execute instructions in parallel to achieve high performance processing throughput. FIG. 6 shows an embodiment of the EXE stage 260 according to the present invention. The EXE stage 260 does not execute traditional processor instructions such as load, store, add, but rather performs complex functions such as policing and checking the integrity of the information element. The EXE stage 260 includes a time-to-live ("TTL") checker and modifier unit 303, a policer unit 306, an aging support unit 307, a rejection and discard unit 309, a congestion control and avoidance unit 312, a protocol translator unit 315, a cyclical redundancy check ("CRC") unit 318, an accounting unit 324, and a link management unit 327.

The TTL checker and modifier unit 303 ensures that the information element doesn't take more than an acceptable number of router hops to reach its eventual destination. The policer unit 306 performs, for example, the policing function by executing the Generic Cell Rate Algorithm which guarantees that traffic matches the negotiated connection that has been established between a user and a network. The policer unit 306 also performs the time stamp rollover recovery described below. The aging support unit 307 performs functions such as stopping support for flows that are found to be inactive.

The rejection and discard unit 309 rejects and discards information elements that have errors or are discarded to relieve congestion. The congestion control and avoidance unit 312 prevents unwanted traffic from flooding the buffer memory and potentially blocking higher priority or premium traffic. The protocol translator unit 315 removes headers and tags from the information element. The CRC unit 318 validates the incoming information element and if an error is found, then the information element is discarded. The accounting unit 324 gathers statistical information from the other execution units. For example, the accounting unit 324 may count the number of conforming and non-conforming cells and charge the customer based on whether the non-conforming cells are processed. The link management unit 327 allocates buffers for the incoming information element segment and links these buffers (these buffers store the information elements) together in flow-based chains or output port based chains in the case of UBR mode.

In this embodiment, the PCI and the PCS corresponding to the flow to which the incoming information element segment belongs are sent to the policer unit 306, the aging support unit 307, the rejection and discard unit 309, the congestion control and avoidance unit 312, the protocol translator unit 315, and the CRC unit 318. The incoming information element segment is sent to the protocol translator unit 315 and the CRC unit 318. The PCI acts as the opcode instructing the appropriate execution units to which it is sent as to the function to perform. In this embodiment, the PCI is a 256-bit very long instruction where the bits of the PCI are parallel to each other. The PCS provides dedicated registers to the process specified by the PCI and the provision of dedicated registers prevents context switches. In this embodiment, the information element segment is a 512-bit parallelized operand where all the bits of the operand are parallel to each other in the vertical direction.

The sections below further describe these execution units.

a. The CRC Unit

When the PCU 250 is configured to operate in the ATM cell mode, the CRC unit 318 validates the incoming ATM cell. If the CRC check fails, the cell is discarded. The PCU 250 reports this error condition. At the instance of CRC error discovery, the PCU 250 is still processing the last cell of an ATM information element. The PCU 250 does not have to write the last cell into the payload memory, but it should update the header that resides in the first buffer of the information element. If the information element is less than 40 bytes, the information element takes only one cell as well as one buffer. In this case, no information element header has to be updated because no buffers have yet been used to store the information element. In this case, the PCU 250 only has to report the error condition and the information element should not be written to memory using the DBU 292. These same operations are applied to other error conditions that happen on the first cell of an information element.

b. Policer Unit

The policer unit 306 polices the incoming information element segment as specified by its PCI. The output of this unit identifies whether the incoming information element segment is in conformance with the usage parameter control ("UPC") parameters stored within its PCI. For non-conforming information elements, further action such as tagging or dropping may be applied.

Time Stamp Rollover Recovery Logic

When an information element segment arrives, the PCU 250 stamps that information element with a unit of time. A timer (e.g., counter) is used to time stamp the incoming information element. An inherent problem exists when using a finite number of bits to implement the timer to keep track of time. Time is folded to the size of the timer (i.e., the timer is rolled over after a certain time period depending on the number of bits used by the timer). If a timer rollover occurs, the time stamp no longer represents a unique point on the time line, but rather, the time stamp is relative to the point where the timer rolls over.

Figure 7:
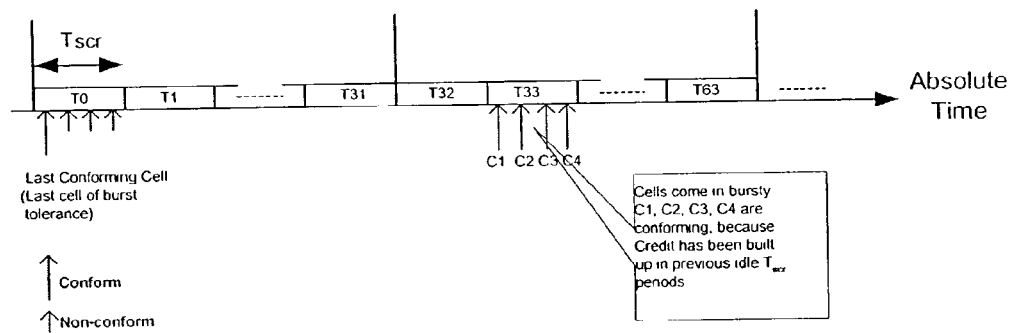
FIG. 7 shows an example of the ideal case in which the timer does not roll over thus providing an accurate count of the number of credits accumulated.

FIG. 7 shows an example of the ideal case in which the timer does not roll over thus providing an accurate count of the number of credits accumulated. In the examples shown in FIGS. 7 and 8, the timer is used to ensure that the incoming cells conform to the quality of service contracted by the customer. In these examples, the contracted quality of service is VBR and VBR is dictated by a peak cell rate ("PCR") and a sustainable cell rate ("$T_{scr}$"). In the two examples, the traffic is composed of information elements that are cells and it is assumed that all the arriving cells are adjacent to each other at least (1/PCR) away. The information elements in these examples are for illustrative purposes only; the timestamp rollover recovery logic applies to any type of information elements. The PCR is the maximum traffic rate (in cells per second) that a particular data source on a network can sustain.

In FIG. 7, VBR traffic enters the PCU 250. The arrival of the cells is illustrated with the arrows pointing upward. The $T_{scr}$ is the maximum average cell rate that can be sustained over a particular virtual connection. Each idle $T_{scr}$ period builds up credits so that if a cell does not arrive within one of those periods, then later periods can accept an additional cell and still maintain the average. In FIG. 7, the timer has an absolute value (i.e., the timer is not rolled over). Here, cells C1, C2, C3 and C4 arrive at period "T33". These four cells are conforming because credit was accumulated for accepting these four cells since the last thirty-two $T_{scr}$ periods (from "T1" to "T32") were idle time periods.

Figure 8:
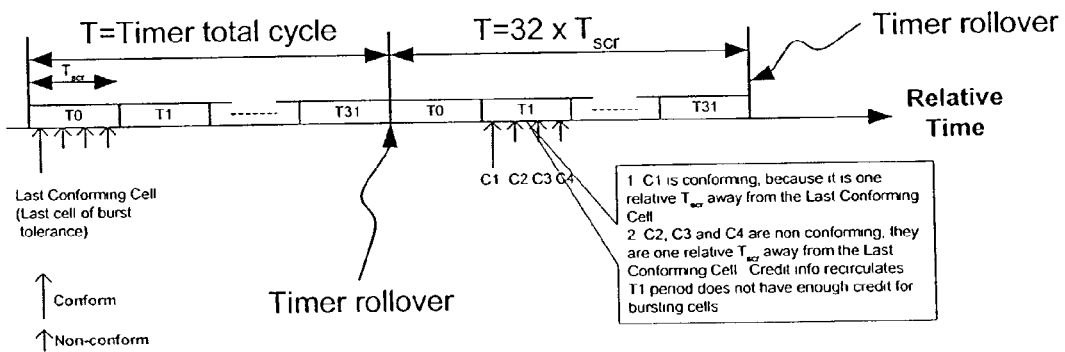
FIG. 8 shows an example of the typical case in which a timer rollover occurs leading to an inaccurate count of the number of credits accumulated.

FIG. 8 shows an example of the typical case in which a timer rollover occurs leading to an inaccurate count of the number of credits accumulated. Because of the rollover, the timer has a relative value which does not reflect the actual number of credits accumulated. In FIG. 8, the timer rollover occurs after the thirty-first time period ("T31"). Cell C1, received at the "T1" period, is conforming because it is one $T_{scr}$ period away from the last conforming cell received at period "T0". Cells C2, C3 and C4 are non-conforming because their time stamp is relative to the last timer rollover point and thus according to the timer, not enough credits have been accumulated to handle the burst cells C2, C3 and C4. In this case, cells C2, C3, and C4 are viewed as arriving in the "T1" period which has not accumulated enough credit to handle those three cells.

In this embodiment, in order to resolve the problem described above in FIG. 8, the PCU 250 implements a rollover recovery logic by using two bits to provide an accurate timer for up to two different timer rollovers. In other embodiments, more bits can be used to implement the rollover recovery logic and thus an accurate timer is provided for a greater number of timer rollovers.

Figure 9:
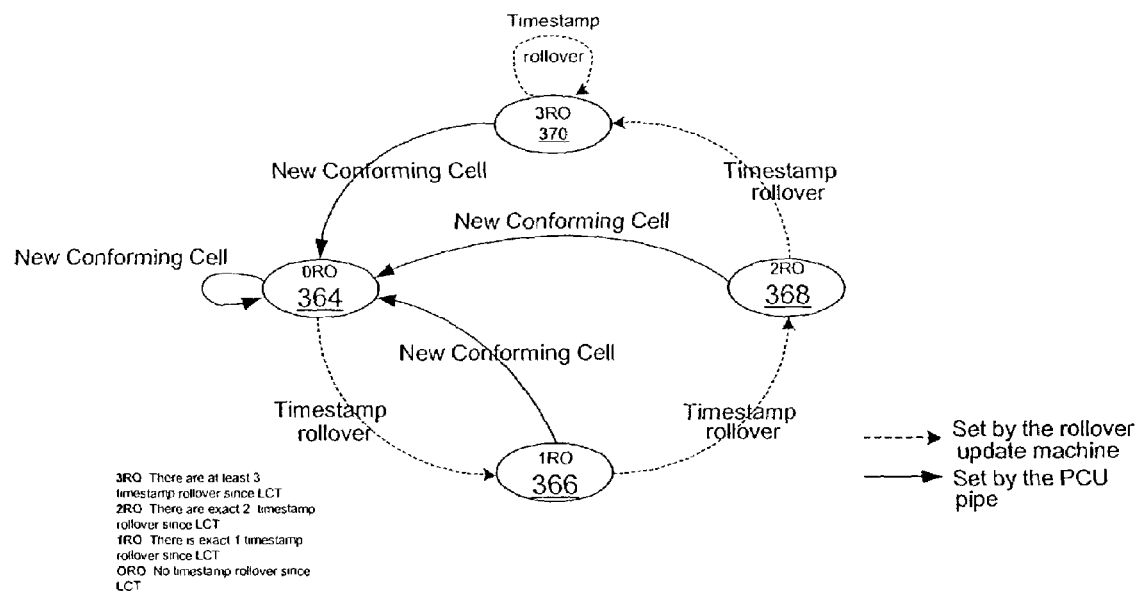
FIG. 9 shows an embodiment of the rollover recovery states according to the present invention.

FIG. 9 shows an embodiment of the rollover recovery states according to the present invention. In FIG. 9, the solid lines indicate the state transition occurring due to the PCU pipeline 252 (i.e., the state transition occurring due to the arrival of an information element). The dashed lines indicate the state transitions updated by the rollover recovery logic. Whenever the PCU 250 receives an information element, it sets the rollover state to a state "zero rollover" ("0RO") 364. The state 0RO 364 means that there are no timer rollovers since the last conforming time ("LCT"); the LCT is the time period in which the last conforming cell was received. Because there are zero rollovers, the timer represents an absolute value of the time. From state 0RO, if the timer rolls over, then the current state advances to a state "one rollover" ("1RO") 366. The state 1RO 366 indicates that there has been one timer rollover since the LCT. From state 1RO 366, if another timer rollover occurs, then the current state advances to a state "two rollover" ("2RO") 368. The state 2RO 368 indicates that there have been two timer rollovers since the LCT. From state 2RO 368, if another timer rollover occurs, then the current state advances to a state "three rollover" ("3RO") 370. If another timer rollover occurs, then the current state remains at 3RO 370. Therefore, in this embodiment, the timer provides an accurate time only if less than three timer rollovers occur. The state 3RO 370 indicates that there have been at least three timestamp rollovers since the LCT. It is known that in state 3RO 370, the timer has a value greater than the value after three timer rollovers. Therefore, this state information can be used, for example, to denote a "don't care" situation where incoming traffic at state 3RO 370 is accepted because the time period between the arrival of the previous information element and the current information element is adequately far apart. If the last conforming information element of a burst tolerance arrives at any of these states, then the current state becomes the state 0RO 364 thus resetting the number of timer rollovers. These four rollover states can be implemented using two bits.

The rollover recovery logic updates a total of 32K rollover state entries (one entry for each of 32K flows) whenever the timer rolls over. Even if 16 flows share a 32-bit rollover state entry in the rollover state table, the rollover recovery logic still has to update 2K entries in the rollover state table whenever the rollover occurs. Because of the possible degradation in performance (e.g., the degradation due to the added pipeline stalls used to update the table), it is not practical to update all 2K entries at the same time. In order to minimize the degradation in performance, the PCU 250 evenly distributes updating the entries to 2K different points in time. At each of the 2K update points, the rollover recovery logic reads an entry in the rollover state table (each entry represents 16 different flows), updates the entry with new state values, and writes back the entry to the rollover recovery state table.

In one embodiment, the timer is implemented as a 28-bit counter. The timer rolls over after 256M clock cycles ($2^{28}$ allows 256M time units for the timer, and the timer is incremented at each clock cycle). If the processor is running at a clock frequency of 166 MHz, 256M clock cycles is about 1.5 seconds. In this embodiment, a particular one of the 2K entries in the rollover state table is updated every 128K clock cycles (i.e., 256M clock cycles/2K entries=128K) or every 32K pipe stages (each pipe stage takes four clock cycles).

The update points (e.g., each of the 2K update points occurring once every 128K clock cycles) should coincide with the timer rollover because the timer rollover point is referred to as the relative starting point time for the policer. The arrival time stamp is relative to (i.e., references) the last time stamp rollover point. The 2K update points provide 2K reference points. The time stamp information passed from the IOU 290 to the PCU 250 is calibrated against the 2K update points. The time stamp of the incoming information element occurs at the IOU & PPU unit 154.

Figure 10:
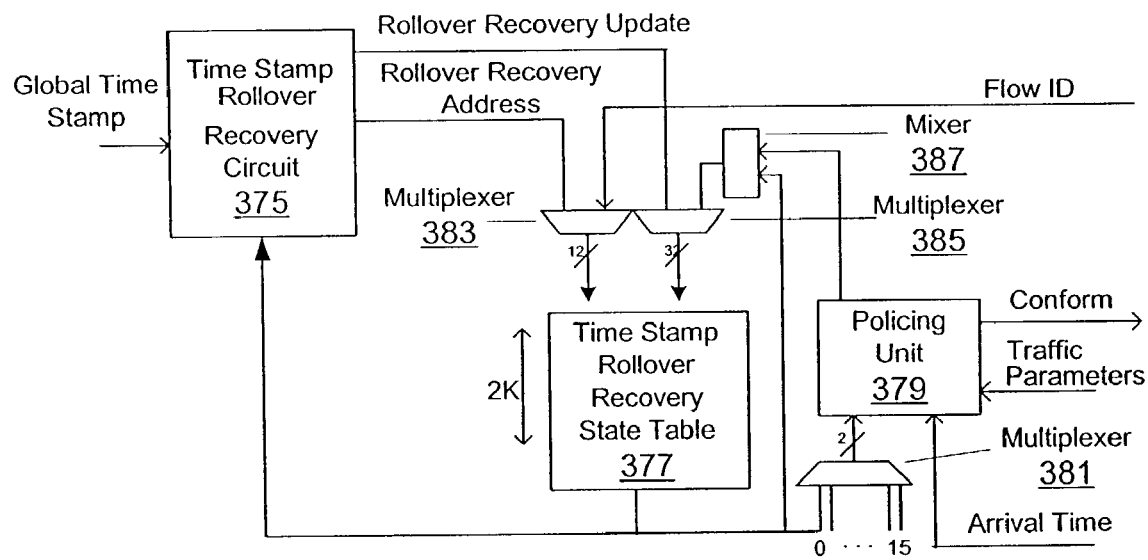
FIG. 10 shows an embodiment of a rollover recovery logic according to the present invention.

FIG. 10 shows an embodiment of a rollover recovery logic 374 according to the present invention. In FIG. 10, a time stamp rollover recovery circuit 375 implements the state table described in FIG. 9 above. The number of rollovers for the timer (i.e., the timer's state) is stored in the time stamp rollover recovery state table 377. The time stamp rollover recovery state table 377 stores state information for the 32K flows. Each row (i.e., entry) in the table is 32-bits wide and represent 16 flows (each flow is represented by two bits). Because there are 32K flows and each row represents 16 flows, there are 2K rows in the table. The time stamp rollover recovery circuit 375 has as an input the "global time stamp" which specifies the value of the timer. Whenever a timer rollover occurs, the time stamp rollover recovery circuit 375 updates the state of the flows (i.e., updates the number of timer rollovers for the flows) by updating the corresponding values in the time stamp rollover recovery state table 377. The time stamp rollover recovery circuit 375 outputs a "rollover recovery address" to a multiplexer 383. The "rollover recovery address" specifies which one of the 2K entries of the table should be updated. The time stamp rollover recovery circuit 375 reads this entry and modifies it based on the "global time stamp" and outputs a "rollover recovery update" which is the modified count of rollovers for the flows represented within the entry. The "rollover recovery update" is written to the time stamp rollover recovery state table 377 thus updating the number of timer rollovers for the flows within the entry specified by "rollover recovery address".

If an incoming information element belonging to a flow identified by "flow ID" is conforming, then the number of timer rollovers for that flow is reset to zero. Referring again to FIG. 10, the "flow ID" is sent to the multiplexer 383. An upper portion of the flow ID specifies a particular one of the 2K entries in which the number of rollovers for that flow is specified. The multiplexer 383 selects as its output the particular one of the 2K entries in the table which holds the number of rollover for the flow specified by the "flow ID." The lower portion of the "flow ID" is input into a multiplexer 381 in order to select within the entry the rollover count for the flow specified by the "flow ID." The number of timer rollovers for the flow is input to a policing unit 379. The policing unit 379 polices the incoming traffic to ensure that it conforms to the traffic parameters. The policing unit 379 may implement a "leaky bucket" method to determine conformance. The policing unit 379 has as inputs an "arrival time" of the incoming information element and the "traffic parameters" corresponding to the flow of the incoming information element. The "arrival time" is a relative time and therefore is adjusted depending on the number of timer rollovers for the flow of the incoming information element. The policing unit 379, after adjusting the "arrival time", if appropriate, determines if the incoming information element conforms to the contracted quality of service agreement. If there is conformance, then policing unit 379 outputs a "conform" signal and also resets the number of timer rollovers for this flow to zero. The bits representing the number of timer rollovers for the flow and the bits representing the other flows within the entry are input into a mixer 387 that recombines the two separate bit groups into one 32-bit entry which is again stored in the time stamp rollover recovery state table 377.

Weighted Random Early Discard ("WRED")

Network traffic congestion eventually shows up as a buffer congestion somewhere in the network. Policing function takes care of the traffic violations of each flow. It makes sure that traffic coming into the network complies with the subscription agreements. The Policer regulates the network from overbooking and traffic congestion. When sitting on the network edge, the policer protects traffic violating the QoS agreement from damaging the rest of the network. It protects conditions originated from an upstream network. However, the policer is not able to handle conditions generated from a downstream network, for example one of the downstream links is broken or congested. Traffic going to the abnormal link will back up and may eventually overflow the buffer memory that is shared by all of the other traffic. It is not desirable to have the traffic going to a congested or broken destination to overflow the entire buffer memory.

Congestion control and avoidance is necessary to isolate and minimize the impact of any breakdown or slowdown from the downstream network. The PCU 250 implements a buffer congestion management scheme to prevent unwanted traffic from flooding the buffer memory and potentially blocking the higher priority or premium traffic received by the network processor. The PCU 250 implements the WRED algorithm to control network congestion. The first threshold in the WRED algorithm is used to anticipate the traffic congestion and drop packets selectively before the congestion actually happens. If the packets are transmission control protocol ("TCP") packets, the transmitting TCP nodes retransmit the packets when they are dropped and they slow down transmission rates if the receiving party does not acknowledge the receipt of the packet within a specified time window. This mechanism eases the congested situation. If the situation gets worse, the second threshold of the WRED kicks out all of the TCP packets coming into the network processor. By doing this, the tail end of the traffic stream is dropped. A programmable threshold prevents the tail end dropping for all types of traffic at the same time. If the WRED algorithm is not used, uncontrollable tail end dropping causes the network throughput to oscillate.

For the non-TCP traffic, the network processor is able to classify flows and VCs with different level of drop distribution depending on the buffer occupancy status. The flows and VCs are mapped to one of the WRED classes for the congestion avoidance service. The WRED algorithm can be viewed as a resources protection scheme. It protects the buffer pool from overflowing.

c. Link Management Unit

In an embodiment of the link management unit 327, the link management unit 327 produces chains of information segment storage units. Each information segment storage unit is either 64-bytes or 128-bytes. When the information element segment arrives (e.g., a cell or packet segment arrives), the EXE stage 260 allocates adequate buffers to store the incoming information element segment as described below. Information element segments of a flow are stored in one or more buffers (e.g., an ATM cell fits into a single 64-byte buffer but a 84-byte packet uses two 64-byte buffers). The buffers are linked in flow-based chains or in the case of the UBR mode, output port based chains. The next pointer of the chain is stored in the buffer header of each buffer. The information segment storage unit is not limited to a length of 64-bytes or 128-bytes, and the chain is not limited to a linked list implementation.

In the flow-based buffer chain, when an information element segment arrives, a pointer to the next buffer is written in the header of the current buffer in order to create the chain. Buffers are allocated on a per buffer row basis. The buffer row has four buffers. When the PCU 250 reaches the end of the buffer row, the PCU 250 checks out a new buffer row before the next information element arrives. This is a pre-allocation scheme. Due to this pre-allocation scheme, it is possible that a buffer can be allocated to a flow but the flow is closed before any of the buffers of this buffer row are used. The EXE stage 260 allocates buffers for the chain representing the flow but the actual writing of the data to the buffers (i.e., memory) is performed by the RWB stage 262 and the ALN unit 270 of the alignment pipeline 267.

The UBR mode is a special case in the buffer chain creation. In this mode, the buffer chains are created on an egress physical output port basis. Information elements from many different flows can be part of the buffer chain for a particular one of the physical output ports. In this mode, upon receiving an EOP, the DEF stage 264 writes this newly arrived EOP to a deferred buffer. The EOP previously stored in the deferred buffer is linked within the chain to the information element to which it belongs and also linked to the first buffer of the newly arrived EOP.

d. Packet Length

The EXE stage also includes a dedicated execution unit to determine the length of the incoming information element. The information element length is calculated to perform the packet-to-cell conversion. The information element length written in the information element header represents the length of the packet that the PCU 250 writes into the buffer memory.

There is no space in the PCS to hold the intermediate value of the information element length before receiving an EOP; the PCU 250 calculates the information element length with the information available upon receiving the EOP.

Cell Mode

In cell mode (i.e., C-P and C-C mode), the incoming information elements are cells. The PCU 250 calculates the incoming cell length only in the C-P mode. The cell length of an incoming ATM cell payload can be found in the Common Part Convergence Sublayer-Protocol Data Unit ("CPCS-PDU") trailer (i.e., packet or frame). The PCU 250 may strip off some bytes or insert some bytes to the header of the ATM cell. Upon receiving the EOP, the PCU 250 calculates:

Cell Length=AAL5.Length−Stripoff Length+Encapsulation Length and writes the "cell length" value to a "packet length" field in the ATM cell header. In the above equation, "AAL5.Length" is the ATM cell payload found in the CPCS-PDU trailer. The "stripoff length" and the "encapsulation length" are the number of bytes removed (stripped off) and added (encapsulated) to the cell, respectively.

Packet Mode

In packet mode (i.e., P-P and P-C mode), the incoming information elements are packets. The PCU 250 tracks the number of buffers used for storing a packet. It is defined in the PCS for packet mode. Also, the PCU 250 tracks the pending bytes that are not written to the packet buffer due to the strip-off and insertion of data. The byte counts associated with the pending bytes are also stored in temporary registers. The PCU 250 knows how many bytes are still not written to memory. There is no dedicated field in the PCS for the packet length calculation. The PCU 250 derives the packet length value from a "buffer count" field within the PCS. The "buffer count" field within the PCS records the number of buffers used to store the packet. Because the PCU 250 fills up the buffer before reaching the EOP, the "buffer count" field in the PCS can easily be used for the calculation of the packet length upon receiving the EOP. The packet length is calculated for the two different buffer sizes as explained below:

For a 64-bytes buffer size:

Packet Length=(Buffer Count×48)+Pending Byte Size where "buffer count" is the value of the field in the PCS and this value is multiplied by the 48 available data bytes in a 64-byte buffer size. The "pending byte size" is the bytes not written to the packet buffer due to the strip-off and insertion of data.

For a 128-bytes buffer size:

Packet Length=(Buffer Count×112)+Pending Byte Size where "buffer count" is the value within the field in the PCS and this value is multiplied by the 112 available data bytes in a 128-byte buffer size. The "pending byte size" is as defined above.

e. Protocol Translator Unit: Packet Header Strip Off and Encapsulation

The following are the actions that an embodiment of the protocol translator unit 315 of the EXE stage 260 can perform on the header information of an information element segment: (1) it may not be altered, (2) it is encapsulated but not stripped-off; (3) it is stripped-off but not encapsulated; and (4) it is both encapsulated and stripped-off. These actions convert the incoming information element segment's protocol from one to another. For example, the protocol translator unit 315 may strip off header information from an information element segment in order to convert the information element from one protocol to another. The protocols are, for example, Ethernet Layer 2, ATM, and point-to-point protocol ("PPP"). The embodiment of the network processor is concerned with three levels of packet header strip off. The first level strips off the switch fabric overhead. The second level strips off the ATM headers. The third level strips off the layer two packet headers and tags. The protocol translator unit 315 handles the second and the third levels of stripping off. The IOU 154 strips off the overhead added by the switch fabric. The other part of protocol translation, encapsulation, is also executed in the protocol translator unit 315.

When processing cells in the C-P mode, the header of the incoming cell is stripped-off before writing the cell into the buffer. The C-P mode supports packet header strip-off in a different way from the packet mode (i.e., P-P and P-C mode). In the C-P mode strip off, the information to be removed resides within the first cell of a packet. The protocol translator unit 315 removes these bytes from the payload of the first cell and writes the modified first cell into a buffer with the "valid length" field equal to (48—strip off length) in the buffer header. The FPU interprets the "valid length" field to transmit the packet correctly.

In the packet mode (i.e., P-P and P-C modes), in order to support the "AnyMap" function, the protocol translator unit 315 not only swaps headers, tags, fields or labels, it also strips off and inserts headers, tags, fields or labels in the middle of any packet in order to swap both homogeneous and heterogeneous headers, tags, fields and labels on a per flow basis. Homogeneous headers, tags, fields, and labels are those that are similar; e.g., an Ethernet Layer 2 header is a homogeneous header where the router converts an Ethernet Layer 2 header to an Ethernet Layer 2 header. Heterogeneous headers, tags, fields, and labels are those that are dissimilar; e.g., an Ethernet Layer 2 header and an ATM header are heterogeneous headers where the router converts an Ethernet Layer 2 header to an ATM header. The headers are protocol control information located at the beginning of a protocol data unit. The tags or labels are used for high-performance packet forwarding of a packet or cell, respectively, through a router to the correct destination. The fields are the specific location of data within a record.

The protocol translator unit 315 performs the strip-off function by removing a section of the data from the beginning of the information element segment or in the middle of the information element segment. In addition to the strip-off function, the protocol translator unit 315 can also insert variable length spacing. Spacing is the act of reserving space in an information element segment in anticipation of encapsulation. The spacing can be inserted at the beginning for a new header or a new tag. The spacing can also be inserted in the middle of the information element for labels. By stripping-off (i.e. popping) and/or encapsulating (i.e., pushing) bytes within the information element segment, the protocol translator unit 315 is converting the protocol of the information element of a flow to another protocol.

The protocol translator unit 315 supports byte-level strip-off on a per flow basis. In this embodiment, the "pop-header offset" field ("POPOFF") in the PCI defines the offset that the protocol translator unit 315 uses for the starting point to strip off bytes from the packet. The "pop header length" field in the PCI defines the number of bytes to be stripped off by the protocol translator unit 315. Because the POPOFF and the "pop header length" field are byte boundary fields, the combination of offset and length can be over two thousands cases.

Encapsulation adds a certain number of bytes to a packet starting at a specified offset. For example, in the open systems interconnection ("OSI") seven layer model, an application header is encapsulated to the data in the application layer, and then in the presentation layer, a presentation header is encapsulated to the already encapsulated application header and data.

The encapsulation function is supported in the C-P mode, the P-C mode, and the P-P mode. A "push header length" field in the PCI specifies the number of bytes to be added to the packet. A "push header offset" field in the PCI defines the starting point where the bytes are to be added within the packet.

FIG. 11 shows an example of the embodiment of the protocol translator unit 315 performing the strip off and encapsulation functions on a packet in four clock cycles (each of the stages in the PCU pipeline 252 takes four clock cycles to complete) according to the present invention. In the first two clock cycles (i.e., clock cycle C0 and C1), the strip-off function is performed on the packet. In the last two clock cycles, the encapsulation function is performed on the packet. In FIG. 11, a packet 414 arrives at the protocol translator unit 315 of the EXE stage 260. The "strip offset" is specified in the POPOFF field of the PCI and is the starting point where the bytes are to be stripped off. The "strip off length" is defined by the "pop header length" field in the PCI and is the number of bytes to be stripped off from the packet. A packet 416 shows the packet with the number of bytes specified by "pop header length" removed. The data coming after the data which was stripped-off is moved forward by the "strip off length" ("forward" means moving from least significant bit ("LSB") to most significant bit ("MSB")). A packet 418 has the number of bytes specified by "encapsulation length" inserted starting at the "encapsulation offset" (the "encapsulation length" is specified by the "push header length" field in the PCI and the "encapsulation offset" is specified by the "push header offset" field in the PCI). The data coming after the "encapsulation offset" is moved backward by the "encapsulation length" as that number of bytes is added to the packet ("backward" means moving from MSB to LSB).

Figure 12:
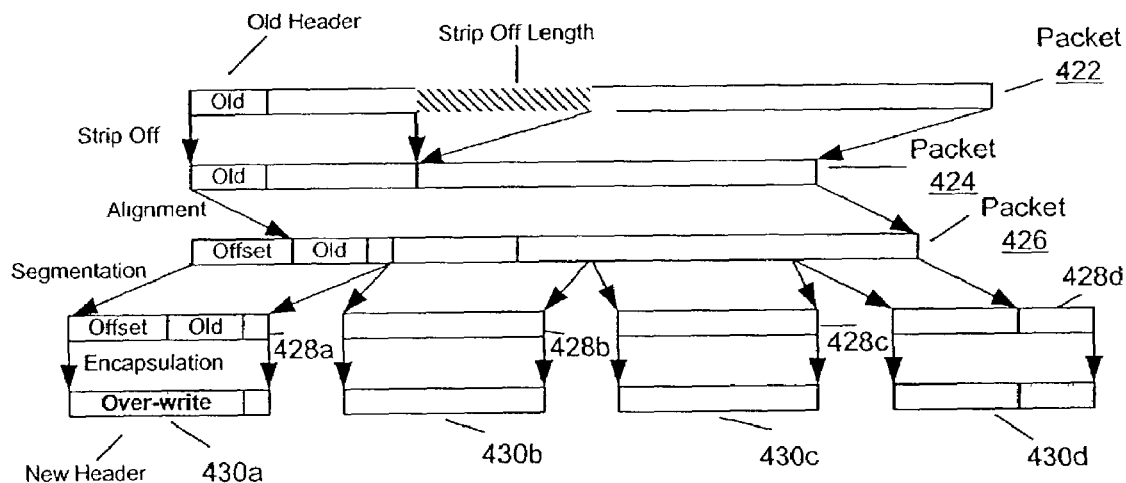
FIG. 12 shows an example of the embodiment of the protocol translator unit performing the strip-off, segmentation, and encapsulation functions to transform a MPLS packet to a non-MPLS ATM cell.

FIG. 12 shows an example of the embodiment of the protocol translator unit 315 performing the strip-off, segmentation, and encapsulation functions to transform a MPLS packet to a non-MPLS ATM cell. In FIG. 12, the number of bytes designated by "strip-off length" is removed from the top-most packet 422 in order to create a packet 424. An "offset" is added to the old header of packet 424 to create an aligned packet 426. This offset is added in anticipation of encapsulation. Segmentation occurs when the aligned packet 426 is divided into packet segments 428a, 428b, 428c, and 428d. The encapsulation function is performed on the packet segments 428a (the old header and the offset) by overwriting portions of the first segment with new header information to create a new encapsulated packet segments 430a (i.e., the header for the old protocol is overwritten and portions of segment 430a make-up the new header for the new protocol). By performing the packet header strip-off and encapsulation as instructed by the PCI, the protocol for this packet is changed from the MPLS protocol to the ATM protocol. The strip-off, segmentation, and encapsulation functions are performed by the protocol translator unit 315 and the alignment function is performed in the alignment pipeline 267.

Figure 13:
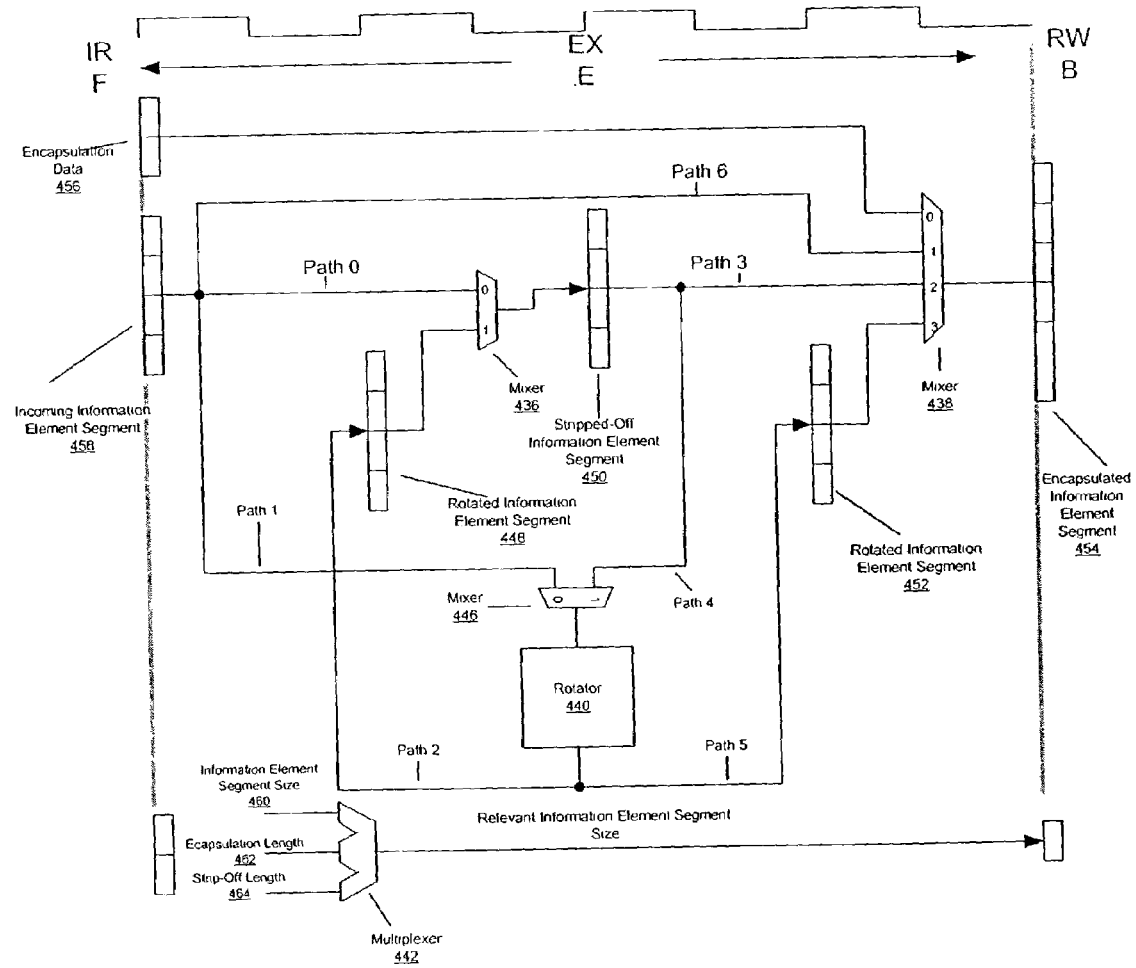
FIG. 13 is a block diagram of an embodiment of a strip-off and encapsulation engine within the protocol translator unit according to the present invention.

FIG. 13 is a block diagram of an embodiment of a strip-off and encapsulation engine 437 within the protocol translator unit 315 according to the present invention. In this embodiment, the inputs to the strip-off and encapsulation engine 437 are: (1) an incoming information element segment 458 arriving from the IRF stage 258; (2) an encapsulation data 456, specified in the PCI, that is to be inserted within the "information element segment"; (3) an information element segment size 460 that specifies the size (i.e., the number of bytes) of the incoming information element segment 458; (4) an encapsulation length 462 that specifies the number of bytes to be pushed (i.e., added) to the incoming information element segment 458; and (5) a "strip-off length" that specifies the number of bytes to be popped (i.e., removed) from the incoming information element segment 458. The incoming information element segment 458 is sent to a rotator 440 via a path 1. The rotator 440 rotates the incoming information element segment 458 forward by the strip-off length 464. This rotation produces a rotated information element segment 448 that travels through path 2. The rotated information element segment 448 and the incoming information element segment 458 are combined in the mixer 436 to produce a stripped-off information element segment 450. The stripped-off information element segment 450 is the original incoming information element segment 458 with the number of bytes specified by the strip-off length 464 removed (i.e., popped).

Figure 14:
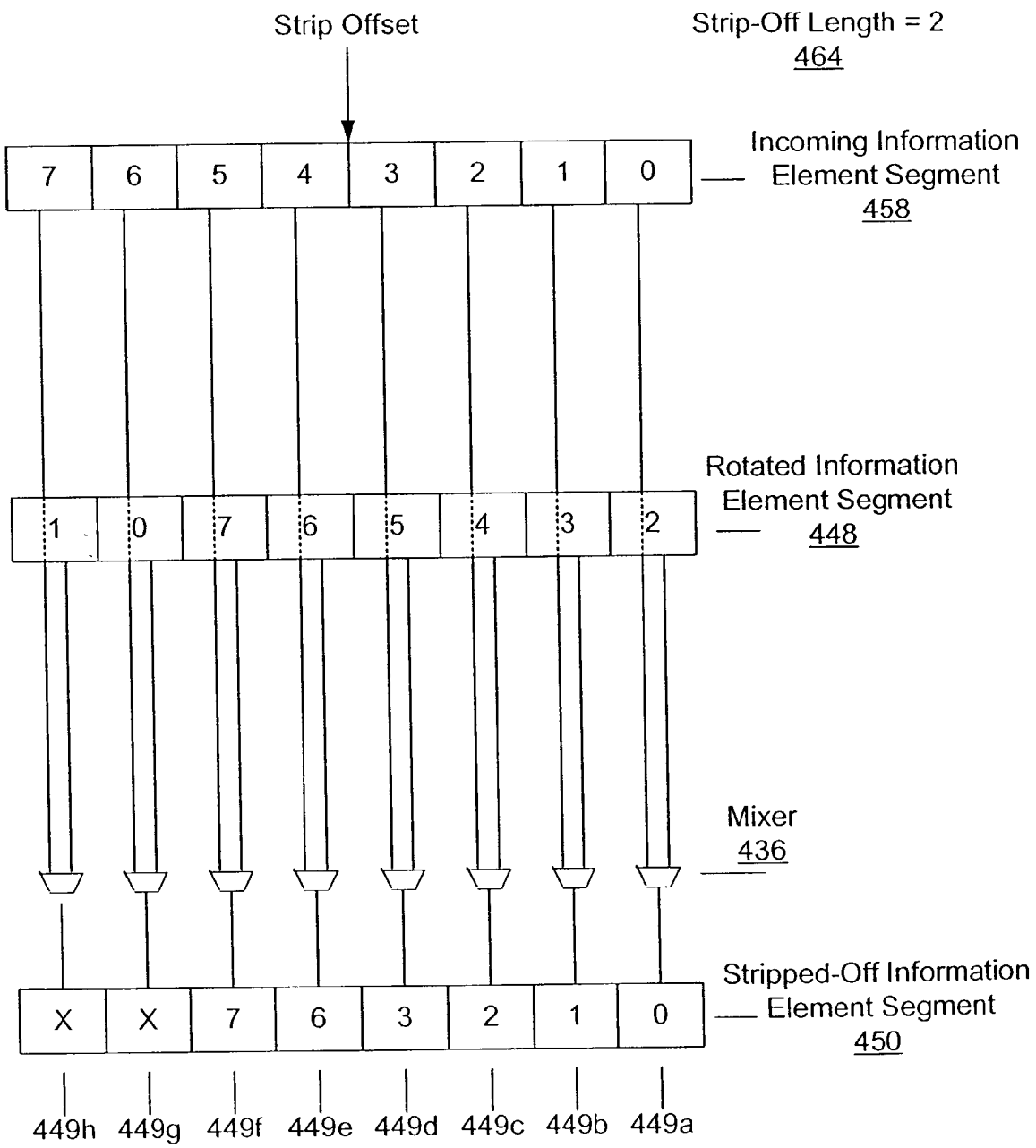
FIG. 14 shows a simplified bit-specific example of a rotator and a mixer operating to strip-off (i.e., pop) from the incoming information element the number of bits specified by the strip-off length.

FIG. 14 shows a simplified bit-specific example of the rotator 440 and the mixer 436 operating to strip-off (i.e., pop) from the incoming information element segment 458 the number of bits specified by the strip-off length 464. In this example, in order to remove the numbers "4" and "5" from the incoming information element segment 458, the "strip offset" is set to the address within the incoming information element segment 458 that is between "3" and "4", and the strip-off length 464 is set to two. The incoming information element segment 458 is rotated forward by two places (i.e., shifted to the right by two places) to produce the rotated information element segment 448. The mixer 436 then combines the incoming information element segment 458 with the rotated information element segment 448 in such a way to remove the numbers "4" and "5" to produce the stripped-off information element segment 450. To elaborate, for position 449a of the stripped-off information element segment 450, the mixer 436 selects "0" from the incoming information element segment 458. Similarly, for position 449b, the mixer 436 selects the "1" from the incoming information element segment 458. This continues where the values from the incoming information element segment 458 are selected (i.e., until the strip offset). After the strip offset, data from the rotated information element segment 448 are selected. At position 449e, in order to remove "4", the mixer 436 selects "6" from the rotated information element segment 448. In order to remove "5", the mixer 436 selects "7" from the rotated information element segment 448. The values in positions 449g and 449h of the stripped-off information element segment 450 are "don't cares" (the "don't cares" are denoted by "X"s) and are ignored since the new length of the stripped-off information element segment 450 is six bits (i.e., the original length of the incoming information element segment of eight bits minus the strip-off length of two bits).

Referring again to FIG. 13, the stripped-off information element segment 450 is sent to the mixer 438 through path 3 in order to be used for the encapsulation function. The stripped-off information element segment 450 is also sent to the rotator 440 via a path 4. The rotator 440 rotates the stripped-off information element segment 450 backward by the encapsulation length 462. This rotation produces a rotated information element segment 452 that travels through path 5 to the mixer 438. The mixer 438 combines the rotated information element segment 452 with the stripped-off information element segment 450 and the encapsulation data 456 stored in the PCI to produce an encapsulated information element segment 454. The encapsulated information element segment 454 is the stripped-off information element segment 450 with the encapsulation data 456 added (i.e., pushed). The length of the encapsulation data 456 is specified by the encapsulation length 462.

Figure 15:
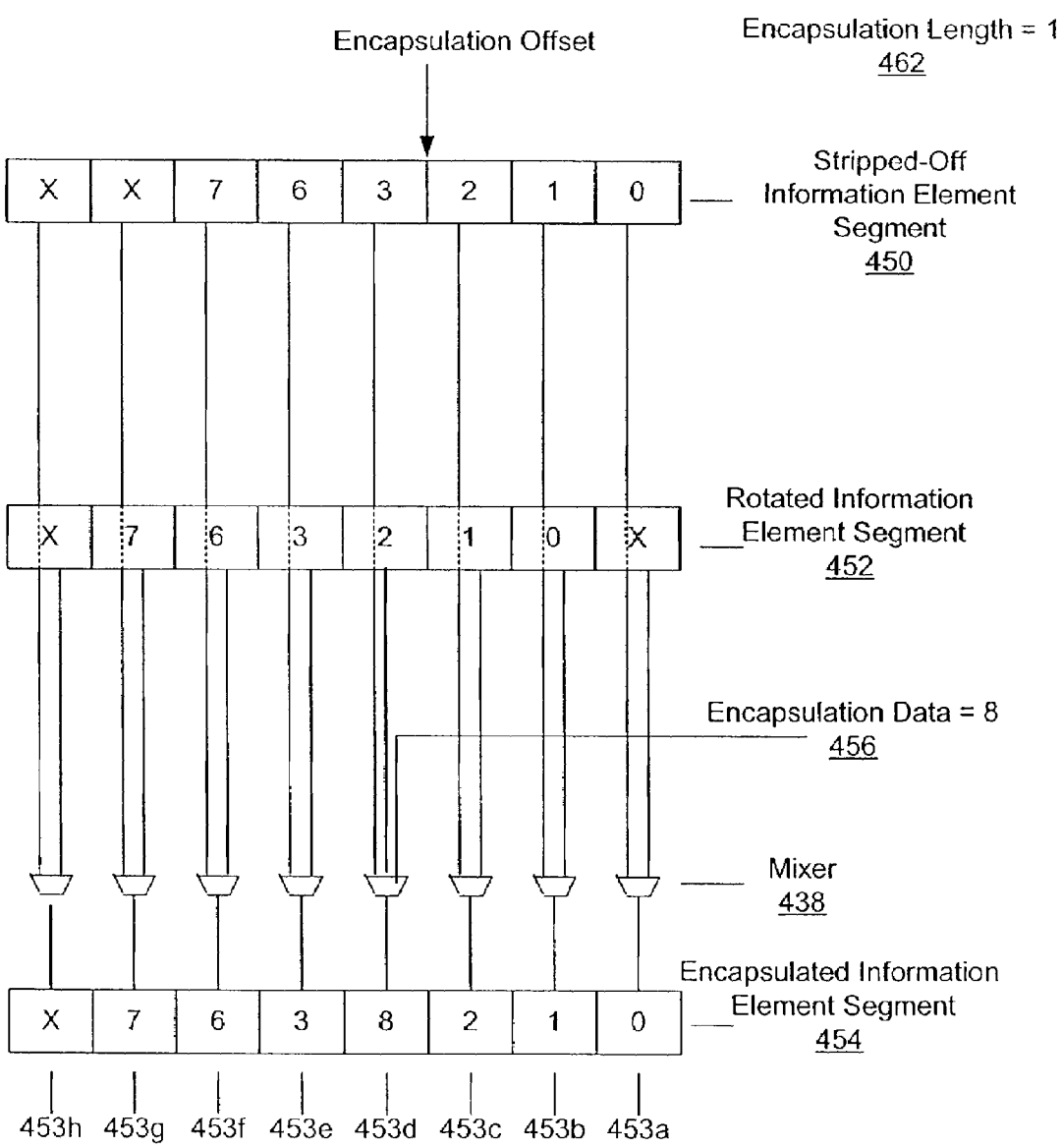
FIG. 15 shows a simplified bit-specific example of a rotator and a mixer operating to encapsulate (i.e., push) the encapsulated data into the stripped-off information element.

FIG. 15 shows a simplified bit-specific example of the rotator 440 and the mixer 438 operating to encapsulate (i.e., push) the encapsulated data 456 into the stripped-off information element segment 450. In this example, in order to insert "8" (i.e., the encapsulation data 456) into the stripped-off information element segment 450 between "2" and "3", the "encapsulation offset" is set to the address within the stripped-off information element segment 450 that is between "2" and "3" and the encapsulation length 462 is set to one. The stripped-off information element segment 450 is rotated backward by one place (i.e., shifted to the left by one place) to produce the rotated information element segment 452. The mixer 438 then combines the stripped-off information element segment 450 with the rotated information element segment 452 and the encapsulation data 456 in such a way as to add the number "8" to produce the encapsulated information element segment 454.

To elaborate, for position 453a of the encapsulated information element segment 454, the mixer 438 selects the "0" from the stripped-off information element segment 450. Similarly, for position 453b and 453c, the mixer 438 selects the "1" and the "2" respectively from the stripped-off information element segment 450. Thus, until the encapsulation offset point, the mixer 438 selects data from stripped-off information element segment. After the encapsulation offset point, the mixer selects encapsulation data for positions for which encapsulation data is available. Otherwise, the mixer 438 selects data from the rotated information element segment. For position 453d, in order to insert the "8" into the encapsulated information element segment 454, the mixer 438 selects the "8" as the value of position 453d. For positions 453e, 453f, and 453g, the mixer 438 selects the "3", "6", and "7" respectively from the rotated information element segment 452. The position 453h is a "don't care" and is ignored. The new length of the encapsulated information element segment 454 is seven bits (i.e., the length of the stripped-off information element segment of six bits plus the encapsulation length of one bit).

Referring again to FIG. 13, the encapsulation function can be performed without performing the strip-off function. In this case, the incoming information element segment 458 travels through paths 0, 4, and 5, and the rotator 440 rotates backward this information element segment by the number of places specified by the encapsulation length 462. The rotated information element segment 452 travels through path 5 to the mixer 438. The mixer 438 also uses the incoming information element segment traveling through path 6 and the encapsulation data 456 to produce the encapsulated information element segment 454.

Figure 16:
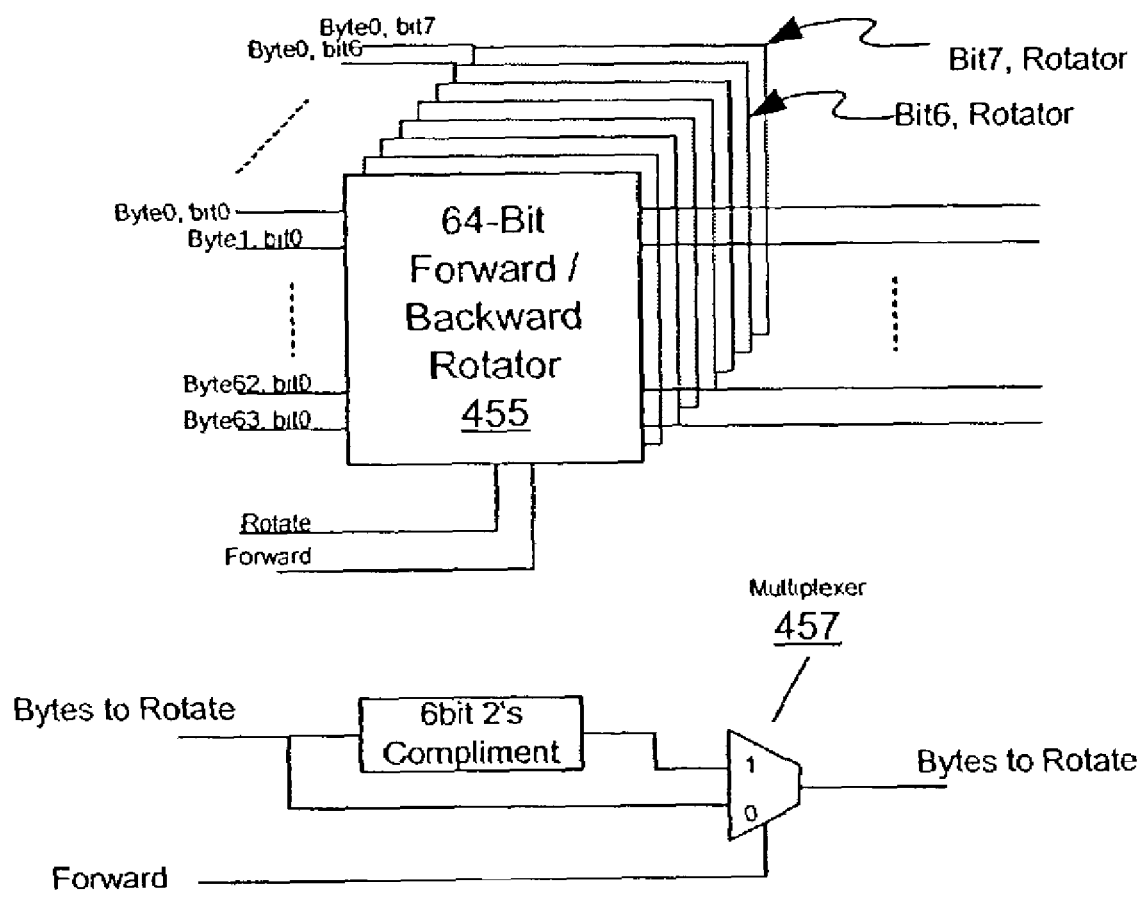
FIG. 16 shows a block diagram of an embodiment of the rotator according to the present invention.

FIG. 16 shows a block diagram of an embodiment of the rotator 440 according to the present invention. In this embodiment, the rotator 440 is a 64-byte rotator in order to rotate the 64-byte information element segments coming into the PCU pipeline 252. The rotator 440 includes eight 64-bit forward/backward rotators 455 that together rotate the 64 bytes. Each of the 64-bit forward/backward rotators 455 rotates one of eight bits that comprise a byte. In this way the bits of the 64-byte information element segment are "bit sliced." For example, in this embodiment, all 64 of the bit 0s are rotated together, all 64 of the bit 1s are rotated together, and continuing in this manner, finally, all 64 of the bit 7s are rotated together. The input "rotate" specifies the number of bytes that the 64-byte segment should be rotated. The input "forward" specifies whether the bytes are rotated forward or backward. Both of these are input into the multiplexer 457. If forward rotation is to occur then the number of bytes to be rotated is output in the 2's complement form. For example, if seven bytes are to be backward rotated, then the output of the multiplexer 457 is seven. If, however, seven bytes are to be forward rotated, then the output of the multiplexer 457 is fifty-seven.

f. Aging Support Unit

The network processor provides a recently used bitmap of 64K flows to support an external processor (i.e., a processor other than a network processor) in order to perform an efficient aging mechanism. At any one time, up to 64K flows can be open. When an EOP is received for a particular flow, that flow is closed. If the EOP is not received within a particular time period, an aging mechanism 490 closes the flow and another flow is supported. When the aging mechanism 490 closes the flow because the EOP was not received, the buffers assigned to that flow are deallocated and assigned to the newly supported flow. The aging mechanism 490 is located within the aging support unit 307 of the EXE stage 260.

Figure 17:
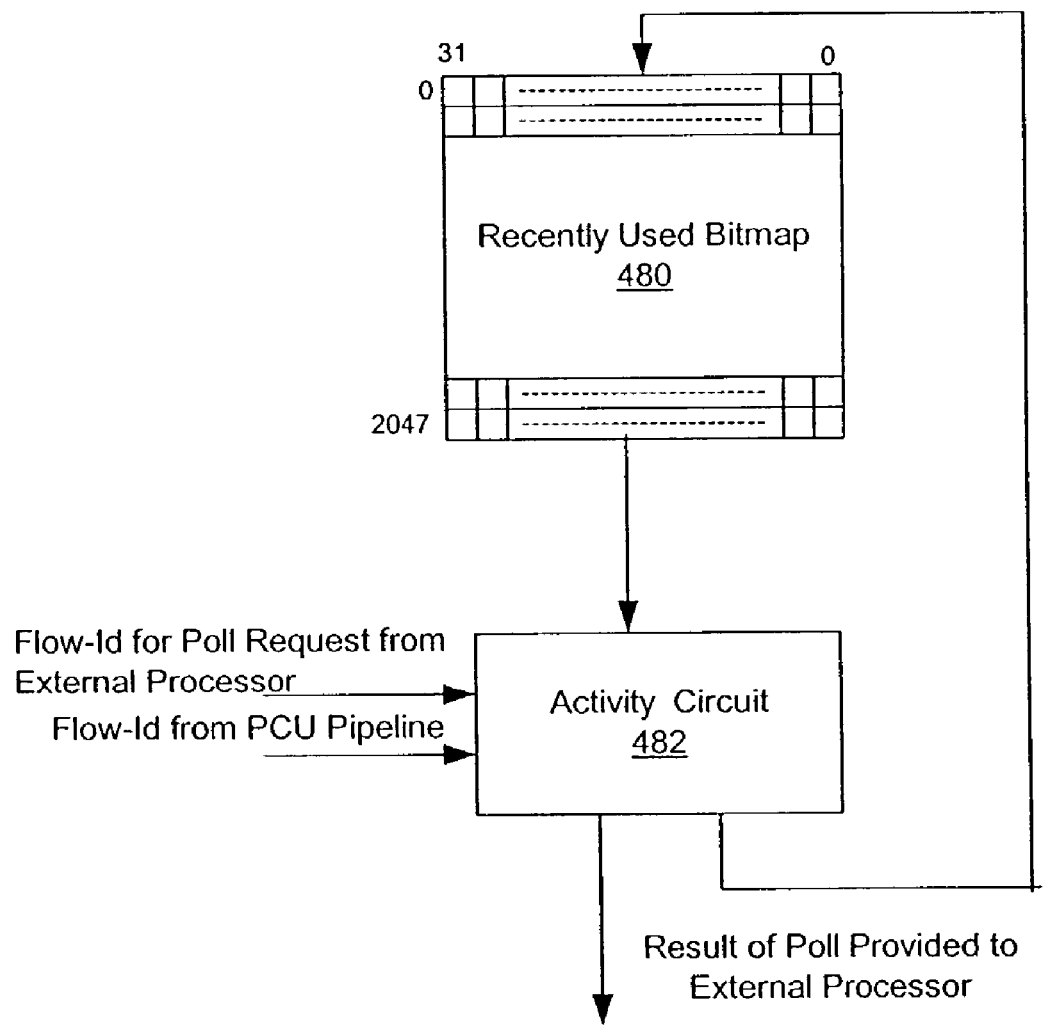
FIG. 17 shows a block diagram of an embodiment of the aging mechanism according to the present invention.

FIG. 17 shows a block diagram of an embodiment of the aging mechanism 490 according to the present invention. The aging mechanism 490 includes a recently used bitmap 480. In this embodiment, the recently used bitmap 480 is organized as 2K by 32-bit bitmap. Each bit indicates whether the flow corresponding to that bit had any activity (e.g., received a packet or cell) for a certain time period. The 2 k rows of the recently used bitmap 480 are accessed using the eleven most significant bits of a 16-bit flow-ID. The flow-ID is a value that uniquely identifies a flow. The least significant five bits of the flow-ID are used to index into one of the 32 bits of a row. By configuring the bitmap as a 2K by 32-bit array, the external processor can process up to 32 flows per access of the recently used bitmap 480 and thus conserve bandwidth (i.e., during each access of the recently used bitmap 480, 32-bits are read and these 32-bits provide information for 32 different flows).

Each time an information element arrives from a given flow, the bit corresponding to this flow-ID in the recently used bitmap 480 is set to one. This value will remain set until the external processor reads the entry (i.e., the external processor polls to determine if a particular flow had any activity for a certain time period). In order to read the entry, using the most significant eleven bits of the flow-ID, the external processor accesses the row of bits that includes the entry (i.e., the entry is the particular bit corresponding to the flow). After reading the entry corresponding to the particular flow, all 32-bits of that row are reset to zero (clear on read entry).

An activity circuit 482 has the following two inputs: (1) a poll from an external processor, and (2) a flow-ID identifying a particular flow (the flow-ID is passed through the stages of the PCU pipeline 252). As for (1), the poll occurs when the external processor wants to determine if any activity occurred for a particular flow (e.g., the activity may be that an information element from the flow was received) by reading from the recently used bitmap 480 the bit corresponding to that flow. As for (2), whenever an information element of a flow is received (i.e., goes through the PCU pipeline 252), the bit corresponding to that flow in the recently used bitmap 480 is set to "1" and this updating process is initiated by sending the flow-ID corresponding to that flow to the activity circuit 482.

If the input to the activity circuit 482 is the poll from the external processor, then the activity circuit 482 reads a row of bits from the recently used bitmap 480 using the most significant eleven bits of the flow-ID. This row of bits is then output to the external processor and the activity circuit 482 then resets all of the bits in this row to a value to indicate no activity (e.g., reset to the value "0") and writes the reset row of bits back to the recently used bitmap 480. If the operation, however, is to update the recently used bitmap 480 because an information element from a flow arrived, then the flow-ID of that information element is used to read a row of bits from the recently used bitmap 480. The bit corresponding to the flow to which the information element belongs is set to a value to indicate activity (e.g., set to the value "1"). None of the other bits in the row corresponding to other flows are modified (i.e., the value of the other bits in the row remain the same). After the particular bit in the row is updated, the updated row of bits is written back to the recently used bitmap 480.

Figure 18:
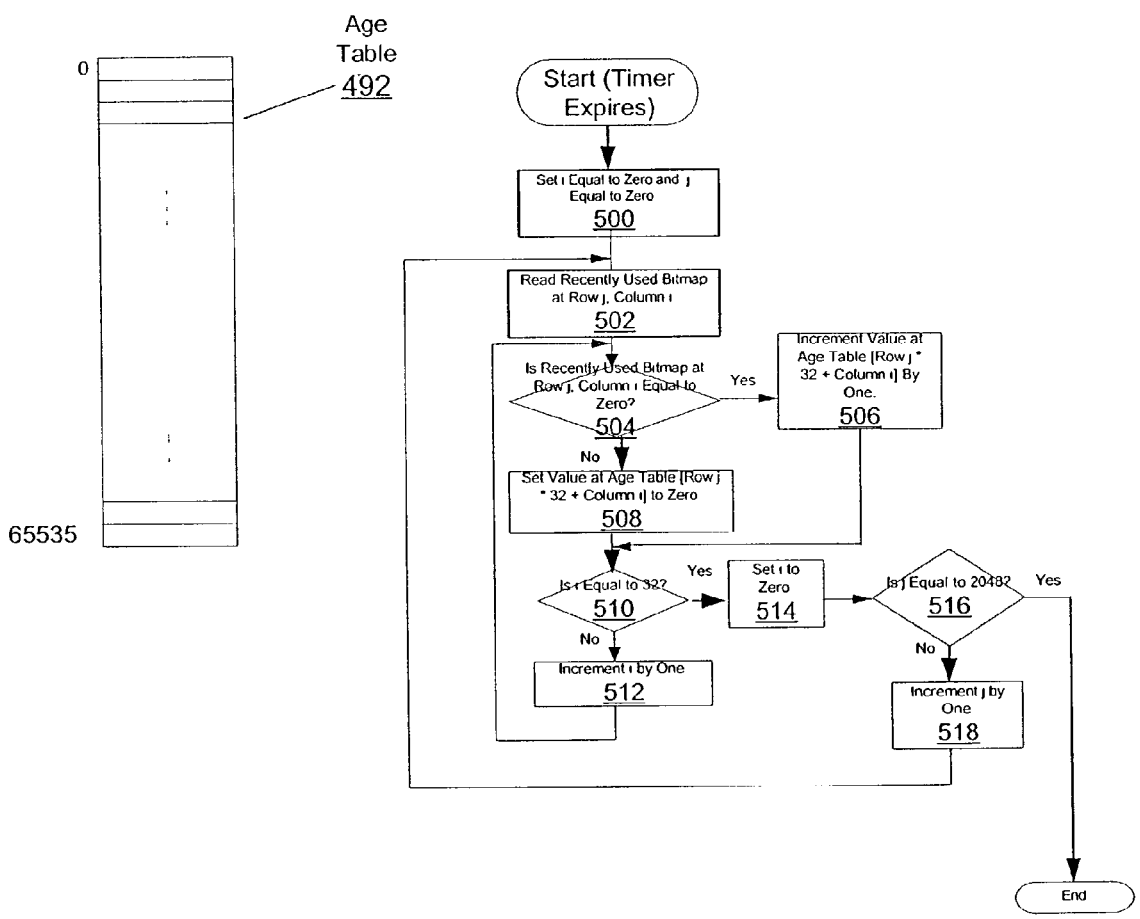
FIG. 18 shows an embodiment of an age table and a process for updating it according to the present invention.

FIG. 18 shows an embodiment of an age table 492 and a process for updating it according to the present invention. In this embodiment, the age table 492 is maintained by the external processor and is represented by an array having 64K entries—one entry for each of the possible 64K flows supported. Upon the expiration of a timer, the external processor polls the recently used bitmap 480 to determine if a group or all of the flows had any activity. If a particular flow did not have any activity during this time period, then the entry in the age table 492 corresponding to the particular flow is incremented by one. If a flow did have activity during the time period, then the entry corresponding to that flow is reset to "0". In this way, if buffers are unavailable, then, if appropriate, buffers can be deallocated from the flow having the largest value in its entry in the age table 492.

In FIG. 18, the flowchart starts upon the expiration of a timer. The expiration of the timer results in the reading of one row of entries (i.e., 32-bits) or all the entries in the 2K by 32-bit recently used bitmap 480. FIG. 18 shows the method for reading all the entries in the recently used bitmap 480; the method for reading just one row of the recently used bitmap 480 is similar but the value of "j" is set to the appropriate row number and the method completes upon the value of "i" reaching 32. Referring to FIG. 18, in step 500, the values of indexes "i" and "j" are set to zero in order to traverse through all the entries of the recently used bitmap 480 starting at row 0, column 0 (i.e., the initial position of the top-most row and the right-most column). In step 502, row column i of the recently used bitmap 480 is read. In step 504, it is determined if the value at row j, column i of the recently used bitmap 480 is equal to zero. If the value is equal to zero, then in step 506, the value at entry (row j*32+column i) of the age table 492 is incremented by one. By incrementing this value by one, it indicates that another time period passed without any activity for this particular flow. If the value at row j, column i of the recently used bitmap is not equal to zero, then in step 508, the value at entry (row j*32+column i) of the age table 492 is reset to zero. By resetting this value to zero, it indicates that the flow had activity (e.g., an information element for the flow was received) within the polling time period and is thus a bad candidate for deallocation of its buffers. In step 510, it is determined if the index "i" is equal to 32 (i.e., has the last column of the row in the recently used bitmap 480 been read). If "i" is not equal to 32, then in step 512, the value of "i" is incremented by one. Then, the method returns to step 504 to determine if the value at row j, column i of the recently used bitmap 480 is equal to zero. If "i" is equal to 32, then in step 514, "i" is set to zero in order to read the first column of the next row. In step 516, it is determined if the index "j" is equal to 2048. If "j" is equal to 2048, then all the values of the recently used bitmap 480 have been read and the method is completed. If "j" is not equal to 2048, then in step 518, "j" is incremented by one and the method returns to step 502 in order to read row j of the recently used bitmap 480.

Using the recently used bitmap 480 within the network processor, an external processor can accumulate the age of flows at a certain rate (using the timer and poll upon expiration of the timer). The external processor can close a flow (i.e., deallocate buffers to a flow) using a configured threshold or sort the ages of all the flows to easily find the least recently used flows. When new flows arrive, the external processor can traverse down the age table 492 arranged by least recently used and deallocate buffers assigned to least recently used flows and reassign them to the newly arriving flows.

g. Rejection and Discard Unit

The buffers that store the information elements (e.g., packets and cells) may be rejected and discarded by the PCU 250 for a number of reasons. Reasons for rejecting and discarding buffers include: (1) the PCU 250 may discard the buffers upon the aging mechanism 490 closing a flow resulting in the deallocation of buffers assigned to that flow; (2) an error in the data stored in a buffer may result in that buffer being discarded (in the case of packet mode, all the buffers corresponding to the packet are discarded); (3) buffers may be discarded due to filtering (e.g., even though there is no data error, buffers belonging to a subscriber are discarded due to the subscriber's failure to pay the subscription fee); and (4) congestion can cause buffers to be discarded (e.g., a resource downstream may not be working properly causing buffers destined for this resource to be discarded).

As used herein the term "buffer" refer to either a memory unit for storing data or data stored in the memory unit. Those skilled in the art can discern whether the term is used to mean memory unit or data stored in the memory unit by considering the context in which the term is used.

The PCU 250 divides the information elements into buffers and stores these buffers in the DBU 292. The PCU 250 marks whether these buffers should be discarded using, for example, a packet discard ("PDIS") bit located in the header of the buffer. The PDIS bit indicates whether the whole packet should be discarded while a PPD bit indicates whether a partial portion of the packets should be discarded. The FPU, if the buffer is to be discarded (e.g., whether the buffer is to be discarded is indicated by setting the PDIS bit to "1"), recycles and returns the buffer back to the buffer management unit (the BMU 284).

Each information element may be divided into buffers designated as SOP, middle of packet ("MOP"), and EOP. A buffer may be designated as both SOP and EOP. Several buffers may be designated as MOPs. The table below lists the various types of errors at the SOP, MOP, and EOP causing the PCU 250 to discard buffers.

| Ingress | SOP | MOP | EOP |
|---|---|---|---|
| Packet | Input data error (e.g., packet has data error) CAM miss (i.e., cannot associate a flow-ID with the packet) Previous packet missing EOP TTL as defined by the header WRED Egress LINK Fail (e.g., a link from an output port in the FPU failed) | Input data error Missing SOP, no flow-ID association, i.e., CAM miss Oversized (i.e., the received packet length is larger than the maximum transfer unit) WRED Egress LINK Fail | Input data error Miss SOP, no flow-ID association, i.e., CAM miss Egress LINK Fail |
| Cell | Input data error ATM header error check (checks correctness of the header information) Policing (e.g., buffers belonging to a particular user are discarded if they violate negotiated connection with the service provider) WRED Egress LINK Fail | Input data error Header Error Check ("HEC") Policing WRED Oversized Egress LINK Fail | Input data error HEC Policing WRED CRC Egress LINK Fail |

The PCU 250 performs different actions when processing the above conditions. The following describes the handling of the discard conditions for the store-and-forward mode and the cut-through mode of operation. In the cut-through mode, the PCU 250 writes a buffer to the DBU 292 upon the filling of the buffer with data. In the store-and-forward mode, the PCU 250 writes the buffers of a packet to the DBU 292 only after all the buffers of the packet are filled with data.

Discard in the Store-and-Forward Mode

When a flow is programmed in the store-and-forward mode, the PCU 250 executes the discard function based on the following principles:

Packet mode (i.e., ingress or egress of the C-P, P-P, and P-C modes),

The PCU 250 discards at packet level regardless of the setting of the PPD.

When SOP-SOP (i.e., another SOP is received without receiving an EOP for the first SOP), the PCU 250 terminates the previous packets as PPD, and starts a new packet. The PCU 250 inserts a pipeline bubble in order to terminate the previous packet with the PDIS bit set in the packet header of the first buffer of this packet. Setting the PDIS bit in the packet header informs the FPU not to output the packet, but rather, to recycle the buffers assigned to the packet.

In the case that MOP is accepted without SOP, the flow-ID is ambiguous and the PCU 250 drops the packet from the logical port. This condition happens when the packet is interleaved at the logical port level.

In C-C mode with the PPD not set

In the C-C mode, the PCU 250 only discards those cells that are violating the policer parameters. The PCU 250 still accepts subsequent cells belonging to the same packet if no violation is committed (i.e., the cell is conforming).

In C-C mode with the PPD set,

When the discard conditions occur, the PCU 250 terminates the packets by setting the PDIS bit in the packet header of the first buffer of the current packet.

The PCU 250 keeps dropping cells or packet segments belonging to the discarded packet until the EOP segment arrives.

The PCU 250 does not write the EOP cell or packet segment to the buffer memory. The PCU 250 writes into the packet ready queue ("PRQ") at the arrival of the EOP.

The PCU 250 does not pop and push the UBR deferred buffer if the discarded flow is an UBR flow. The UBR service category falls into the store-and-forward category.

In C-C mode with WRED and oversized drop,

The PCU 250 handles the drop as if the PPD function is turned on regardless of the value of the PPD field.

Discard in Cut-Through Mode

When a flow is programmed in the cut-through mode, the PCU 250 executes the discard function based on the following principles:

If the ingress or egress is in the packet mode, the PCU 250 discards the packet segments without asserting a PRQ signal until the arrival of the EOP. The PCU 250, by asserting the PRQ signal, transfers control of packets or cells to the FPU. The PCU 250 writes a PRQ entry without any write to the DBU 292. The PCU 250 does not update the packet header of the discarded packets.

If C-C mode and PPD set,
 The PCU 250 discards (does not write into the buffer memory) the cells until the arrival of the EOP. The PCU 250 writes the EOP cell into the buffer memory and asserts the PRQ.
If C-C mode and PPD not set,
 The PCU 250 only drops the cells committing traffic violations.
If cell mode and WRED drop,
 The PCU drops the next packet.
If cell mode and oversized packet,
 The PCU handles the drop as if the PPD function is turned on regardless of the value of the PPD field.

Logical Port Based Packet Discard

The packet discard function happens when the flow attribute is identified. In the PCS, there are fields for the PCU 250 to delineate packets in order to discard the packet accurately. Errors may occur in the SOP and the PCU 250 may not get reliable flow-ID information. The PCU 250 discards packets based on the Logical Port Association.

When such a condition happens, the PCU 250 writes a NULL for the associated Logical Port in the flow-ID cache. For packet segments that follow, the PCU 250 accesses the flow-ID cache, finds a NULL entry for that flow, and drops the packet segments until the arrival of the EOP segment. When the next SOP arrives without error, the PCU 250 writes a valid flow-ID to the flow-ID cache.

6. The RWB Stage

The RWB stage 262 performs two primary operations: (1) updating the PCS if the PCS was modified in the EXE stage 260, and (2) aligning the data. When updating the PCS for a flow, two different cases due to resource conflicts may arise. First, the PCS was modified in the EXE stage 260 but has not entered the RWB stage 262, and second, the PCS was modified in the EXE stage 260 and the RWB stage 262 has not yet written the modified PCS to the PCS memory 274. In both cases, the modified PCS, rather than the PCS fetched from the PCS memory 274 (in the IRF stage 258), should be used by an information element from the same flow that enters the PCU pipeline 252 at a later time.

Figure 19:
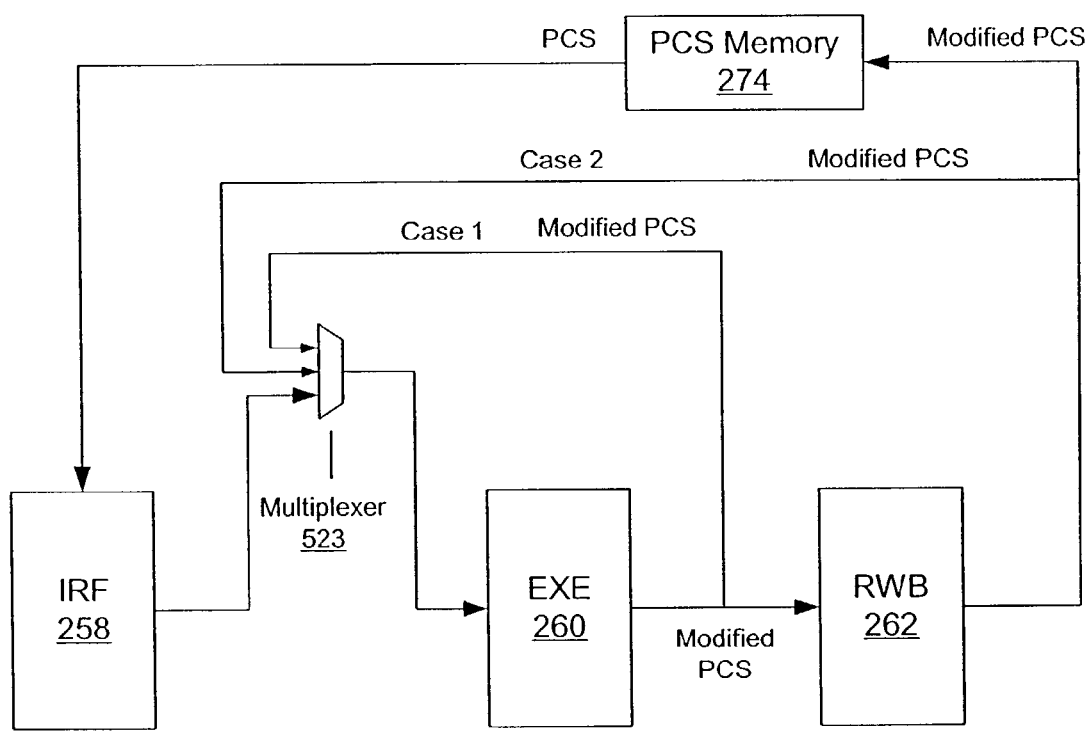
FIG. 19 shows a policy control state ("PCS") access system according to an embodiment of the present invention.

FIG. 19 shows a PCS access system 522 according to an embodiment of the present invention. If PCS of an incoming information element is not currently being modified in the EXE stage 260 or the RWB stage 262, then the multiplexer 523 selects as its output the PCS fetched from a PCS memory 274 during the IRF stage 258. FIG. 19 also shows examples of the two different cases described earlier. For case 1, if the information element's PCS was modified in the EXE stage 260 but has not yet been written back to the PCS memory 274, then the multiplexer 523 selects as its output this modified PCS. For cases 2, if the information element's PCS was modified and the RWB stage 262 has sent the modified PCS for writing to PCS memory 274 but it has not yet been written, then the multiplexer 523 selects as its output this modified PCS.

The information elements arriving at the PCU pipeline 252 may not be of fixed size (e.g., packets have varying lengths). In order to more efficiently process data, the incoming information elements are stored in fixed size buffers. The RWB stage 262 aligns (i.e., packs) the information element to either a 64-byte buffer or a 128-byte buffer. The RWB stage 262 performs alignment in the C-C mode and the C-P mode. If the arriving information element is aligned with the fixed size buffer (e.g., if the information element is an ATM cell having 53 bytes, then the cell is aligned with the 64-byte or 128-byte fixed size buffer because there is adequate space in the fixed size buffer), then the RWB stage 262 writes the data into memory via the DBU 292. If, however, the arriving information element is not aligned with the fixed size buffer (e.g., if the information element is a 80-byte packet, then the packet cannot fit into a 64-byte buffer), then the information element is sent to the alignment pipeline 267 for alignment with the fixed size buffer.

a. PRQ Preparation

Cut-Through Mode

When operating in the cut-through mode, the PCU 250 asserts the PRQ signal after each buffer is written to the DBU 292. By asserting the PRQ signal, the PCU 250 is relinquishing control to the FPU of the buffer written to the DBU 292. In this mode, the PCU 250 assumes that buffers sent over to the FPU might be consumed right away. Under such a condition, the PCU 250 can discard the packet by marking a PDIS field in the packet header of the first buffer of the packet. In the cut-through mode, packets and cells that have errors and are non-conforming are not filtered out by the PCU 250. The PCU 250 marks a packet for discarding by setting the PDIS field in the packet header of the first buffer and the FPU does the actual filtering by not outputting the buffers of the packet. Rather, the FPU allows the memory management unit to recycle the buffers of the packet. The PCU 250 itself does not discard packets and this is done to comply with applications sensitive to latency delay. Because, the PRQ signal is asserted after the buffer is written to the DBU 292, timing characteristics (i.e., the time difference between the reception of packets) are preserved while passing the packet through the network processor. Marking of packets for discarding is not the only action that PCU 250 performs for packets that have errors and are non-conforming. The PCU 250 may also mark incoming packets with tags (e.g., the packet has as a tag the color red which may mean that the packet is to be discarded).

Store-and-Forward

When operating in the store-and-forward mode, the PCU 250 asserts the PRQ signal to the FPU only after the EOP arrives (i.e., the PRQ signal is asserted only after all of the buffers of the packet have been written to the DBU 292). In this mode, the PCU 250 has the entire view of the packet as the PCU 250 only relinquishes control of the packet by asserting the PRQ signal only after the entire packet is received. When incoming packets have errors or are violating the QoS parameters, the PCU 250 may perform discard or marking operations on the packet. When discarding a packet, the PCU 250 sets the PDIS bit in the packet header of the first buffer of the packet when the PCU 250 detects problems with the packet. Once the PDIS bit is set, the FPU recycles the buffers used by the packet using the memory management unit; the buffers belonging to the discarded packet are not output by the FPU.

Egress Port Based UBR

The PCU 250 handles UBR differently than the handling of the other service categories (e.g., CBR and VBR). The main difference is that with UBR, the last buffer and the assertion of the PRQ signal are deferred until arrival of the next EOP destined for the same egress physical port. The PCU 250 keeps a copy of the PRQ information in the deferred buffer.

Terminations Due to Errors

Errors cause the PCU 250 to terminate the packet early. The PCU 250 uses the following principles:

Cut-through mode: The PCU 250 terminates the packet with a fake EOP in the PRQ command. The PCU 250 drops the subsequent cells or packet segments belonging to the same packet. The FPU still sends the packet out with premature termination by the PCU 250. A downstream store-and-forward network device would detect and filter the packet. In the worst-case scenario, the end node will drop the packet.

Store-and-forward mode: The PCU 250 terminates the packet with a fake EOP in the PRQ command and updates the packet buffer header with the PDIS bit set. In this case, the PRQ entry is a fake EOP in the PRQ command and the DBU 292 write command writes a 8-byte packet header to the first buffer of the packet with the PDIS bit set. When walking through the chains, the FPU is able to filter-out (i.e., remove) the packets with the PDIS bit set.

7. The DEF Stage

Due to the dynamic multiplexing nature of the incoming flows, the PCU 250 may build hundreds or thousands of information segment storage unit chains simultaneously for different flows and physical output ports. Each flow is handled as an independent process. Depending on the service categories of the flow, these buffer chains may belong to service types like CBR, VBR, generated frame rate ("GFR"), or UBR in cell mode (i.e., the service types CBR, VBR, GFR, and UBR are applicable when the egress is cells). In packet mode, buffer chains are chained together based on the flow-ID.

In cell mode (i.e., the egress is cells), for the non-UBR service categories, the PCU 250 creates the buffer chain based on the flow-ID. Buffers belonging to the same flow are linked together. The TPU schedules and the FPU transmits the buffers based on the configured traffic parameters of each flow.

For the UBR mode, a traffic contract does not apply (i.e., with UBR, no data rate is guaranteed, rather, a "best effort" data rate occurs meaning that the data rate depends on available time slots for the port). Usually, the UBR buffers are sent out whenever there is an idle slot available on a specific port that none of the other service categories such as CBR, VBR, or GFR is demanding. Since no parameters are committed for UBR service (i.e., no data rate is guaranteed), the network processor uses non-scheduled links (or queues) to service the UBR traffic in order to save precious resources for scheduling CBR and VBR traffic. In the UBR mode, the PCU 250 does not create the buffer chain on a per flow basis. Instead, all UBR buffers are linked on a per egress physical port basis. The FPU transmits the UBR information elements based on the availability of each output port. It is the DEF stage 264's responsibility to create the output port based chain (e.g., the chain may be in the form of a linked list) for the UBR mode.

For non-UBR mode, each buffer has a pointer that points to a next buffer if one exists. Upon the arrival of an information element segment, the PCU 250 fills up a current buffer with the data in the information element segment and the PCU 250 allocates a next buffer and a pointer in the header of the current buffer is made to point to this next buffer. This approach is appropriate for flow-based chains (i.e., this approach is appropriate for creating non-UBR chains). When the EOP for the current information element is received, the arrival time of the next information element segment is unknown. Even though the next information element is unknown, because all information element segments in a chain belong to the same flow and the same process in the non-UBR mode, the PCU 250 can allocate a buffer for the first information element segment of the next information element and write this new buffer pointer into the header of the last buffer (i.e., the EOP buffer) for the current information element.

For the UBR mode, however, a different scheme is used to build the chain to account for the fact that multiple flows may target the same output port. In the UBR mode, the next information element in the buffer chain might belong to another flow. The identity of the first information element segment of the next information element is not available to the current buffer. This information is not available until the next EOP arrives. In UBR mode, a single chain is created by deferring the write-back of the last buffer (i.e., the EOP buffer) of the previous UBR information element until the EOP buffer of the next UBR information element is known.

Since the pointer to the next buffer resides in the header of each buffer, the last buffer of the current information element should include the pointer to the first buffer of the next information element. The pointer to the first buffer of the next information element may not be known by the time the current buffer is received since it may be from another flow. In the UBR mode, the PCU 250 writes the EOP buffer of the current information element into a temporary storage, e.g., a port-based deferred EOP buffer of the last UBR information element segment for various flows. When the EOP buffer of the next information element destined for that port is known, then the EOP buffer of the current information element which is stored in the deferred last buffer is removed and the header of this last buffer points to the first buffer of the next information element. The EOP buffer of the next information element is then stored in the deferred last buffer. The EOP buffer previously stored in the deferred last buffer is then written into the chain for the output port via the DBU 292. Because the PCU 250 is a single pipeline processor (i.e., only one packet or cell is processed at one time), there is only one information element reaching the end of packet status at any pipeline time slot. There is no concern about multiple flows updating the deferred last buffer for a port at the same time.

Figure 20:
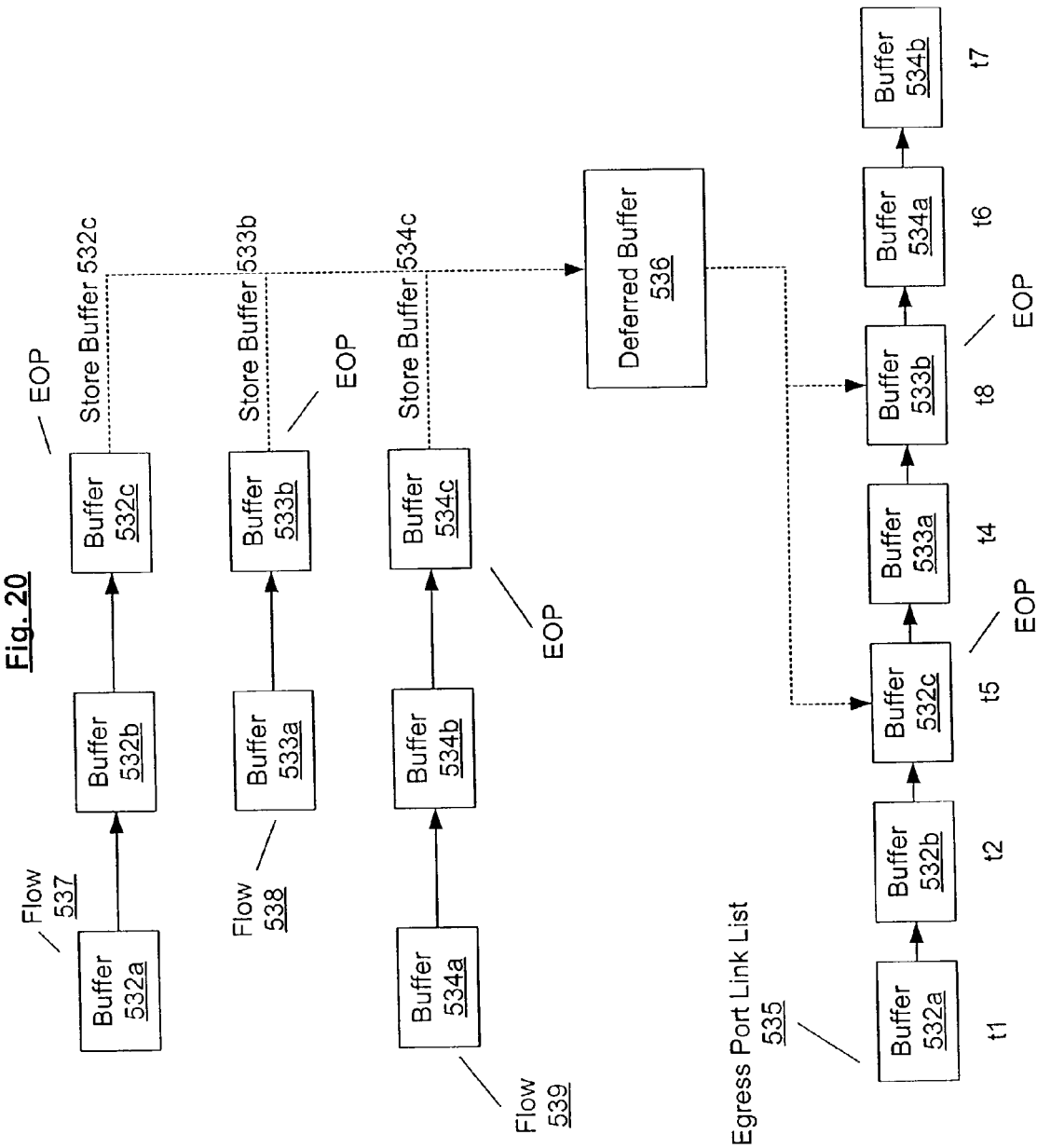
FIG. 20 shows an example of how an embodiment of the deferred write back ("DEF") stage operates according to the present invention.

FIG. 20 shows an example of how an embodiment of the DEF stage 264 operates according to the present invention. In FIG. 20, when operating in UBR mode, a flow 537 includes a buffer 532a, a buffer 532b, and a buffer 532c all of which comprise an information element. The buffer 532c signals the EOP (i.e., the last segment of this information element). Another flow 538 includes a buffer 533a and a buffer 533b both of which comprise another information element. The buffer 533b signals the EOP. A third flow 539 includes a buffer 534a, a buffer 534b, and a buffer 534c all of which comprise another information element. The buffer 534c signals the EOP. The flows 537, 538, and 539 are destined for the same egress physical output port. For this egress output port, a egress port chain, e.g., egress port link list 535 is created.

At time t1, the buffer 532a arrives from the RWB stage 262. The DEF stage 264 writes the buffer 532a to the egress port link list 535 via the DBU 292. At time t2, the buffer 532b arrives and this buffer is written to the egress port link list 535 via the DBU 292 and linked (i.e., connected) to buffer 532a. At time t3, the buffer 532c which signals the EOP arrives. This buffer is stored in a deferred buffer 536 rather than linked to the egress port link list 535 since the DEF stage 264 does not know to which flow the next information element that will receive its EOP belongs (i.e., the DEF stage 264 does not know the next information element that should be linked to the current information element). At time t4, the buffer 533a of the flow 538 arrives.

The DEF stage 264 writes this buffer to the egress port link list 535 but it is not linked to any other buffers. At time t5, the buffer 533b arrives. This buffer signals an EOP. Therefore, at time t5, the first buffer of the next-to-arrive information element is known and thus the EOP buffer of the current information element can be linked (i.e., connected) to the this first buffer of the next information element. The buffer 532c, stored in the deferred buffer 536, is written to the egress port link list 535 and inserted into the link list after the buffer 532b and before the buffer 533a (i.e., the next buffer pointer for the buffer 532b points to the buffer 532c and the next buffer pointer for the buffer 532c points to the buffer 533a). At time t6, the buffer 534a of the flow 539 arrives. This buffer is written to the egress port link list 535 but is not linked to any buffers. At time t7, a buffer 534b arrives. This buffer is linked to buffer 534a. At time t8, a buffer 534c arrives. This buffer signals the EOP. Therefore, at time t8, the buffer 533b, stored in the deferred buffer 536, is written to the egress port link list 535 and inserted into the linked list after the buffer 533a and before the buffer 534a.

In packet mode, the input network traffic is grouped into flows, each flow having a certain class. Services are provided based on the class of the flow. It is important for a network processor to first classify the traffic and then service each flow in using the first-come-first-serve basis.

The UBR service is viewed as a class. There is no commitment for this class. The UBR information elements are processed based on their arrival time within this class. The PCU 250 links all the information elements into a single chain on a per physical output port basis and then the FPU applies the appropriate services, including jitter, rate and priority, to the class. With UBR service, there is no guarantee that this class of traffic will be processed.

Figure 21:
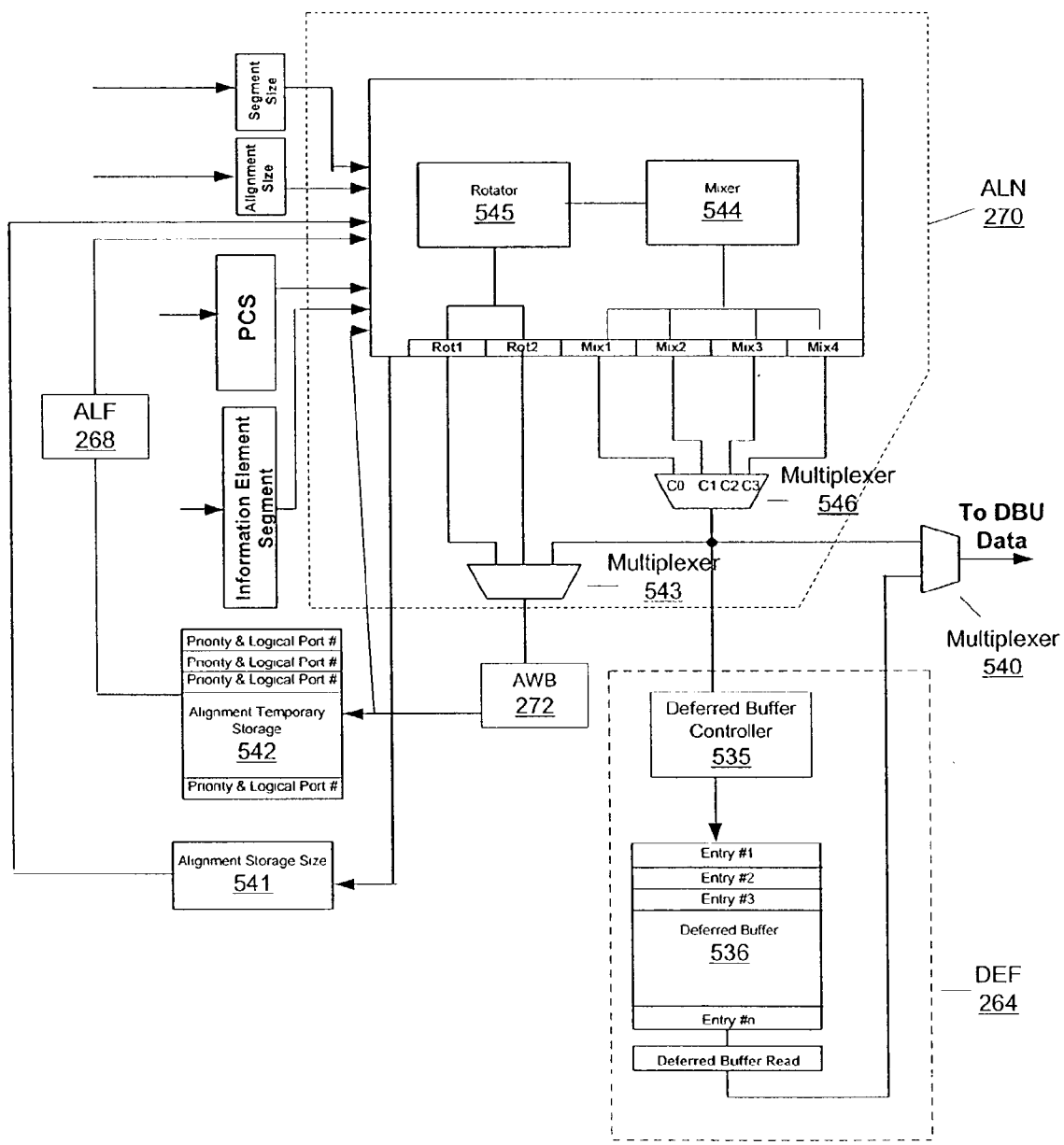
FIG. 21 shows a block diagram of an embodiment of a packet-to-cell-alignment and deferred buffer system according to the present invention.

FIG. 21 shows a block diagram of an embodiment of a packet-to-cell-alignment and deferred buffer system 548 according to the present invention. The alignment process is described in greater detail in the next section. In FIG. 21, the ALN unit 270 rotates and mixes the incoming "information element segment" such that the incoming segment has a different form, e.g., packets are converted to cells. The ALN unit 270 includes the rotator 545, the mixer 544, the multiplexer 543, and the multiplexer 546. The inputs to the ALN unit 270 include: (1) an "information element segment"; (2) a "segment size" (the length, i.e., the number of bytes of the "information element segment"); (3) the PCS of the flow of the information element; (4) an "alignment size" (the length of the fixed buffer which, for example, is 64-byte or 128-byte); (5) the data stored in the alignment temporary storage 542; and (6) an alignment storage size 541 that specifies the length of the data stored in the alignment temporary storage 542.

An "information element segment" and the "segment size" are input into the rotator 545 from the RWB stage 262. The rotator 545 determines if the entire "information element segment" can be stored in one information segment storage unit of length, for example, 64-bytes or 128-bytes. The rotator 545 aligns the data segment so that it can be mixed with other data such as, for example, remainder data or a buffer header. The "alignment size" tells the rotator 545 as to the length of the information segment storage unit. If the entire "information element segment" can be stored in one information segment storage unit, then the information element segment is sent to a mixer 544. The mixer 544 inserts into the information segment storage unit a buffer header and the data of the information element segment and sends this information segment storage unit either to the DBU 292 or to a deferred buffer 536. If the flow to which the information element segment belongs is in the UBR mode and the buffer signals an EOP, then this buffer is sent to a deferred buffer controller 535 within the DEF stage 264. The DEF stage 264 includes the deferred buffer controller 535 and the deferred buffer 536. The deferred buffer controller 535 stores the EOP buffer in an entry in the deferred buffer 536 corresponding to the physical output port to which the information element (i.e., the buffer) is destined. The deferred buffer controller 535 extracts from the deferred buffer 536, the previously stored EOP buffer in that entry, if one exists, and sends it to the DBU 292. This extraction occurs when the deferred buffer controller 535 performs a "deferred buffer read" which transmits the EOP buffer to the multiplexer 540.

If the "information element segment" cannot completely fit into the fixed size buffer, then an information segment storage unit is filled with as much data as it can hold from the information element segment and this filled information segment storage unit is sent to the mixer 544 as described earlier. The remainder of the data from the information element is sent to the AWB unit 272 which writes this remainder data to an alignment temporary storage 542. The length of the remainder data is stored in the alignment storage size 541. The remainder of the data is transferred from the rotator 545 to the alignment temporary storage 542 via the Rot1 and Rot2 outputs and the multiplexer 543. The ALF unit 268 reads the remainder data stored in the alignment temporary storage 542 and sends this data into the rotator 545. The length of the remainder data stored in the alignment storage size 541 is also input into the rotator 545. The rotator 545 takes the remainder data and also another incoming information element segment and tries to fit both of these data into a information segment storage unit. If there is enough room for both data, then both are inserted into the information segment storage unit and transferred to the DBU 292. If there is not enough room for both data, then the data stored in the alignment temporary storage 542 is inserted into the information segment storage unit and if some space is left over, then data from the arriving information element segment is also inserted into the information segment storage unit. The completely filled information segment storage unit is transferred to the DBU 292. Any remainder data that did not fit into the information segment storage unit is transferred to the alignment temporary storage 542 and the length of this data is stored in the alignment storage size 541. This process continues for each of the incoming information element segments.

In FIG. 21, the remainder data may be "bypassed" from the output of the multiplexer 543 to the input of the rotator 545. This bypass is inserted in order to avoid having to insert a pipeline stall to wait for the updated remainder of the data to be written to the alignment temporary storage 542. For example, when an incoming information element segment enters the rotator 545, the alignment temporary storage 542 is searched to determine if there is any remainder data. If the remainder data is being updated, rather than inserting a pipeline stall waiting for the alignment temporary storage 542 to be updated, the updated remainder data is bypassed from the output of the multiplexer 543 to the rotator 545.

Elaborating further on the elements shown in FIG. 21, if the incoming information element segment is greater than the information segment storage unit, then the rotator 545 separates the incoming information element segment in order to comply with the size of the information segment storage units (e.g., an incoming 84-byte information element segment can be stored in two information segment storage units each of 64-bytes). In addition, the rotator 545 determines how much, if any, of the incoming information element segment can be combined with the data stored in the alignment temporary storage 542 in order to fill the next information segment storage unit. The rotator 545 also shifts the data so that, e.g., the data within the buffer is shifted backward in order to make room for a buffer header.

The deferred buffer 536 has one entry for each of the physical output ports of the network processor. In other words, each entry in the deferred buffer 536 corresponds to one of the physical output ports.

The alignment temporary storage 542 stores the remainder data. The number of entries in the alignment temporary storage 542 corresponds to the number of different priorities for the incoming flows and the logical ports used by the incoming flows. The entries in the alignment temporary storage 542 are indexed based on the priority of the flow of the incoming information element and the logical port number at which the incoming information element arrived.

The mixer 544 combines different data together for storage of that data in the information segment storage unit. For example, the mixer 544 combines the buffer header with 48-bytes of data from the incoming 84-byte packet to form a properly aligned information segment storage unit of 64-bytes. In this embodiment, the mixer 544 outputs to a multiplexer 546 the one or more fixed aligned output buffers 32-bytes at a time using output ports "Mix1", "Mix2", "Mix3", and "Mix4". If the fixed buffers are 64-byte, then the properly aligned fixed buffer is transferred to multiplexer 546 via "Mix1" and "Mix2". If the fixed buffers are 128-byte, then the properly aligned fixed buffer is transferred to multiplexer 546 via "Mix1", "Mix2", "Mix3" and "Mix4".

The multiplexer 540 selects as its output the properly aligned fixed buffer arriving from either multiplexer 546 or to the DEF stage 264 when in UBR mode. The multiplexer 543 outputs any remaining data to the AWB unit 272 so that it will write it into the proper entry within the alignment temporary storage 542.

II. Alignment Engine

1. Segmentation and Reassembly

Segmentation, as used herein, refers to the segmentation (e.g., division or separation) of an incoming information element into a fixed size and storing this fixed size amount of data into fixed size buffers. By storing the incoming information elements into the fixed size buffers, it is ensured that no lengthy packets have to be processed by the TPU or the FPU; a lengthy packet can clog up an output port for a long time period thus possibly preventing the guarantee of a specific service rate. The reassembly refers to the process of reassembling the contents of the segmented information segment storage units that were received at another network processor into the desired information element length (e.g., the contents of the segmented information segment storage units received at the other network processor are output by the other network processor as packets having the desired length).

The PCU 250 performs segmentation and reassembly ("SAR") to support interleaving. Interleaving, as used herein, means transmitting down a physical line, adjacent to each other, an information element belonging to one flow and another information element belonging to the same flow or a different flow. In other words, with interleaving, there is no constraint that adjacent information elements belong to the same flow. The interleaving space pertains to the next adjacent information element that may or may not belong to a different flow. In the case of cell interleaving, cells belonging to different flows may interleave with each other.

In the case of packet interleaving, the interleaving space is decided by how many packets can simultaneously interleave with each other. In this embodiment of the network processor, the maximum number of packet interleaving equals the maximum number of logical ports multiplied by the number of priorities in each of the logical ports (each flow is assigned a priority and that priority determines when buffers from that flow are sent out by the FPU through the logical port). In this embodiment, the PCU 250 supports the simultaneous interleaving of up to 1K different packets.

Figure 22:
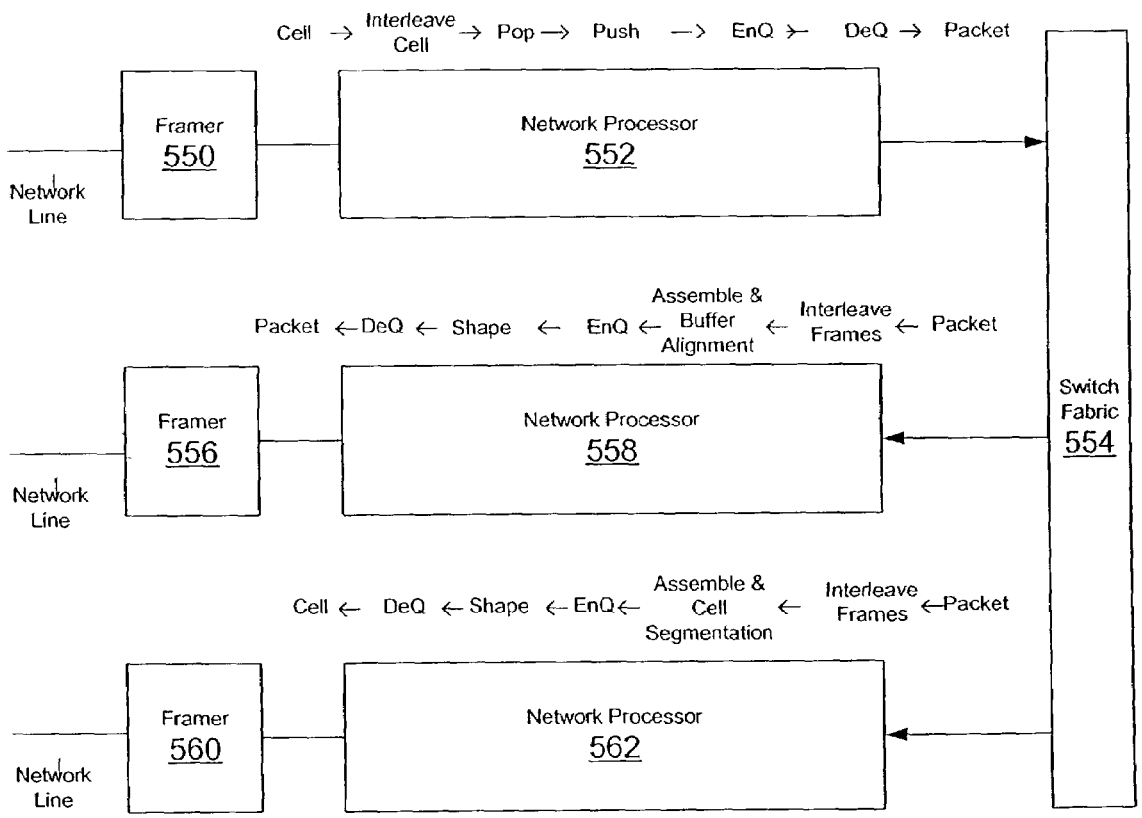
FIG. 22 shows a block diagram of an embodiment of the steps and components used for interleaving when the network processor performs cell-to-packet, packet-to-packet, and packet-to-cell conversions.

FIG. 22 shows a block diagram of an embodiment of the steps and components used for interleaving when the network processor performs cell-to-packet, packet-to-packet, and packet-to-cell conversions. In the top-most block diagram of FIG. 22, the network processor 552 is executing in the cell-to-packet mode. In this diagram, a framer 550 recognizes the protocol being used and assembles the bits that are transmitted serially on a network line into a recognizable information element such as, in this case, a cell. The assembled cell is interleaved with other information elements by the network processor. The "pop" operation removes the old protocol of the incoming cell and the "push" operation inserts the new protocol of the packet. The "EnQ" (enqueue) operation inserts the information segment storage unit representing the cell into a queue. The "DeQ" (dequeue) operation removes one or more information segment storage units from the queue and outputs these one or more information segment storage units together in the form of a packet via the appropriate output port. This packet is then routed to the appropriate destination using a switch fabric 554. The switch fabric 554 is a device that connects any two or more transmitting or receiving service providers.

In the middle block diagram of FIG. 22, the network processor 558 is executing in the packet-to-packet mode. A packet arrives from the switch fabric 554. For the "interleave frames" operation, this packet is interleaved with other information elements. The "assemble & buffer alignment" and "EnQ" operations insert the packet into one or more information segment storage units and then link the one or more information segment storage units within the queue corresponding to the flow to which the incoming packet belongs. For the "shape" operation, the TPU selects the appropriate information segment storage unit to send to the FPU for output via the output ports. In the "DeQ" operation, one or more information segment storage units selected by the TPU are removed from the appropriate queue and sent in packet format to a framer 556. The framer 556 then serializes the packet and transmits these bits to another device via the network line.

In the bottom-most block diagram of FIG. 22, the network processor is executing in the packet-to-cell mode. A packet arrives from the switch fabric 554. For the "interleave frames" operation, this packet is interleaved with other information elements. The "assemble & cell segmentation" and "EnQ" operations insert the packet into one or more information segment storage units and then link the one or more information segment storage units within the queue corresponding to the flow to which the incoming packet belongs. For the "shape" operation, the TPU selects the appropriate information segment storage unit to send to the FPU for output via the output ports. In the "DeQ" operation, the selected information segment storage unit is removed from the appropriate queue and sent in cell format to a framer 560. The framer 560 then serializes the cell and transmits these bits to another device via the network line.

In the C-C mode, the interleaving space of the ingress is the same as the interleaving space of the egress. In this mode, the PCU 250 does not perform the "segmentation-and-reassembly" function. In this embodiment, for the cell-to-cell conversion, 64K interleaving of information elements can occur.

2. Alignment pipeline

Before writing the data into memory (i.e., the DBU 292), the PCU 250 may perform data processing functions such as data alignment, defer buffer write, and DBU command generation. In order to perform these data processing functions in an efficient manner, the alignment pipeline 267 is provided that overlays the PCU pipeline 252. In FIG. 5, the alignment pipeline 267 includes the ALF unit 268, the ALN unit 270, and the AWB unit 272. The ALF unit 268 checks whether the previous information element segment had "excess" data that could not completely fit into the previous fixed size buffer and therefore should be included (i.e., mixed) with the current information element segment. The ALN unit 270 aligns the information element segment with the fixed size buffer, e.g., the incoming information element segment is mixed with any excess data from the previous information element segment and this is inserted into the fixed size buffer. The ALN unit 270 writes the information segment storage unit to memory. Any excess data that does not completely fit into the fixed size buffer is mixed with the next-to-arrive information element segment. The AWB unit 272 writes the excess data into the alignment temporary storage 542 so that it may be combined with the next-to-arrive information element segment. As shown in FIG. 5, the ALF unit 268 is coupled to the EXE unit 260 since the EXE unit 260 provides the information segment storage unit to store any remainder data combined with the current information element segment and also provides the length of the incoming information element segment. The ALN unit 270 is coupled to the RWB unit 262 since the RWB unit 262 passes the data of some information elements (e.g., packets) to the alignment pipeline 267 to align that data with the information segment storage unit.

For the alignment performed using the alignment pipeline 267 (e.g., the alignment performed in P-C mode and P-P mode), when an information segment storage unit is filled and so can be written to memory, the ALN unit 270 transmits this information segment storage unit to the multiplexer 276 for writing into memory (i.e., the DBU 292). If, however, the information element belongs to the UBR mode, then the information segment storage unit is sent to the DEF stage 264 for writing into the deferred buffer 536. Any "excess" data is written to an alignment temporary storage 542 by the AWB unit 272 so it can be merged with the next-to-arrive information element segment.

Figure 23:
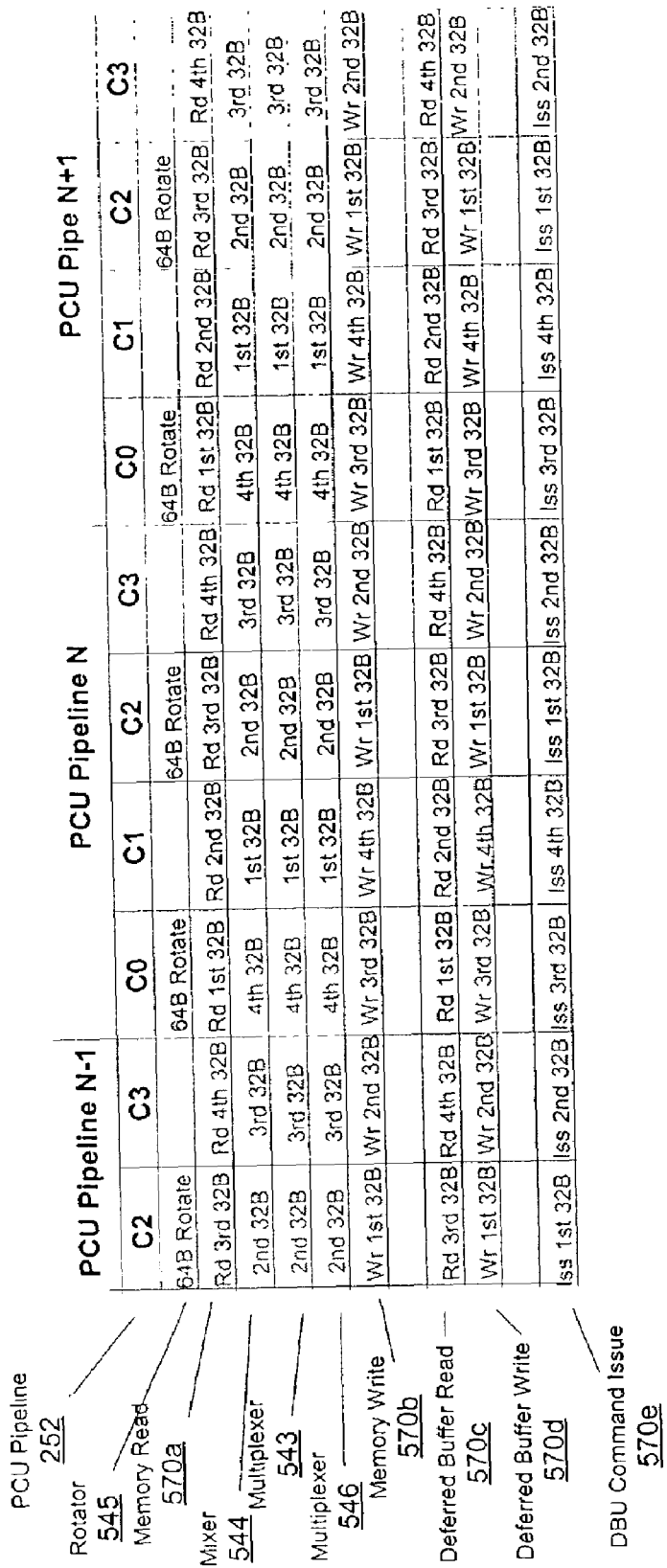
FIG. 23 shows an embodiment of the alignment pipeline according to the present invention.

FIG. 23 shows an embodiment of the alignment pipeline 267 according to the present invention. In FIG. 23, the top-most row represents the PCU pipeline 252 and the four cycles used by each of the pipe stages. The alignment pipeline 267 performs functions that do not comply with the boundary of the PCU pipeline 252 (i.e., each pipe stage of the PCU pipeline 252 uses four clock cycles but the alignment pipeline 267 uses only one clock cycle). In this embodiment, the alignment pipeline 267 has the following components (some of these components are described above in conjunction with FIG. 21): a rotator 545, a memory read 570a, a mixer 544, a multiplexer 543, a multiplexer 546, a memory write 570b, a deferred buffer read 570c, a deferred buffer write 570d, and a DBU command issue 570e. In this section, the information element segment refers to the segment after the protocol header operation (i.e., change of protocols) is executed in the EXE stage 260, which includes both the strip off and encapsulation functions. The memory read 570a is performed by the ALF unit 268 and it reads the alignment temporary storage 542 in order to read any "excess" data. The memory write 570b is performed by the AWB unit 272 and it writes the "excess" data to the alignment temporary storage 542.

The mixer 544 mixes an information segment storage unit header or "excess" data with the incoming information element segment and stores this mixture within the information segment storage unit. This mixing operation takes one clock cycle to perform. The "excess" data is sent to the multiplexer 543. The information segment storage unit produced by the mixer 544 is transmitted to the multiplexer 546. The multiplexer 543 sends the "excess" data to the alignment temporary storage 542 where a memory write 570b is performed to write the "excess" data to the alignment temporary storage 542. This write operation takes one clock cycle to perform. If in UBR mode, the deferred buffer read 570c reads the 32-byte block from the deferred buffer 536 and sends it to memory using the DBU command issue 570e. The deferred buffer write 570d writes the EOP information segment storage unit to the deferred buffer 536. The DBU command issue 570e sends the information segment storage unit to the DBU 292 to write it to memory.

As FIG. 23 shows, for the PCU pipeline cycles C0 to C3, there are two opportunities to do a 64-byte rotation, four opportunities to read and write 32-byte blocks to the alignment temporary storage 542, four opportunities to read and write the 32-byte blocks to the deferred buffer 536, and four opportunities to issue a 32-byte operation to the DBU 292. The RWB stage 262 schedules operations based on FIG. 23 (i.e., FIG. 23 is used as a scheduling table).

Figure 24:
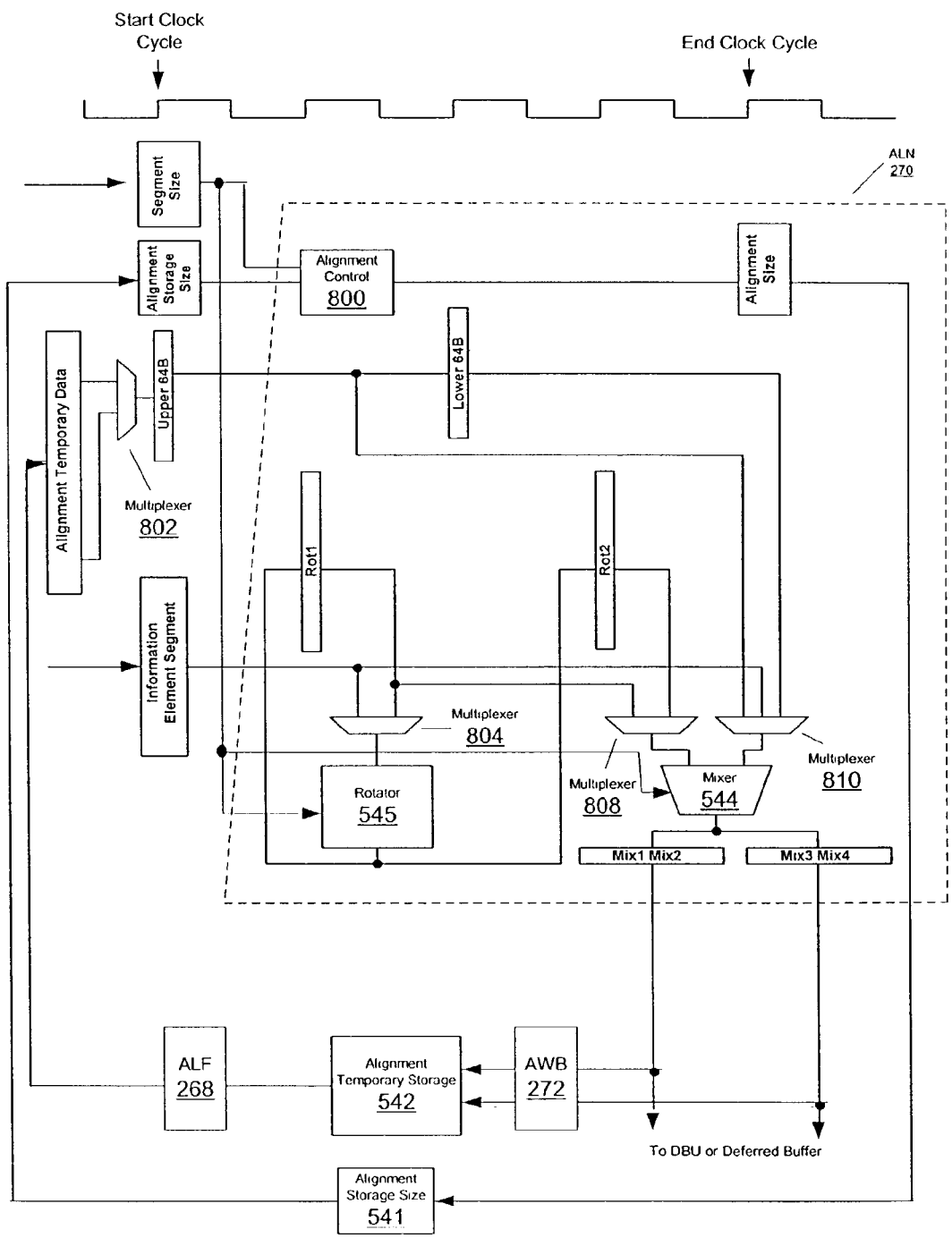
FIG. 24 shows further details of the embodiment of the alignment pipeline according to the present invention.

FIG. 24 shows further details of the embodiment of the alignment pipeline 267 according to the present invention. FIG. 24 further elaborates on the functional blocks described earlier in FIG. 21. Information element segments passed from the previous pipe stage, the EXE stage 260, are moved forward or backward, using the rotator 545, and merged, using the mixer 544, with leftover bytes from previous segments in order to align to the configured buffer size (e.g., either 64-byte or 128-byte buffer size). The inputs to the ALN unit 270 include: (1) an "information element segment"; (2) a "segment size" (the length, i.e., the number of bytes of the "information element segment"); (3) the alignment temporary data coming from the alignment temporary storage 542; and (4) an "alignment storage size" that specifies the length of the data stored in the alignment temporary storage 542.

An "information element segment" is input into the rotator 545 (via a multiplexer 804) or the mixer 544 (via a multiplexer 810) from the EXE stage 260. A "segment size" is input into the rotator 545 or the mixer 544 from the EXE stage 260. The rotator 545 determines if the entire "information element segment" can be stored in one information segment storage unit of length, for example, 64-bytes or 128-bytes. The rotator 545 also aligns the "information element segment" so that it can, for example, be properly combined with a buffer header or remainder data.

If the entire "information element segment" can be stored in one information segment storage unit, then the rotator 545 aligns the information element segment so that, for example, there is adequate room for a buffer header and the rotated information element segment is sent to a mixer 544 via the multiplexer 808. The mixer 544 combines a buffer header and the information element segment to produce the information segment storage unit (i.e., the result provided by "Mix1 and Mix2"). This information segment storage unit is sent either to the DBU 292 or to a deferred buffer 536.

If the incoming "information element segment" cannot completely fit into the fixed size buffer, then the rotator 545 aligns the segment so that a first portion of the segment combined with the buffer header will completely fill the information segment storage unit. This first portion (i.e., "Rot1") is sent to the mixer 544 via the multiplexer 808. The mixer 544 combines a buffer header and the first portion to produce the information segment storage unit (i.e., the information segment storage unit is provided by "Mix1" and "Mix2"). The remaining portion of the rotated segment that could not be included in the information segment storage unit is sent back to the rotator 545 which aligns this remaining portion so that, for example, there is adequate room for a buffer header. This rotated remaining portion (i.e., "Rot2") is sent to the mixer 544 via the multiplexer 808. The mixer 544 combines this rotated remaining portion with a buffer header to produce an excess data buffer (i.e., the excess data buffer is provided by "Mix3" and "Mix4"). This excess data buffer is written to the alignment temporary storage 542 using the memory write 570*b*. The length of the remaining portion of the rotated segment is stored in the alignment storage size 541.

Upon the arrival of a second information element segment, the alignment temporary data from the alignment temporary storage 542 is read and divided by multiplexer 802 into an upper portion and a lower portion. The upper portion and the lower portion of the alignment temporary data are input into the mixer 544 via the multiplexer 810. The rotator 545 aligns the second segment so that it can be combined with the alignment temporary data to fill as much as possible a fixed size buffer. A portion of the aligned second segment (i.e., the aligned second segment is represented by "Rot1") that can fill the information segment storage unit as much as possible is sent to the mixer 544 via the multiplexer 808. The mixer 544 combines that portion with the aligned temporary data to produce an information segment storage unit. This information segment storage unit is sent either to the DBU 292 or to the deferred buffer 536 if in UBR mode. Any remaining portion of the aligned second segment not used to fill up the information segment storage unit is again sent to the rotator 545 and aligned so that, for example, a buffer header can be inserted. This again-rotated segment portion (i.e., "Rot2") is transferred to the mixer 544 via the multiplexer 808. The mixer 544 combines this again rotated segment portion with a buffer header to produce an excess data buffer. This excess data buffer is written to the alignment temporary storage 542 using the memory write 570*b*. The length of the again-rotated segment portion is stored in the alignment storage size 541.

The alignment control 800 calculates the alignment storage size given the "segment size" and the "alignment storage size" which is the size of the data within the appropriate entry in the alignment temporary storage 542. If the "segment size" plus the "alignment storage size" is greater than the size of the information segment storage unit, then the "alignment storage size" equals the "segment size" plus the "alignment storage size" minus the size of the information segment storage unit. If the "segment size" plus the "alignment storage size" is less than or equal to the size of the information segment storage unit, then the "alignment storage size" equals the "segment size" plus the "alignment storage size".

3. Alignment Data from Adjacent Pipes

If the adjacent pipes are working on the same logical port, the data within the older pipe is bypassed to the younger pipe. The ALN unit 270 and the AWB unit 272 bypass the data to the ALF unit 268 to avoid pipeline bubbles (i.e., if the "excess" data that is to be stored in the alignment temporary storage 542 is bypassed to the ALF unit 268, then a pipeline bubble does not have to be inserted to stall the pipeline while the "excess" data is being written to the alignment temporary storage 542).

4. Examples of Segment Processing Performed by the ALN Unit

The PCU 250 realigns the data to a new location in order to match the size of the information segment storage unit. The packet realignment function is performed in the RWB stage 262 and the ALN unit 270. In this embodiment, the network processor operates in the following two buffer sizes: 64-byte and 128-byte.

A. Information Segment Storage Units of 64-Bytes i. Data Segment of the Incoming Information Element Segment is Less Than or Equal to 48 Bytes In this case, each of the 64-byte information segment storage units has 48 bytes available for storing data. Only one buffer write is issued by the PCU 250 because the packet with the new header alignment only uses a single buffer (i.e., because the packet segment is less than 48 bytes, it will fit into a single buffer and therefore only a single buffer write is issued).

FIG. 25 shows the alignment pipeline 267 and an example of aligning the data according to one embodiment of the present invention where the length of the information segment storage unit is 64-bytes and the data segment of the incoming information element segment is less than or equal to 48 bytes. In FIG. 25, the rotator 545 moves the data segment back by 16 bytes to make room for the buffer header. The mixer 544 combines the data segment that is less than or equal to 48 bytes of the incoming information element segment with header information for the information segment storage unit and this combination (i.e., the 64-byte information segment storage unit) is sent either to memory using the DBU 292 or to the deferred buffer 532 if in UBR mode.

In the bottom diagram, the data segment (the data segment is designated "segment") of an up to 84-byte information element segment is mixed with a 16-byte header to produce the 64-byte information segment storage unit. The rotator 545 moves the data segment backward by 16 bytes to account for the buffer header. This 64-byte information segment storage unit is issued to the DBU 292 or to the deferred buffer 532 if in UBR mode.

ii. Data Segment of Incoming Information Element Segment is Greater than 48 Bytes but Less than 64 Bytes FIG. 26 shows the alignment pipeline 267 and an example of aligning the data according to one embodiment of the present invention where the length of the information segment storage unit is 64-bytes and the data segment is greater than 48 bytes but less than 64 bytes. In FIG. 26, the data segment of the incoming information element segment is divided into a 48-byte segment and a second portion that is (data segment size—48) bytes. The mixer 544 combines the 48-byte data segment (this is shown by "mix1" and "mix2") with a buffer header to produce a first information segment storage unit. The rotator 545 then moves the "excess" data backward by 16 bytes and sends it to the mixer 544 that combines the excess data with a buffer header to produce a second information segment storage unit. In this case, the PCU 250 issues two buffer writes to the DBU 292 because two information segment storage units are produced.

Figure 27B:
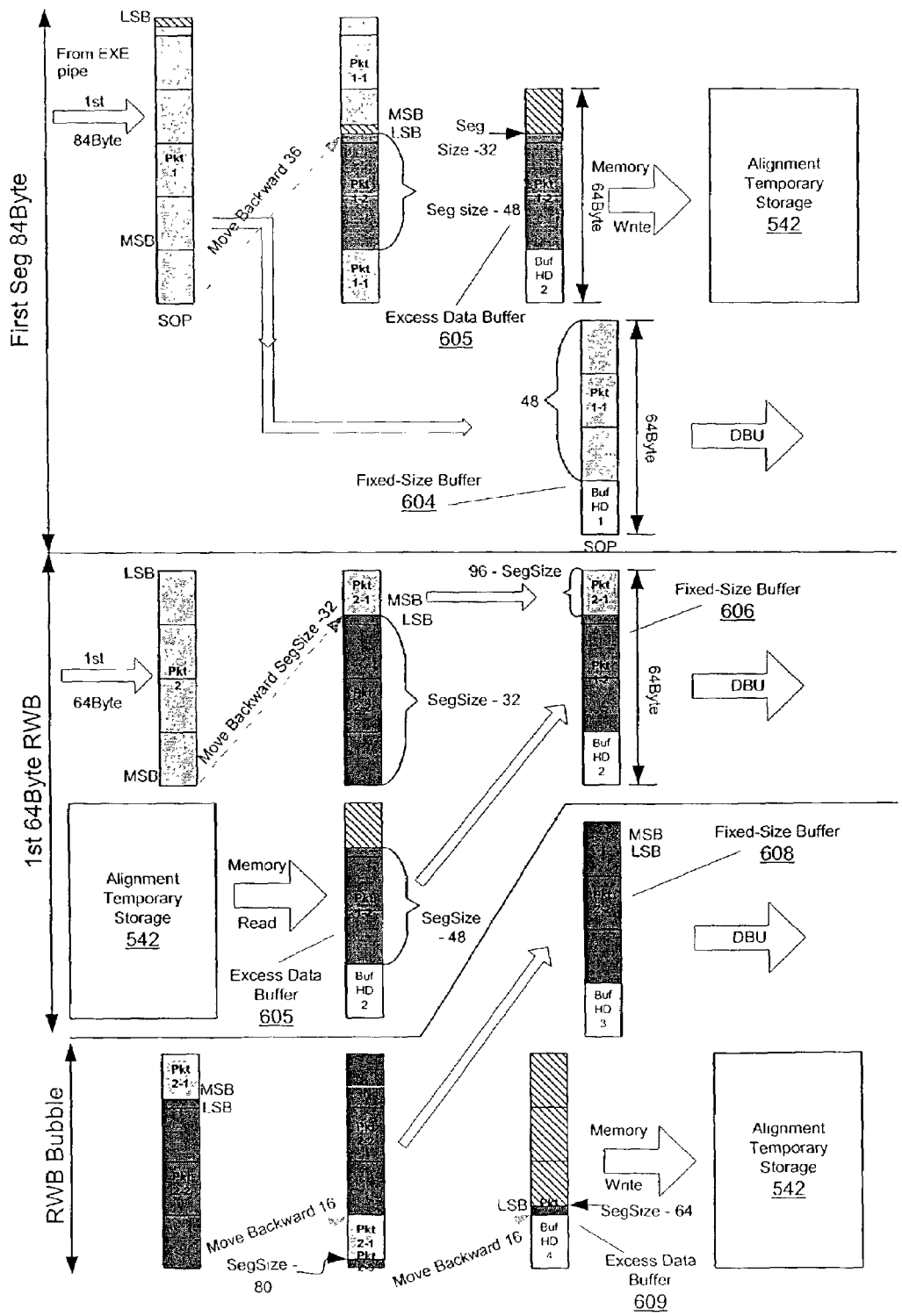
Figure 27C:
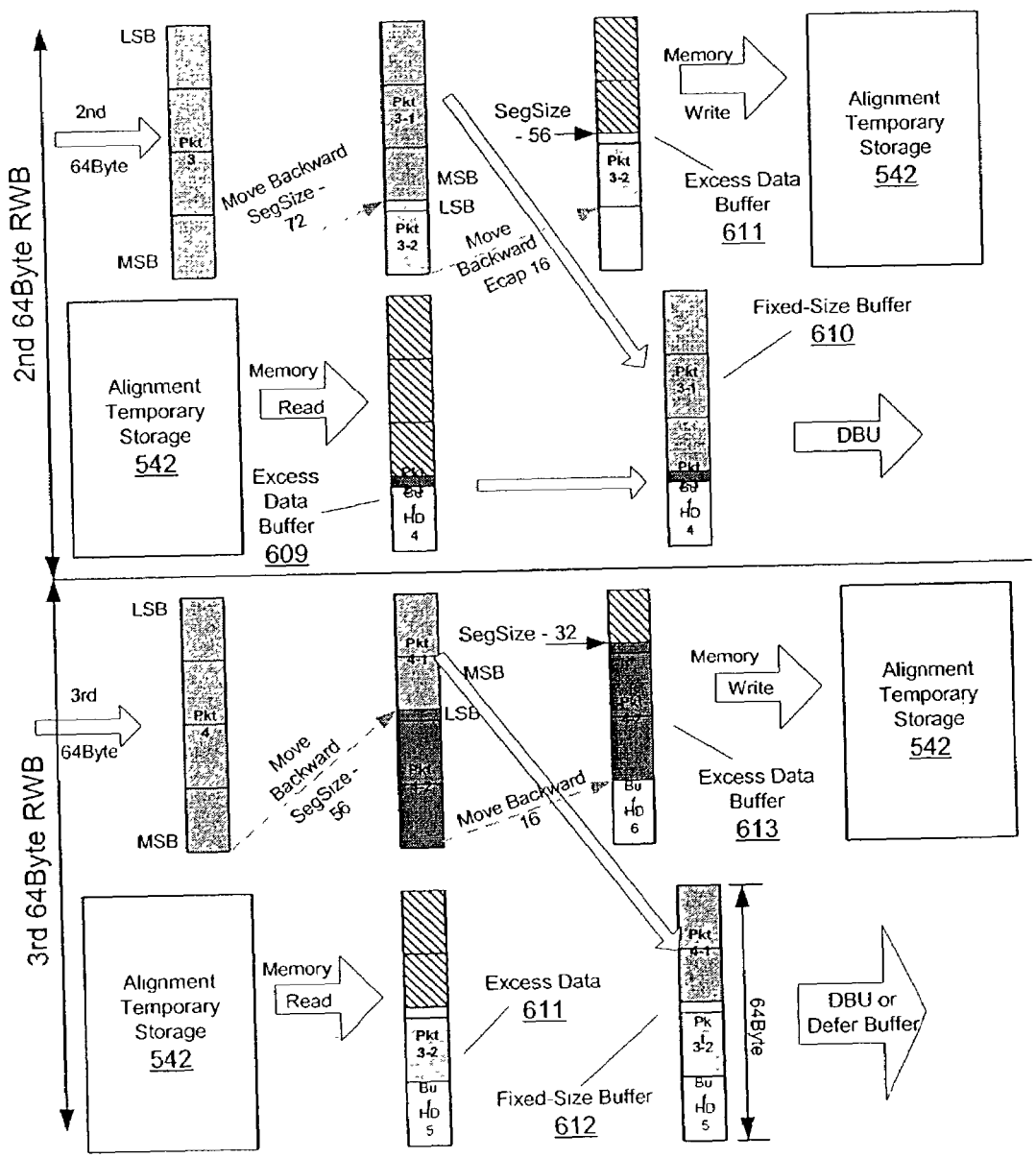

In the bottom diagram, because the 84-byte information element segment is greater than 48-bytes, the data segment (designated as "packet 1-1") is 48 bytes long and the "excess" data segment (designated as "packet 1-2") is (segment size—48) bytes long. A buffer header is added to the 48-byte data segment by the mixer 544 to produce the first information segment storage unit (designated "buffer 1"). A buffer header is also added to the (data segment size—48) portion by the mixer 544 to produce the second information segment storage unit (designated "buffer 2"). The first information segment storage unit, within its buffer header, is designated as the "SOP" and the second information segment storage unit is designated as the "EOP".

iii. Incoming Information Element is Larger than 64 Bytes and the First Information Element Segment is Larger than 80 Bytes FIGS. 27*a–c* show the alignment pipeline 267 and the alignment of data according to one embodiment of the present invention where the incoming information element is larger than 64 bytes and the first information element segment is larger than 80 bytes. In FIGS. 27*a–c*, for the 84-byte information element segment, a 48-byte data segment is removed from the 84-byte information element segment and the mixer 544 combines this with a buffer header to form the information segment storage unit 604 that is sent to the DBU 292. The rotator 545 moves the 84-byte segment backward by 36 bytes and sends this rotated remaining "excess" data to the mixer 544 which combines this "excess" data with a buffer header to produce an excess data buffer 605. The excess data buffer 605 is stored in the alignment temporary storage 542 using the memory write 570*b*.

Upon arrival of a first 64-byte information element segment, the excess data buffer 605 is read from the alignment temporary storage 542 using the memory read 570*a*. The rotator 545 moves backward the first 64-byte information element segment by (segment size—32) and this rotated segment (i.e., "pkt 2-1") is combined, using the mixer 544, with the excess data buffer 605 to produce an information segment storage unit 606 that is sent to the DBU 292.

Because there is adequate data from the first 64-byte segment to issue another DBU write command, a pipeline bubble is inserted to stall until the prior DBU write command to write the information segment storage unit 606 to memory completes. During the pipeline bubble, the rotator 545 moves backward by 16 bytes the first 64-byte segment and the mixer 544 combines this rotated segment (i.e., "pkt 2-2") with a buffer header to form the information segment storage unit 608 that is sent to the DBU 292. The rotator 545 then moves backward by 16 bytes the "excess" data (i.e., "pkt 2-3") and sends this rotated data to the mixer 544 that combines this rotated data with a buffer header to produce an excess data buffer 609. The excess data buffer 609 is stored in the alignment temporary storage 542 using the memory write 570*b*.

Upon the arrival of a second 64-byte information element segment, the excess data buffer 609 is read from the alignment temporary storage 542 using the memory read 570*a*. The rotator 545 moves backward the second 64-byte information element segment by (segment size—72) and this rotated segment (i.e., "pkt 3-1") is combined, using the mixer 544, with the excess data buffer 609 to produce an information segment storage unit 610 that is sent to the DBU 292. The rotator 545 moves backward by 16 bytes the "excess" data (i.e., pkt 3-2") and the mixer 544 then combines this rotated data (i.e., "pkt 3-2") with a buffer header to form the excess data buffer 611 that is written to the alignment temporary storage 542 using a memory write 570*b*.

Upon the arrival of a third 64-byte information element segment, the excess data buffer 611 is read from the alignment temporary storage 542 using the memory read 570*a*. The rotator 545 moves backward the third 64-byte information element segment by (segment size—56) and this rotated segment (i.e., "pkt 4-1") is combined, using the mixer 544, with the excess data buffer 611 to produce an information segment storage unit 612 that is sent to the DBU 292 or to the deferred buffer 536 in UBR mode. The rotator 545 moves backward by 16 bytes the "excess" data (i.e., "pkt 4-2") and the mixer 544 then combines this rotated data (i.e., "pkt 4-2") with a buffer header to form the excess data buffer 613 that is written to the alignment temporary storage 542 using a memory write 570*b*.

Figure 28B:
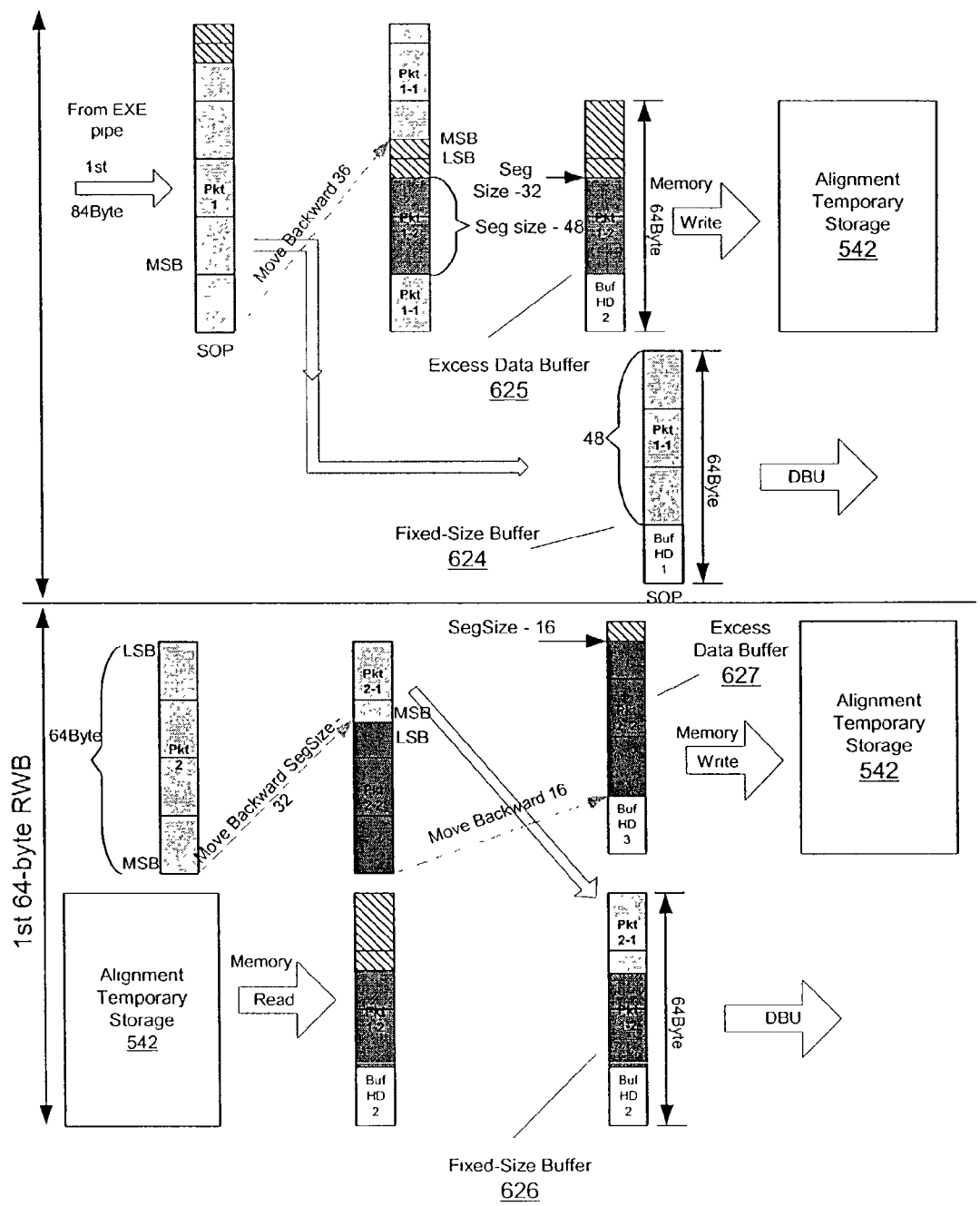
Figure 28C:
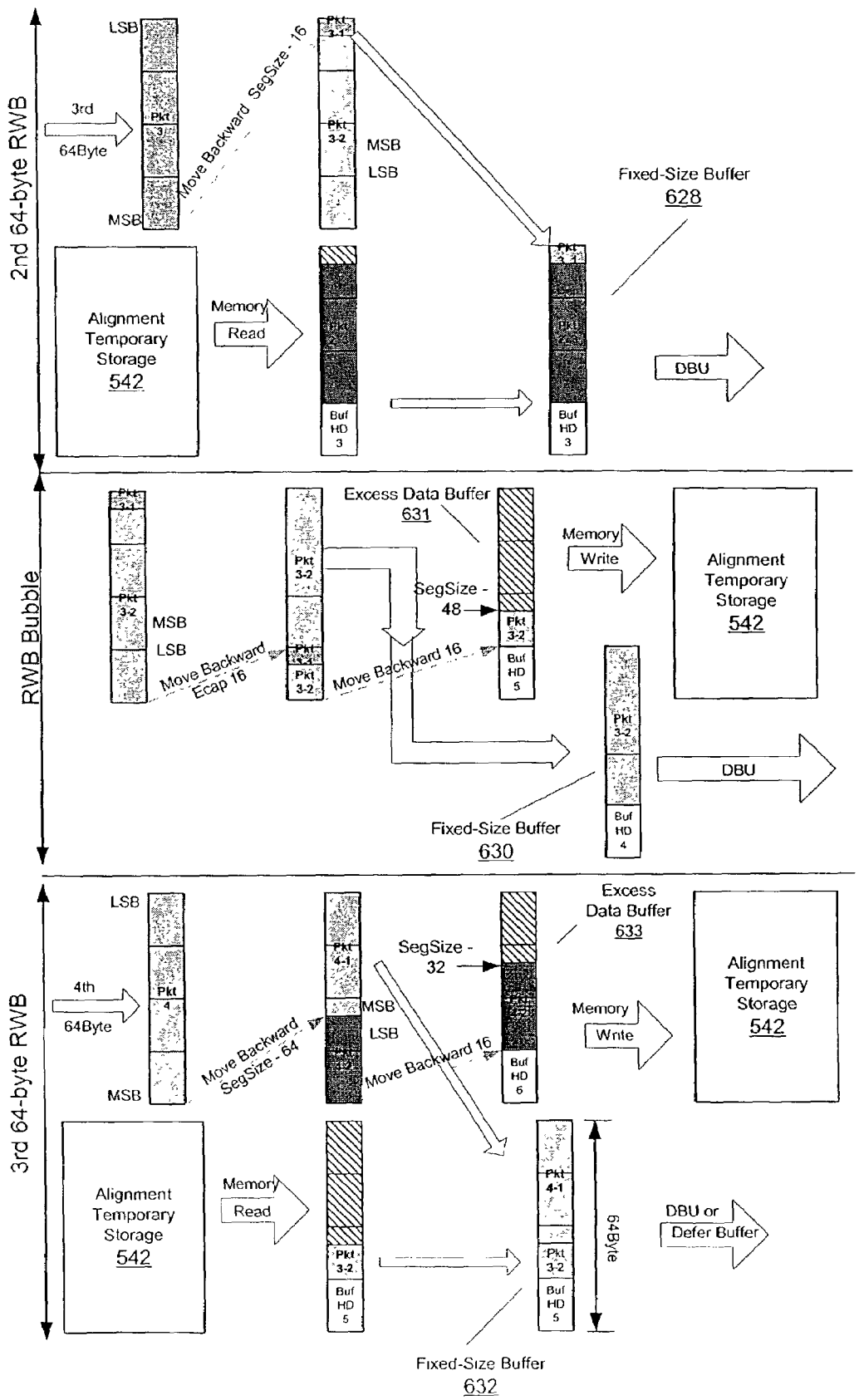
Figure 29C:
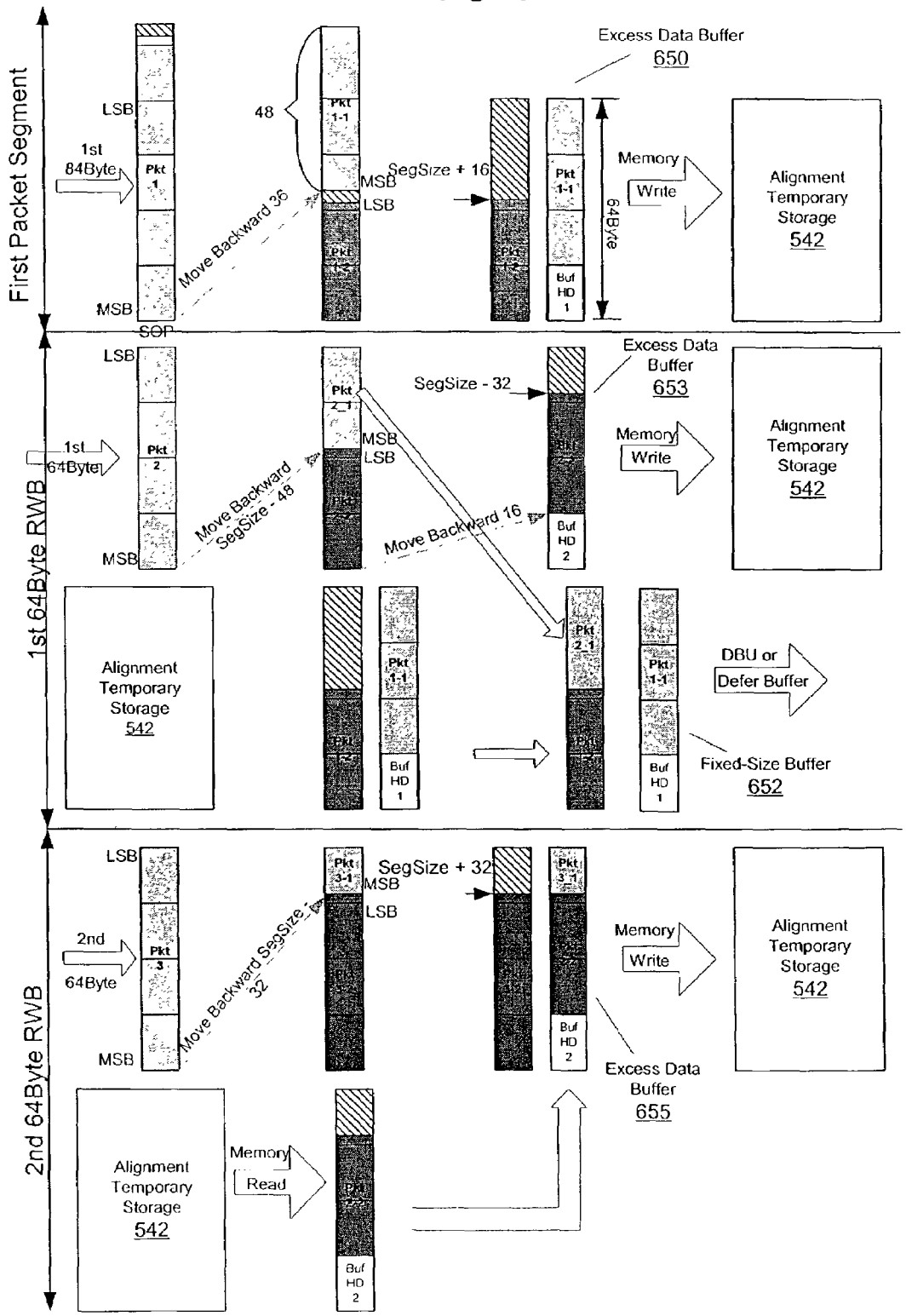
FIGS. 29a–c show the alignment pipeline and an example of aligning the data according to one embodiment of the present invention where the incoming information element is larger than 64 bytes and the first information element segment is larger than 80 bytes.
Figure 29D:
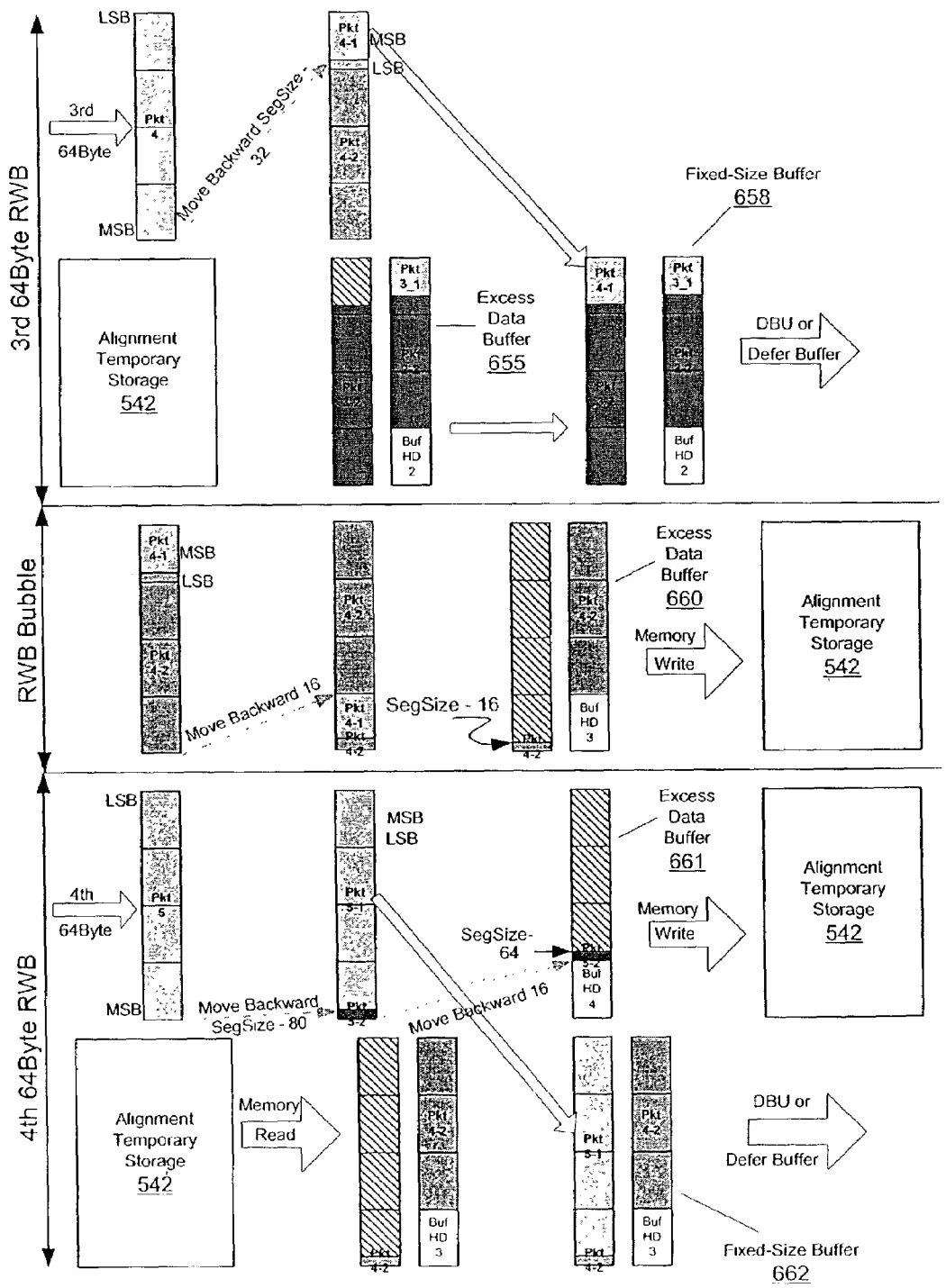
Figure 29E:
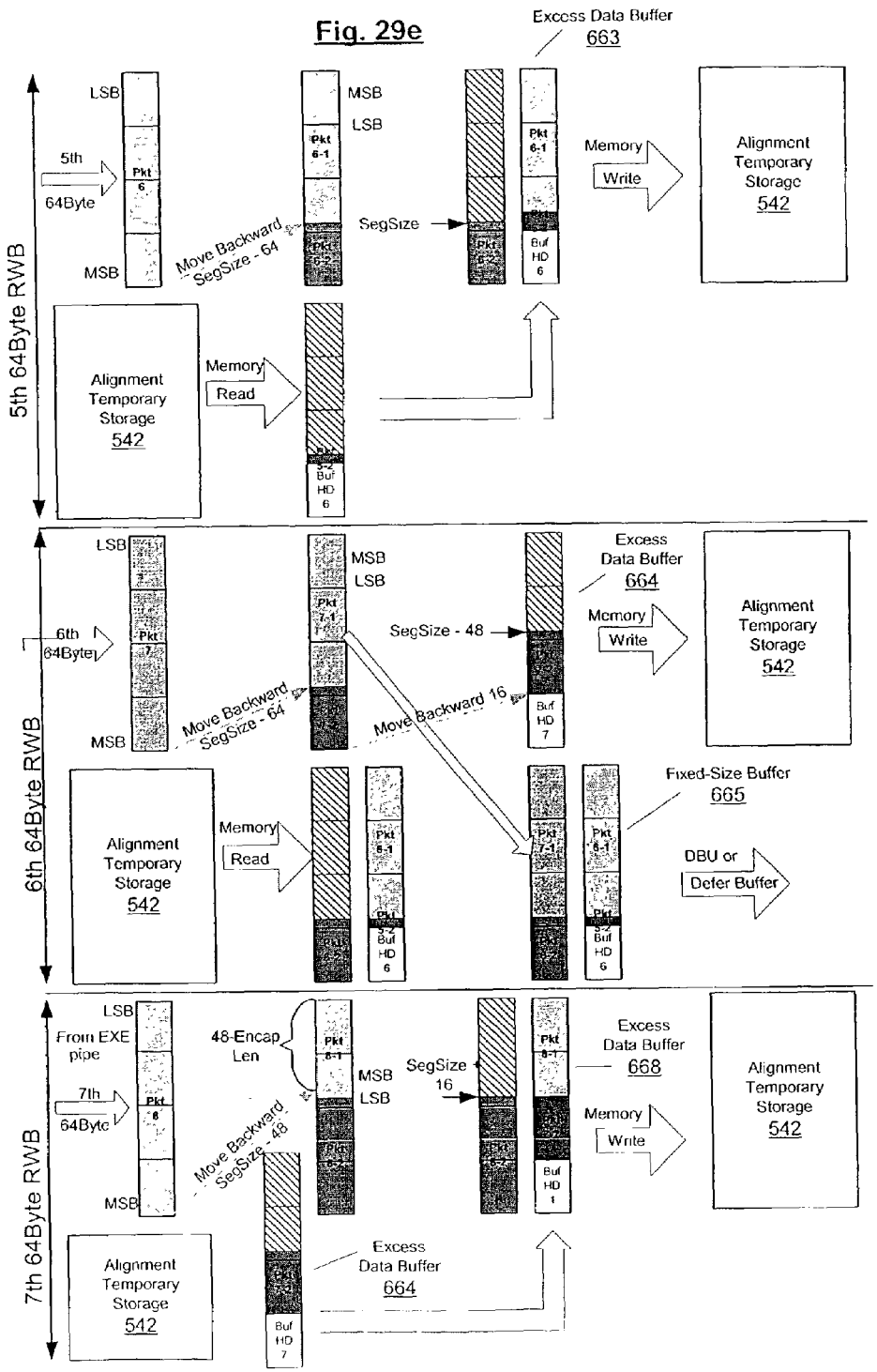
Figure 30C:
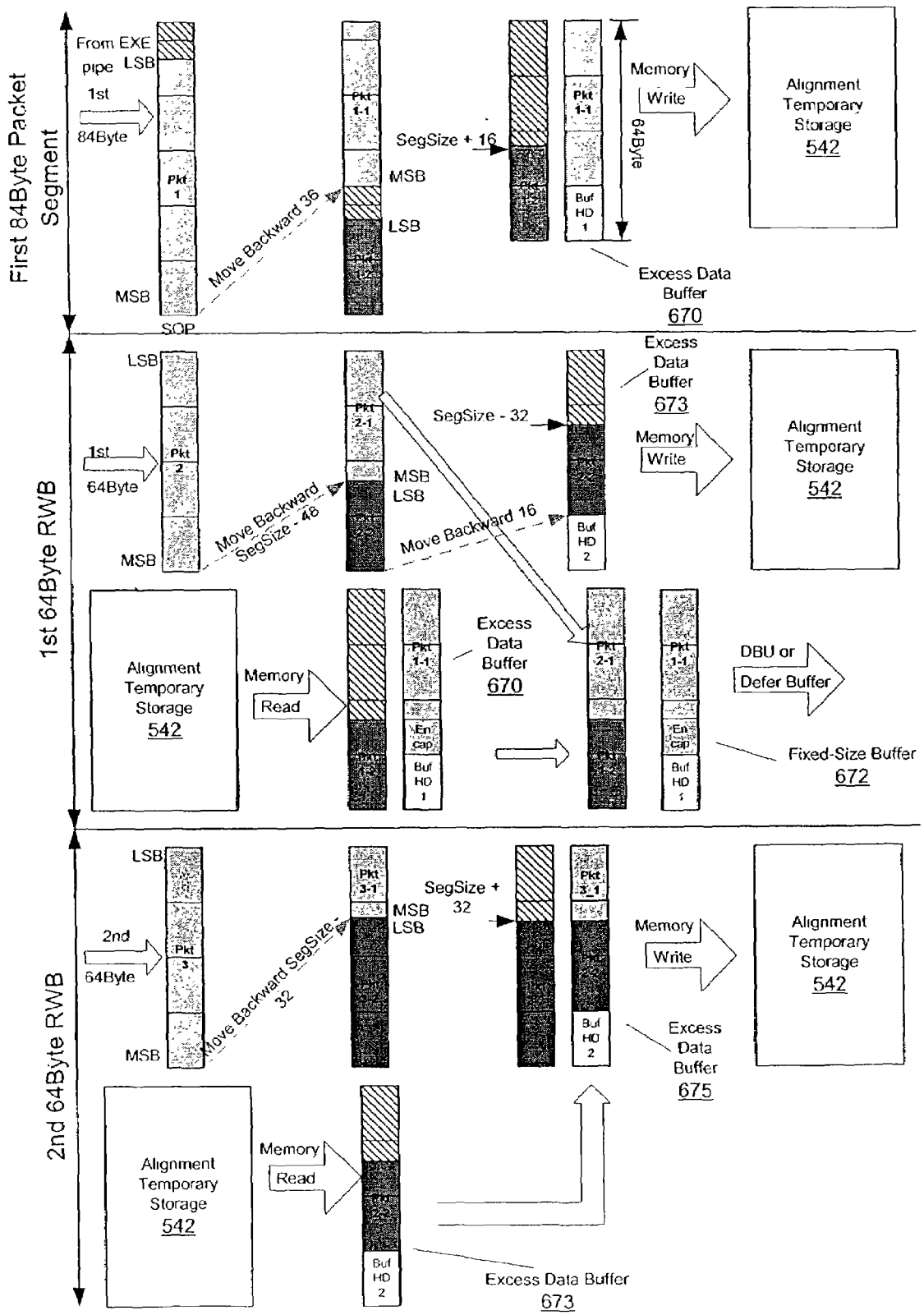
Figure 30D:
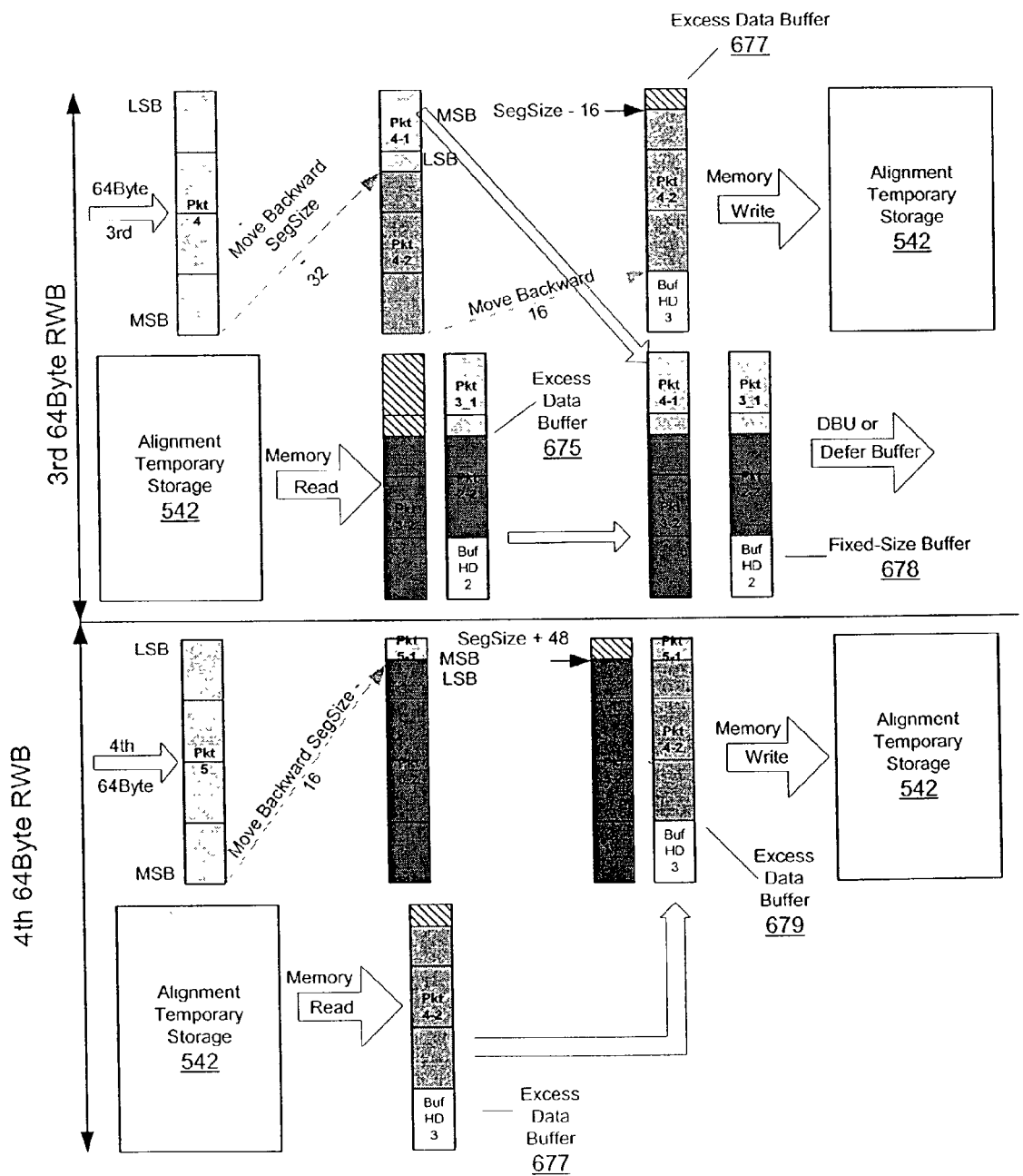
Figure 30E:
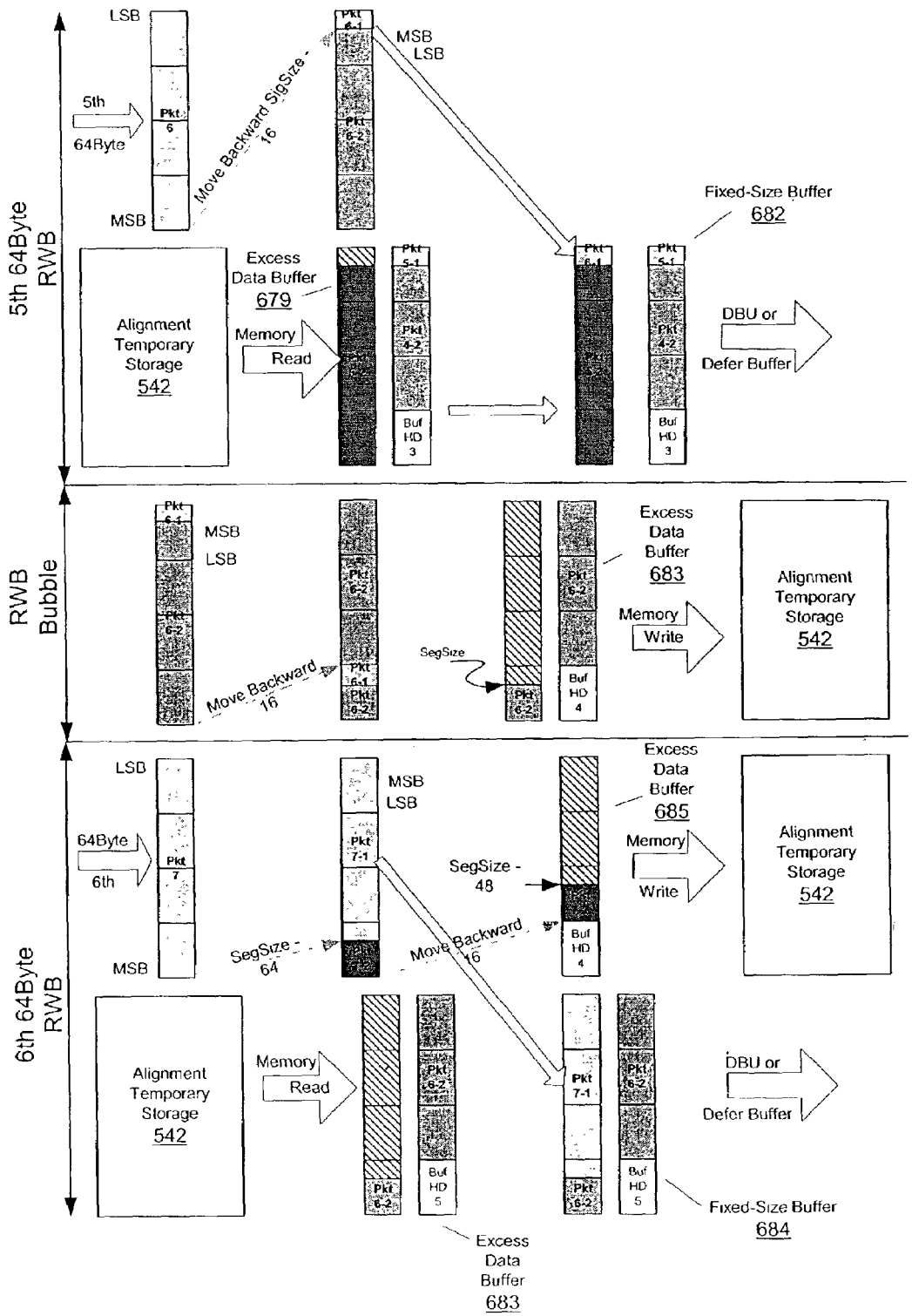

The alignment operation loops after receiving three 64-byte information element segments. This is because the packet segment coming into the PCU pipeline 252 is 64-byte and the data capacity for the information segment storage unit is 48-byte, excluding the 16-byte buffer header (i.e., the number of bytes in three 64-byte segments equals the number of bytes in four 48-byte segments).

iv. Incoming Information Element is Larger than 64 Bytes and the First Information Element Segment is Less than 80 Bytes FIGS. 28*a–c* show the alignment pipeline 267 and an example of aligning the data according to one embodiment of the present invention where the incoming information element is larger than 64 bytes and the first information element segment is less than 80 bytes. In FIGS. 28*a–c*, for the 84-byte information element segment, a 48-byte data segment is removed from the 84-byte information element segment and the mixer 544 combines this with a buffer header to form the information segment storage unit 624 that is sent to the DBU 292. The rotator 545 moves the 84-byte segment backward by 36 bytes and sends this rotated remaining "excess" data (i.e., "pkt 1-2") to the mixer 544 which combines this "excess" data with a buffer header to produce an excess data buffer 625. The excess data buffer 625 is stored in the alignment temporary storage 542 using the memory write 570*b*.

Upon the arrival of a first 64-byte information element segment, the excess data buffer 625 is read from the alignment temporary storage 542 using the memory read 570*a*. The rotator 545 moves backward the first 64-byte information element segment by (segment size—32) and this rotated segment (i.e., "pkt 2-1") is combined, using the mixer 544, with the excess data buffer 625 to produce an information segment storage unit 626 that is sent to the DBU 292. The rotator 545 moves backward by 16 bytes the "excess" data (i.e., pkt 2-2") and the mixer 544 then combines this rotated data (i.e., "pkt 2-2") with a buffer header to form the excess data buffer 627 that is written to the alignment temporary storage 542 using a memory write 570*b*.

Upon the arrival of a second 64-byte information element segment, the excess data buffer 627 is read from the alignment temporary storage 542 using the memory read 570*a*. The rotator 545 moves backward the second 64-byte information element segment by (segment size—16) and this rotated segment (i.e., "pkt 3-1") is combined, using the mixer 544, with the excess data buffer 627 to produce a information segment storage unit 628 that is sent to the DBU 292.

Because there is adequate data from the second 64-byte segment to issue another DBU write command, a pipeline bubble is inserted to stall until the prior DBU write command to write the information segment storage unit 628 to memory completes. During the pipeline bubble, the rotator 545 moves backward by 16 bytes the second 64-byte segment and the mixer 544 combines this rotated segment (i.e., "pkt 3-2") with a buffer header to form the information segment storage unit 630 that is sent to the DBU 292. The rotator 545 then moves backward by 16 bytes the "excess" data (i.e., "pkt 3-2") and sends this rotated data to the mixer 544 that combines this rotated data (i.e., "pkt 3-2") with a buffer header to produce an excess data buffer 631. The excess data buffer 631 is stored in the alignment temporary storage 542 using the memory write 570b.

Upon the arrival of a third 64-byte information element segment, the excess data buffer 631 is read from the alignment temporary storage 542 using the memory read 570a. The rotator 545 moves backward the third 64-byte information element segment by (segment size—64) and this rotated segment (i.e., "pkt 4-1") is combined, using the mixer 544, with the excess data buffer 631 to produce an information segment storage unit 632 that is sent to the DBU 292 or to the deferred buffer 536 if in UBR mode. The rotator 545 moves backward by 16 bytes the "excess" data (i.e., "pkt 4-2") and the mixer 544 then combines this rotated data (i.e., "pkt 4-2") with a buffer header to form the excess data buffer 633 that is written to the alignment temporary storage 542 using a memory write 570b.

The alignment operation loops after receiving three 64-byte information element segments. This is because the packet segment coming into the PCU pipeline 252 is 64-byte and the data capacity for the information segment storage unit is 48-byte, excluding the 16-byte buffer header (i.e., the number of bytes in three 64-byte segments equals the number of bytes in four 48-byte segments).

B. Information Segment Storage Units of 128-Bytes

When the network processor is configured in, for example, P-P mode of operation, the buffer size can be configured to be 128-bytes. The 128-byte buffer mode provides better overall memory bandwidth utilization as well as memory space utilization.

In the 128-byte buffer mode, the data is prepared in the RWB stage 262 before writing into the buffer memory. The RWB stage 262 does not generate a memory write until it has accumulated 112 bytes of data. There is a 16-byte header in each 128-byte buffer so each buffer stores 112 bytes of data.

i. Incoming Information Element is Larger than 64-Byte, First Information Element Segment is Larger than 80-Byte The following table summarizes the operation from the first 64-byte to the eighth 64-byte of the packet in the RWB stage 262. The width of the PCU pipeline 252 is 64-byte, and each buffer is able to store 112 bytes of data. Before the EOP arrives, the operation repeats after seven 64-byte data segments arrive in the RWB stage 262. Seven 64-byte data segments fill up four 128-byte buffers precisely. A pipeline bubble is generated after receiving the third 64-byte data due to a resource conflict.

FIGS. 29a–e show the alignment pipeline 267 and an example of aligning the data according to one embodiment of the present invention where the incoming information element is larger than 64 bytes and the first information element segment is larger than 80 bytes. In FIGS. 29a–e, for the 84-byte information element segment, a rotator 545 moves backward by 36 bytes the 84-byte segment. The mixer 544 combines the resulting "pkt 1-1" with a buffer header to produce the first-half of a 128-byte excess data buffer 650. The mixer 544 inserts the resulting "pkt 1-2" into the other half of the 128-byte buffer. Because 112 bytes of data has not been accumulated in the excess data buffer 650, the excess data buffer 650 is stored in the alignment temporary storage 542 using the memory write 570b.

Upon arrival of a first 64-byte information element segment, the excess data buffer 650 is read from the alignment temporary storage 542 using the memory read 570a. The rotator 545 moves backward by (segment size—48) the first incoming 64-byte segment and the resulting "pkt 2-1" is combined, using the mixer 544, with the excess data buffer 650 to produce an information segment storage unit 652 that is sent to the DBU 292 or to the deferred buffer 536 in UBR mode. The rotator 545 moves backward by 16 bytes the resulting "pkt 2-2", and then the mixer 544 combines the resulting "pkt 2-2" with a buffer header to produce an excess data buffer 653. The excess data buffer 653 is stored in the alignment temporary storage 542 using the memory write 570b.

Upon arrival of a second 64-byte information element segment, the excess data buffer 653 is read from the alignment temporary storage 542 using the memory read 570a. The rotator 545 moves backward by (segment size—32) the second incoming 64-byte segment resulting in "pkt 3-1" and "pkt 3-2". The mixer 544 then combines the resulting "pkt 3-1" with the excess data buffer 653 and inserts this combination into an excess data buffer 655 and also inserts the "pkt 3-2" into the excess data buffer 655. The excess data buffer 655 is stored in the alignment temporary storage 542 using the memory write 570b.

Upon arrival of a third 64-byte information element segment, the excess data buffer 655 is read from the alignment temporary storage 542 using the memory read 570a. The rotator 545 moves backward by (segment size—32) the third incoming 64-byte segment thus producing a "pkt 4-1" and a "pkt 4-2". The mixer 544 then combines the "pkt 4-1" with the excess data buffer 655 to form an information segment storage unit 658. The information segment storage unit 658 is sent to the DBU 292 or to the deferred buffer 536 if in UBR mode.

Because of a resource conflict at the mixer 544, a pipeline bubble is inserted to stall until the prior DBU write command to write the information segment storage unit 668 to memory completes. During the pipeline bubble, the rotator 545 moves backward by 16 bytes the third incoming 64-byte segment and the mixer 544 combines this rotated segment (i.e., "pkt 4-2") with a buffer header to form the excess data buffer 660. The excess data buffer 660 is stored in the alignment temporary storage 542 using the memory write 570b.

Upon arrival of a fourth 64-byte information element segment, the excess data buffer 660 is read from the alignment temporary storage 542 using the memory read 570a. The rotator 545 moves backward the fourth incoming 64-byte information element segment by (segment size—80) to produce "pkt 5-1" and "pkt 5-2". The mixer 544 combines the "pkt 5-1" with the excess data buffer 660 to produce an information segment storage unit 662 that is sent to the DBU 292 or to the deferred buffer 536 if in UBR mode. The rotator 545 moves backward by 16 bytes the resulting "pkt 5-2" and then the mixer 544 combines the rotated "pkt 5-2" with a buffer header to produce an excess data buffer 661. The excess data buffer 661 is stored in the alignment temporary storage 542 using the memory write 570b.

Upon arrival of a fifth 64-byte information element segment, the excess data buffer 661 is read from the alignment temporary storage 542 using the memory read 570a. The rotator 545 moves backward by (segment size—64) the fifth incoming 64-byte segment resulting in a "pkt 6-1" and a "pkt 6-2". The mixer 663 combines the excess data buffer 661 with the "pkt 6-1" and the "pkt 6-2" to produce an excess data buffer 663 that is stored in the alignment temporary storage 542 using the memory write 570*b*.

Upon arrival of a sixth 64-byte information element segment, the excess data buffer 663 is read from the alignment temporary storage 542 using the memory read 570*a*. The rotator 545 moves backward the sixth incoming 64-byte segment by (segment size—64) resulting in a "pkt 7-1" and a "pkt 7-2". The mixer 544 combines the excess data buffer 663 with the "pkt 7-1" to produce an information segment storage unit 665 that is sent to the DBU 292 or to the deferred buffer 536 if in UBR mode. The rotator 545 moves backward by 16 bytes the "pkt 7-2" and then the mixer 544 combines the "pkt 7-2" with a buffer header to produce an excess data buffer 664. The excess data buffer 664 is stored in the alignment temporary storage 542 using the memory write 570*b*.

Upon arrival of a seventh 64-byte information element segment, the excess data buffer 664 is read from the alignment temporary storage 542 using the memory read 570*a*. The rotator 545 moves backward by (segment size—48) the seventh incoming 64-byte segment resulting in a "pkt 8-1" and a "pkt 8-2". The mixer 544 combines the excess data buffer 664 with the "pkt 8-1" and the "pkt 8-2" to produce an excess data buffer 668. The excess data buffer 668 is stored in the alignment temporary storage 542 using the memory write 570*b*.

ii. Incoming Information Element is Larger than 64-Byte, First Information Element Segment is Less than 80-Byte The following table summarizes the operation from the first 64-byte to the eighth 64-byte of the packet arriving in the RWB stage 262. The width of the PCU pipeline 252 is 64 bytes and each buffer is able to store 112 bytes of data. Before the EOP arrives, the operation repeats after seven 64-byte data segments arrive in the RWB stage 262. Seven 64-byte data segments fill up the four 128-byte buffers exactly. A pipeline bubble is generated after receiving the 5$^{th}$ 64 Byte data due to a resource conflict.

FIGS. 30*a–e* show the alignment pipeline 267 and an example of aligning the data according to one embodiment of the present invention where the incoming information element is larger than 64 bytes and the first information element segment is less than 80 bytes. In FIGS. 30*a–e*, for the 84-byte information element segment, a rotator 545 moves backward by 36 bytes the 84-byte segment. The mixer 544 combines this rotated 84-byte segment (i.e., "pkt 1-1") with a buffer header to produce the first-half of a 128-byte excess data buffer 670. The mixer 544 inserts the non-rotated data segment (i.e., "pkt 1-2") into the other half of the 128-byte buffer. Because 112 bytes of data has not been accumulated in the excess data buffer 670, the excess data buffer 670 is stored in the alignment temporary storage 542 using the memory write 570*b*.

Upon arrival of a first 64-byte information element segment, the excess data buffer 670 is read from the alignment temporary storage 542 using the memory read 570*a*. The rotator 545 moves backward by (segment size—48) the first incoming 64-byte segment and the resulting "pkt 2-1" is combined, using the mixer 544, with the excess data buffer 670 to produce an information segment storage unit 672 that is sent to the DBU 292 or to the deferred buffer 536 if in UBR mode. The rotator 545 moves backward by 16 bytes the resulting "pkt 2-2" and then the mixer 544 combines the "pkt 2-2" with a buffer header to produce an excess data buffer 673. The excess data buffer 673 is stored in the alignment temporary storage 542 using the memory write 570*b*.

Upon arrival of a second 64-byte information element segment, the excess data buffer 673 is read from the alignment temporary storage 542 using the memory read 570*a*. The rotator 545 moves backward by (segment size—32) the second incoming 64-byte segment resulting in "pkt 3-1" and "pkt 3-2". The mixer 544 then combines the resulting "pkt 3-1 " with the excess data buffer 673 and inserts this combination in an excess data buffer 675 and also inserts the "pkt 3-2" into the excess data buffer 675. The excess data buffer 675 is stored in the alignment temporary storage 542 using the memory write 570*b*.

Upon arrival of a third 64-byte information element segment, the excess data buffer 675 is read from the alignment temporary storage 542 using the memory read 570*a*. The rotator 545 moves backward by (segment size—32) the third incoming 64-byte segment resulting in a "pkt 4-1" and a "pkt 4-2". The mixer 544 then combines the resulting "pkt 4-1" with the excess data buffer 675 to form an information segment storage unit 678. The information segment storage unit 667 is sent to the DBU 292 or to the deferred buffer 536 if in UBR mode. The rotator 545 moves backward by 16 bytes the resulting "pkt 4-2" and then the mixer 544 combines the rotated "pkt 4-2" with a buffer header to produce an excess data buffer 677 which is stored in the alignment temporary storage 542 using the memory write 570*b*.

Upon arrival of a fourth 64-byte information element segment, the excess data buffer 677 is read from the alignment temporary storage 542 using the memory read 570*a*. The rotator 545 moves backward by (segment size—16) the fourth incoming 64-byte segment to produce a "pkt 5-1" and a "pkt 5-2". The mixer 544 combines the excess data buffer 677 with the "pkt 5-1" and the "pkt 5-2" to produce an excess data buffer 679 that is stored in the alignment temporary storage 542 using the memory write 570*b*.

Upon arrival of a fifth 64-byte information element segment, the excess data buffer 679 is read from the alignment temporary storage 542 using the memory read 570*a*. The rotator 545 moves backward the fifth incoming 64-byte segment by (segment size—16) and this rotated segment (i.e., "pkt 6-1") is combined, using the mixer 544, with the excess data buffer 679 to produce an information segment storage unit 682. The information segment storage unit 682 is sent to the DBU 292 or to the deferred buffer 536 if in UBR mode.

Because of a resource conflict, a pipeline bubble is inserted to stall until the prior DBU write command to write the information segment storage unit 682 to memory completes. During the pipeline bubble, the rotator 545 moves backward by 16 bytes the "pkt 6-2", and then the mixer 544 combines the "pkt 6-2" with a buffer header to form an excess data buffer 683. The excess data buffer 683 is stored in the alignment temporary storage 542 using the memory write 570*b*.

Upon the arrival of a sixth 64-byte information element segment, the excess data buffer 683 is read from the alignment temporary storage 542 using the memory read 570*a*. The rotator 545 moves backward by (segment size—64) the sixth incoming 64-byte segment to produce a "pkt 7-1" and a "pkt 7-2". The mixer 544 combines the "pkt 7-1" with the excess data buffer 683 to produce an information segment storage unit 684 that is sent to the DBU 292 or to the deferred buffer 536 if in UBR mode. The rotator 545 moves backward by 16 bytes the "pkt 7-2" and then the mixer 544 combines the "pkt 7-2" with a buffer header to produce an excess data buffer 685. The excess data buffer 685 is stored in the alignment temporary storage 542 using the memory write 570b.

II. Differentiated Service ("DiffServ")

Differentiated Service ("DiffServ") is a mechanism that allows service providers to allocate different levels of service to different users on, for example, the Internet when using IP. DiffServ is not based on priority but on the possible forwarding behaviors of packets, called per-hop behavior ("PHB"). The PHB provides a particular service level (e.g., bandwidth, queuing, and dropping decisions) in accordance with network policy. A type of service ("TOS") field within the IP header identifies to the various packet switches and routers in an IP-based network those packets which would like preferential treatment on a Class of Service ("COS") basis. The 6 most significant bits of the TOS field of the IP header are used as the DiffServ Code Point ("DSCP") to indicate the PHB to which this packet belongs.

The DiffServ includes the following components: packet classification, and traffic conditioning, e.g., policing, dropping, marking, and shaping. When the traffic enters a network, it is classified and conditioned if it is at the boundary of the network, and then assigned to different behavior aggregates ("BAs"). Each BA is identified by the DSCP of the packet. Within this network, the traffic is forwarded according to the PHB associated with the BA.

1. Packet Classification

A classifier reads the DSCP or a combination of DSCP and other fields (e.g., source address and destination address) and selects and routes information elements to a traffic metering unit 245. There are two types of packet classification defined for DiffServ:

Behavior Aggregate ("BA")—classification based on the DSCP

Multi-Field ("MF")—classification based on the value of a combination of one or more header fields such as a source address, a destination address, DiffServ field, protocol ID, source port, and destination port numbers, and other information such as incoming interface.

The network processor supports both types of classification by programming CAM search key instructions accordingly.

2. Traffic Conditioning a. Metering

The traffic meter monitors the incoming stream of packets, selected by a classifier, against a traffic profile that is specified in a Traffic Conditioning Agreement ("TCA"). A TCA is an agreement specifying classifier rules and any corresponding traffic profile and policing, marking, discarding and/or shaping rules which are to be applied to the traffic streams (e.g., flows) selected by the classifier. The traffic meter determines whether or not the incoming traffic is in-profile or out-of-profile and notifies the other components for appropriate actions. If located on the edge of the network, the traffic meter prevents traffic violating the QoS agreement from damaging the rest of the network.

For the traffic metering, there are 64 information element policing instructions ("PPIs"), one for each of the DSCPs of the packet. After the DSCP is determined, the corresponding PPI is fetched. An information element policing state ("PPS") corresponding to the flow to which this packet belongs is also fetched. The PPI and the PPS are described in greater detail below.

Figure 31:
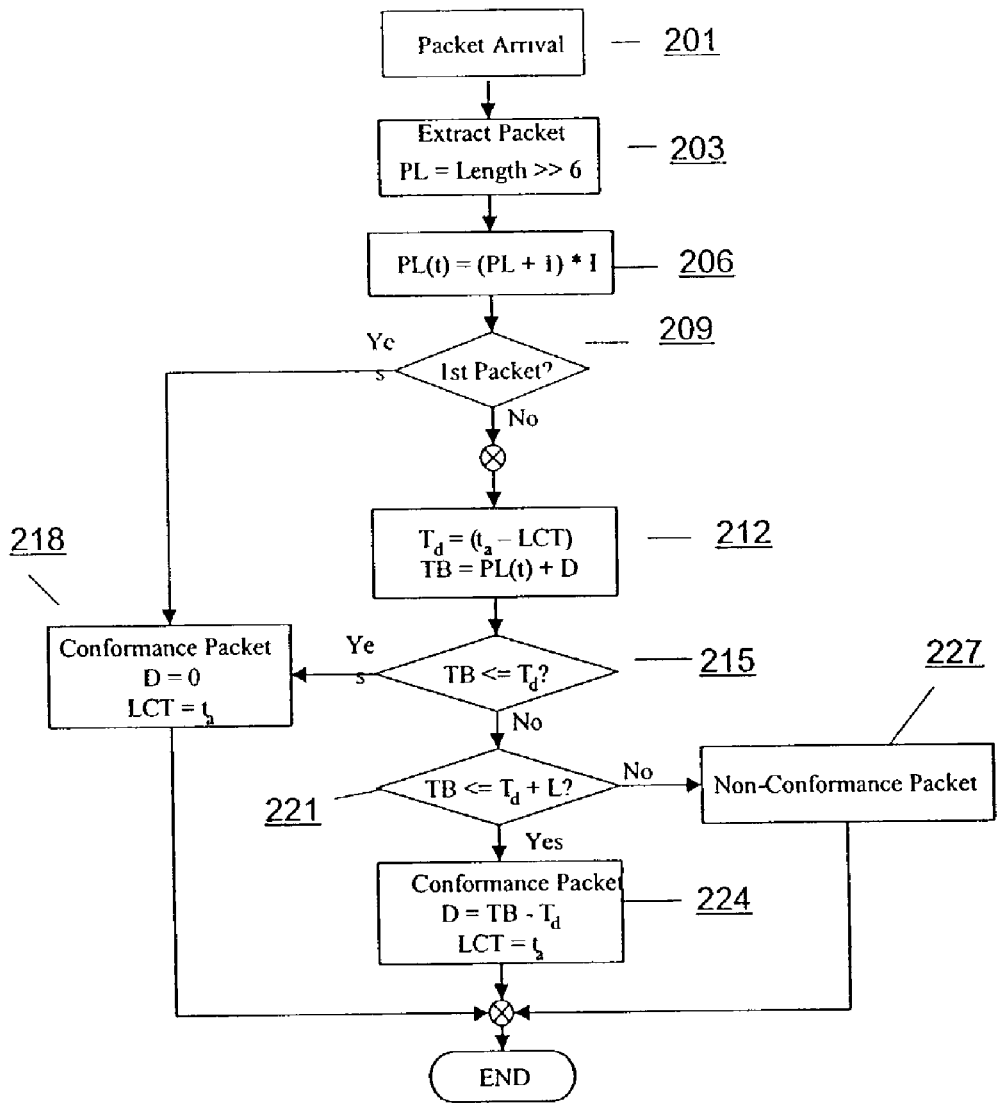
FIG. 31 shows an embodiment of a metering function process according to the present invention.

FIG. 31 shows an embodiment of a traffic metering function process according to the present invention. This metering function can be performed on, for example, cells and IP packets. The traffic metering function can be used to determine if the information element conforms to a peak rate or to a committed rate. For cells, the length is the same for all cells and therefore the information element length is not determined in step 203. In step 201, an information element is received. In step 203, the length of the received information element is extracted from the information element. The information element length is a measurement of the size of the information element and has units of, for example, bytes and can be extracted from the information element's layer 2 ("L2") header if available or an IP header if the information element is an IP packet. Given that the network processor can be configured to support one or multiple ports, the location to extract the information element length information can be fixed on a per physical port basis. For example, if the network processor is configured to support 16 input ports, the network processor can provide a set of 16 programmable 6-bit offsets to specify the length of the information element based on the port at which the information element arrived. In step 206, a "required time between information elements", PL(t), is calculated. The "required time between information elements" is the time interval required between the arrival of two successive information elements given the quality of service of the flow to which the information elements belong. The "required time between information elements" is calculated by adding one to the information element length and multiplying this by the unit interval ("UI"). For example, when the traffic metering function is checking conformance to the peak rate, the unit interval is specified by the "peak rate increment" field of the PPI and when the traffic metering function is checking conformance to the committed rate, the unit interval is specified by the "committed rate increment" field of the PPI.

In step 209, a determination is made as to whether this is the first information element of the flow. If this is the first information element of the flow, then the process proceeds to step 218 from step 209. If this is not the first information element of the flow, then the process proceeds to step 212. In step 212, the "actual time" ("Td") between arrival of the two successive information elements of a flow is calculated. The "actual time" is calculated by subtracting the LCT from the arrival time of the received information element ("$t_a$"). The arrival time of the received information element can be found, for example, by using the time stamp on that information element. The LCT is specified, for example, within the "last conformance time" field of an information element PPS. In step 212, the "required time between information elements" is adjusted to account for debt incurred by a previous information element. For example, when the traffic metering function is checking conformance to the peak rate, the debt specified by the "peak rate debt" field of the PPS is used and when the traffic metering function is checking conformance to the committed rate, the debt specified by the "committed rate debt" field of the PPS is used. The adjusted "required time between information elements" is referred to as the "token bucket" ("TB"). In step 218, the debt ("D") is set to zero and the LCT is set to the arrival time of this first information element. In step 215, it is determined if the "token bucket" is less than or equal to the "actual time" (if the "token bucket" is less than or equal to the "actual time", then the information element arrives after the "required time between information elements" has elapsed). If the "token bucket" is less than or equal to the "actual time", then the information element is conforming and in step 218, the debt is reset to zero and the LCT is set to the arrival time of the information element. If the "token bucket" is greater than the "actual time," then the information element is nonconforming without incurring any debt and in step 221, it is determined if the "token bucket" is less than or equal to the "actual time" plus the limit ("L") that can be borrowed for the subsequent time intervals (i.e., incurring debt). For example, when the traffic metering function is checking conformance to the peak rate, the limit specified by the "peak rate limit" field of the PPI is used and when the traffic metering function is checking conformance to the committed rate, the limit specified by the "committed rate limit" field of the PPI is used. If the "token bucket" is less than or equal to the "actual time" plus the limit, then in step 224, the information element is considered conforming and the LCT is set to the arrival time of the information element and the debt is set to the "token bucket" minus the actual time. In this case, the conforming information element borrowed credits from subsequent time intervals in order to be conforming. If the "token bucket" is greater than the "actual time" plus the limit (i.e., not enough credits could be borrowed from subsequent time intervals), then in step 227, the information element is labeled nonconforming. The metering function indicates whether the received information element conforms or does not conform to a peak rate or a committed rate.

The traffic metering function is performed within the EXE stage 260 of the PCU pipeline 252. FIG. 32 shows an embodiment of the traffic metering unit 245 according to the present invention. A policer unit 306 within the PCU pipeline includes the traffic metering unit 245. The traffic metering unit 245 can be used to check whether the information element conforms to a peak rate and a committed rate. The traffic metering unit 245 includes a length determination unit 247, a time interval required determination unit 251, and a conformance checking unit 255 that are used to determine whether the information element conforms to the peak rate. The traffic metering unit 245 also includes a length determination unit 249, a time interval required determination unit 253, and a conformance checking unit 256 used to determine whether the information element conforms to the committed rate. Each of the length determination units 247 and 249 receives an information element and extracts from it the length of the received information element. The length determination units 247 and 249 are coupled, respectively, to the time interval required determination units 251 and 253. The time interval required determination units 251 and 253 determine the time interval required between the arrival of two successive information elements given the quality of service of the flow to which the information elements belong. The conformance checking units 255 and 256 are coupled, respectively, to the time interval required determination units 251 and 253. Each of the conformance checking units 255 and 256 checks whether the received information element is conforming without borrowing from subsequent time intervals (e.g., conforming without incurring debt), conforming by having to borrow from subsequent time intervals, and nonconforming. The output of the conformance checking unit 255 indicates whether the received information element is conforming (with or without borrowing from subsequent time intervals) or nonconforming to the peak rate. The output of the conformance checking unit 256 indicates whether the received information element is conforming (with or without borrowing from subsequent time intervals) or nonconforming to the committed rate. Nonconforming information elements are either dropped or as with a conforming information element, sent to a marker unit.

FIG. 33 shows an embodiment of the conformance checking units 255 or 256 according to the present invention. The conformance checking unit 255 or 256 includes a conformance without debt checking unit 259 and a conformance with debt checking unit 262. The conformance without debt checking unit 259 calculates the "actual time" and the "token bucket." If the "token bucket" is less than or equal to the "required time between information elements," then the incoming information element is considered conforming. If the "token bucket" is greater than the "required time between information elements," then the incoming information element is sent to the conformance with debt checking unit 262. The conformance with debt checking unit 262 determines if the "token bucket" is less than or equal to the "actual time" plus the limit that can be borrowed from the subsequent time intervals. If the "token bucket" is less than or equal to the "actual time" plus the limit, then the information element is considered conforming, otherwise, it is considered nonconforming.

In addition to network traffic congestion, congestion of the storage unit 171 (e.g., the storage unit 171 stores, for example, "information segment storage units") should be monitored and the impact of any negative conditions such as a broken or congested downstream link should be minimized. Traffic (e.g., flows or virtual circuits) destined for the broken or congested link will back up and may eventually overflow the storage unit 171 that is shared by all the other traffic and this results in blocking traffic destined for non-congested or nonbroken links.

A storage congestion metering unit isolates and minimizes the impact of any breakdown or slowdown in the downstream links. The storage congestion metering unit prevents unwanted traffic from flooding the storage unit which prevents the network processor from processing higher priority or premium traffic. The storage congestion metering unit uses the WRED mechanism to control storage unit congestion. In this embodiment, the storage unit 171 is divided into 256 different classes. A group of flows or virtual circuits are mapped to each of the classes. The number of different classes varies; for example, in another embodiment, the number of classes equals the number of flows and each flow is assigned to a different class. The WRED mechanism uses the crossing of thresholds and a drop probability in determining whether to discard the packet. The first threshold in the WRED mechanism anticipates the storage unit congestion and drops packets selectively using the drop probability before the actual congestion happens. For example, if the traffic is composed of TCP packets, the transmitting TCP nodes retransmit the packets when they are dropped and they slow down transmission rates if the receiving party does not acknowledge receipt of the packet within a specified time window. If the situation worsens, then after the second threshold is crossed, the WRED mechanism discards the information elements arriving at the network processor.

Figure 34:
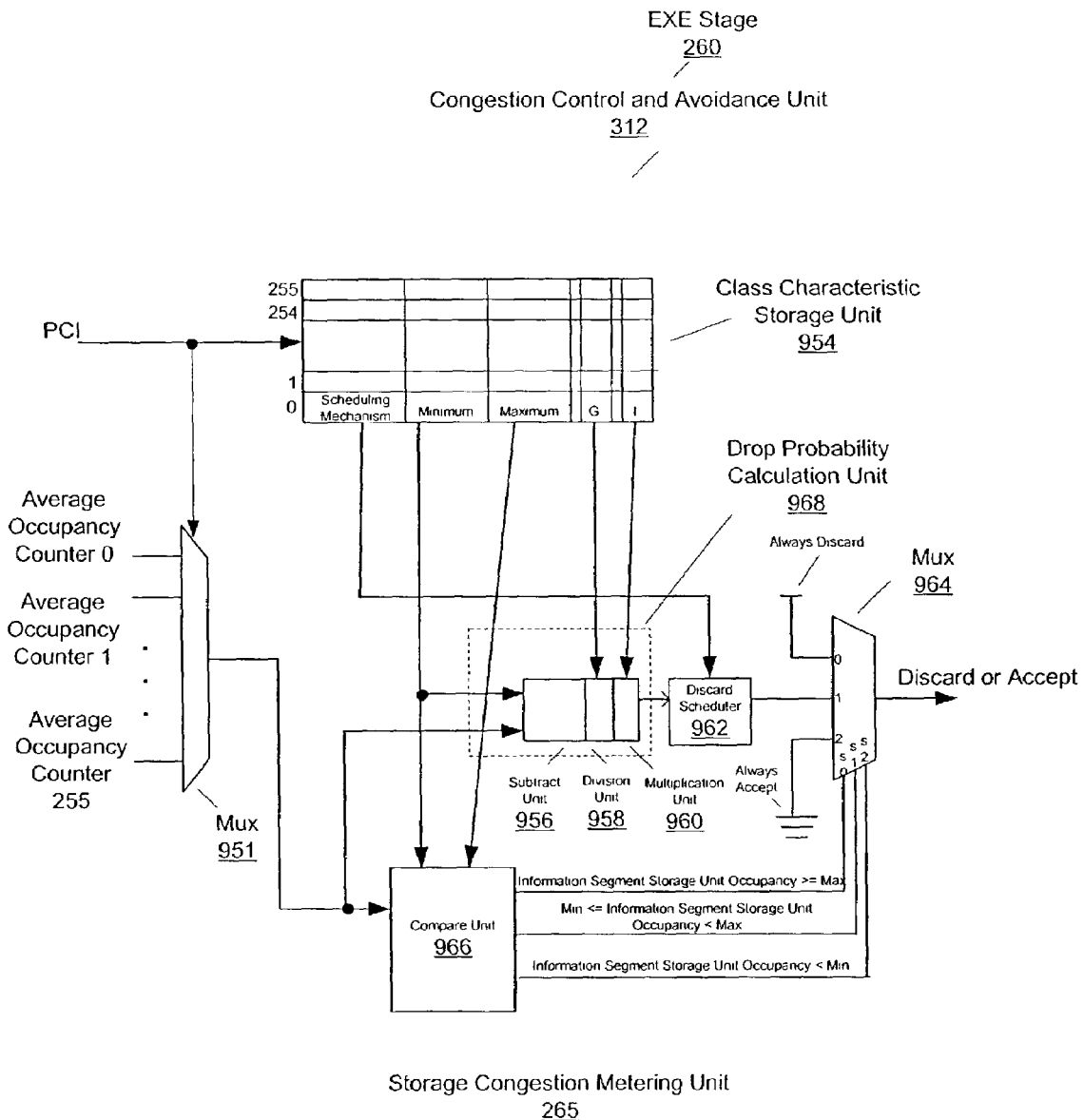
FIG. 34 shows an embodiment of a storage congestion metering unit 265 according to the present invention.

FIG. 34 shows an embodiment of a storage congestion metering unit 265 according to the present invention. In this embodiment, the congestion control and avoidance unit 312 of the EXE stage 260 includes the storage congestion metering unit 265. The storage congestion metering unit 265 includes a multiplexer 951 that selects one of the average occupancy counters that corresponds to the class of the flow to which the incoming information element belongs. The time period used to calculate the average occupancy, as specified by the average occupancy counter, is programmable by a user. This time period may be of such short duration that the average occupancy is actually the current occupancy at a specific time. The class of the flow is specified, for example, within a "WRED Drop Precedence" field of the PCI. In this embodiment, each of the average occupancy counters specifies the average number of "information segment storage units" that are occupied for a particular class. The class to which the flow of the incoming information element belongs (this class is specified by the "WRED Drop Precedence" field of the PCI) is also used to select one of the entries of a class characteristic storage unit 954. The storage congestion metering unit 265 also includes the class characteristic storage unit 954. Each of the entries of the class characteristic storage unit 954 includes a scheduling entry that specifies one or more information elements arriving at different positions that are to be discarded such that the discard scheduler 962 can discard these one or more information elements in a balanced manner. For example, the scheduling entry uses a binary tree algorithm and if the drop probability for the particular class to which the scheduling entry corresponds is calculated to be 5/256, then using the binary tree algorithm to discard in a balanced manner, the discard scheduler 962, for 256 consecutive information elements belonging to flows of the particular class, specifies to discard the $32^{nd}$, the $64^{th}$, the $128^{th}$, the $192^{nd}$, and the $224^{th}$ incoming information elements.

Each of the entries of the class characteristic storage unit 954 also includes a minimum number of occupied "information segment storage units" within the particular class. When crossing this first threshold, the incoming information element may be discarded based on the drop probability and the scheduling entry for the particular class to which the flow of the incoming information element belongs. The number of occupied "information segment storage units" within the particular class may be specified using the number of occupied "information segment storage unit" rows within the particular class where each of these rows includes an "information segment storage unit" from each of the channels within the storage unit 171. In the case where the number of occupied "information segment storage unit" rows is used, a particular one of the "information segment storage unit" rows is occupied if one of the "information segment storage units" within that row contains data from an information element belonging to a flow of the particular class. If the number of "information segment storage unit" rows occupied within a particular class is less than the minimum number of occupied "information segment storage unit" rows for that class, then the incoming information element is accepted (e.g., the information element is stored within the storage unit 171). Each entry also includes a maximum number of occupied "information segment storage unit" rows within the particular class. When crossing this second threshold, the incoming information element is discarded. Each entry also includes the number of "information segment storage unit" rows per drop probability increment ("G") and also the drop probability increment per "information segment storage unit" row step ("I"). The "G" and "I" parameters are explained in greater detail in the description for FIG. 35.

A compare unit 966 compares the average "information segment storage unit" occupancy of a particular class using the average occupancy counter for that class with the maximum number of occupied "information segment storage unit" rows and the minimum number of occupied "information segment storage unit" rows for that class. If the average "information segment storage unit" occupancy is less than the minimum number of occupied "information segment storage unit" rows, then a multiplexer 964 selects as its output a particular one of the inputs that indicates that the incoming information element is to be accepted. If the "information segment storage unit" occupancy is greater than or equal to the maximum number of occupied "information segment storage unit" rows, then the multiplexer 964 selects as its output a particular one of the inputs to indicate that the incoming information element is to be discarded. If the "information segment storage unit" occupancy is less than the maximum number of occupied "information segment storage unit" rows and greater than or equal to the minimum number of occupied "information segment storage unit" rows, then the information element is discarded based on a drop probability which is calculated according to the equation: drop probability=((average "information segment storage unit" occupancy−minimum number of occupied "information segment storage unit" rows)/G)*(I). Whether to accept or discard the incoming information element is specified by the output of the discard scheduler 962. If the "information segment storage unit" occupancy is less than the maximum number of occupied "information segment storage unit" rows and greater than or equal to the minimum number of occupied "information segment storage unit" rows, then the multiplexer 964 selects as its output the output of the discard scheduler 962.

In calculating the drop probability, a subtract unit 956 has as one input the minimum number of occupied "information segment storage unit" rows and has as another input the average "information segment storage unit" occupancy, as specified by the average occupancy counter for the particular class to which the flow of the incoming information element belongs. The subtract unit 956 subtracts the minimum number of occupied "information segment storage unit" rows from the average "information segment storage unit" occupancy and outputs this result. The output of the subtract unit 956 is coupled to one of the inputs of a division unit 958. Another one of the inputs of the division unit 958 is coupled to the G value within one of the entries within the class characteristic storage unit 954 that is associated with the particular class. The division unit 958 divides the result of the subtract unit 956 with the G value and outputs this result. The output of the division unit 958 is coupled to one of the inputs of a multiplication unit 960. Another one of the inputs of the multiplication unit 960 is coupled to the I value within the particular one of the entries corresponding to the particular class. The multiplication unit 960 multiplies the result of the division unit 958 with the I value and outputs this result which is the drop probability for the particular class. The division unit 958 and the multiplication unit 960 can be implemented, for example, using a shifter. The output of the multiplication unit 960 is coupled to one of the inputs of a discard scheduler 962. Another one of the inputs of the discard scheduler 962 is coupled to the scheduling entry within the particular one of the entries corresponding to the particular class. The scheduling entry specifies one or more information elements arriving at different positions so that the discard scheduler 962 can discard these one or more information elements in a balanced manner. The discard scheduler 962 specifies whether to accept or discard the incoming information element given the calculated drop probability for the particular class and the order of arrival of the information element so that incoming information elements are discarded in a balanced manner. The output of the discard scheduler 962 is coupled to the multiplexer 964.

Figure 35:
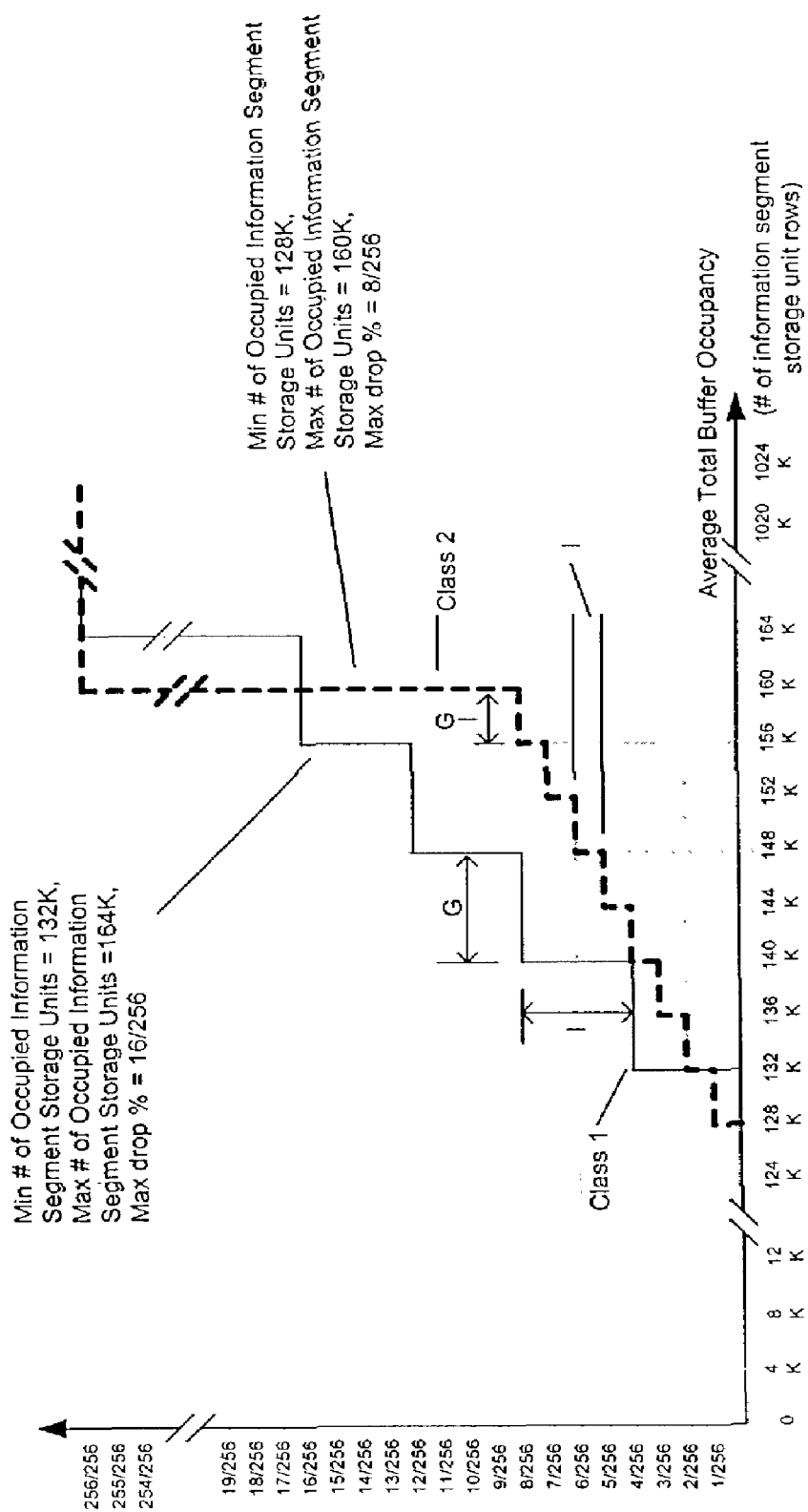
FIG. 35 shows examples of calculating the drop probability for two different classes.

FIG. 35 shows examples of calculating the drop probability for two different classes. In FIG. 35, the graph for class 1 shows that the "minimum number of occupied information segment storage unit rows" equals 132K (this is the minimum number of occupied information segment storage unit rows where the drop probability is considered in determining whether to accept or discard the information element). The graph for class 1 also shows that the "maximum number of occupied information segment storage unit rows" equals 164K (this is the maximum number of occupied information segment storage unit rows and at this threshold, the incoming information elements are discarded). The value of G which is the number of "information segment storage unit" rows per drop probability increment equals 8K (148K–140K). The value of I which is the drop probability increment per "information segment storage unit" row step equals 4/256 (8/256–4/256). The maximum drop probability is calculated using the equation: maximum drop probability=((maximum number of occupied "information segment storage unit" rows−minimum number of occupied "information segment storage unit" rows)/G)*(I). Using this equation, the maximum drop probability before reaching the second threshold for class 1 is found to equal 16/256.

In FIG. 35, the graph for class 2 shows that the "minimum number of occupied information segment storage unit rows" equals 128K. The graph for class 2 also shows that the "maximum number of occupied information segment storage unit rows" equals 160K. The value of G equals 4K (160K–156K). The value of "I" equals 1/256 (6/256–5/256). The maximum drop probability is calculated using the equation: maximum drop probability=((maximum number of occupied "information segment storage unit" rows−minimum number of occupied "information segment storage unit" rows)/G)*(I). Using this equation, the maximum drop probability before reaching the second threshold for class 2 is found to equal 8/256.

Figure 36:
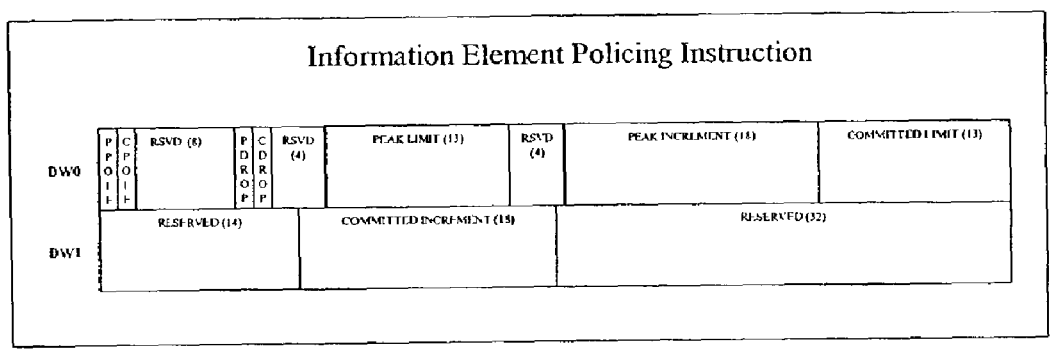
FIG. 36 shows an embodiment of an information element policing instruction according to the present invention.

FIG. 36 shows an embodiment of an information element policing instruction 950 according to the present invention. The information element policing instruction 950 includes a "committed rate limit" ("committed limit") field that indicates the limit or tolerance that can be allowed when policing the committed rate profile. If the incoming packet exceeds the "token bucket" by an amount smaller than this limit, it is considered conforming or in-profile. This is also the maximum token that can be borrowed from the subsequent intervals. A "peak rate increment" ("peak increment") field indicates the peak number of system clocks per 64-byte payload unit. It can be derived from the rate of the profile to be policed. This field is used to approximate the theoretical number of tokens required by the current packet with a certain packet length. The required tokens value is then compared against the actual number of tokens accumulated since the last conformed packet to determine conformance.

A "peak rate limit" ("peak limit") field indicates the limit or tolerance that can be allowed when policing the peak rate profile. If the incoming packet exceeds the token bucket by an amount smaller than this limit, it is considered conforming or in-profile. This is also the maximum token that can be borrowed from the subsequent intervals. A "rate committed drop" ("CDROP") field indicates the action for the packet that does not conform to the committed rate profile. If the bit in this field is set to logic '1', the non-conformance packet for the committed rate policer is dropped. If the bit in this field is cleared to logic '0', the non-conformance packet for the committed rate policer is passed on to the marker. A "peak rate drop" ("PDROP") field indicates the action for the packet that does not conform to the peak rate profile. If the bit in this field is set to logic '1', the non-conformance packet for the peak rate policer is dropped. If the bit in this field is cleared to logic '0', the non-conformance packet for the peak rate policer is passed on to the marker.

A "committed rate policer enable" ("CPOLE") field indicates that the policer for the committed rate profile is enabled. A "peak rate policer enable" ("PPOLE") field indicates that the policer for the peak rate profile is enabled.

A "committed rate increment" ("committed increment") field indicates the peak number of system clocks per 64-byte payload unit. It can be derived from the rate of the profile to be policed. This field is used to approximate the theoretical number of tokens required by the current packet with a certain packet length. The required tokens value is then compared against the actual number of tokens accumulated since the last conformed packet to determine conformance.

Figure 37:
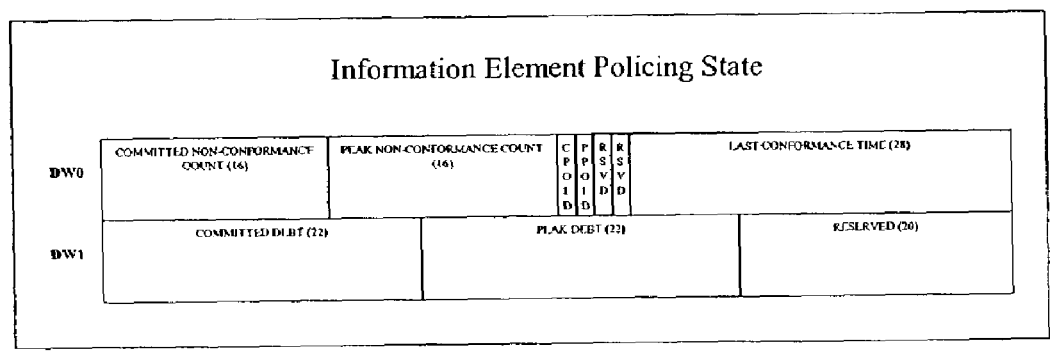
FIG. 37 shows an embodiment of an information element policing state according to the present invention.

FIG. 37 shows an embodiment of an information element policing state 952 according to the present invention. The information element policing state 952 includes a "last conformance time" field that is the time stamp of the last conformance packet. When a new information element such as a packet arrives, this field is used to determine the elapsed time since the previous packet. In this algorithm, the time unit is the token. This actual elapsed time or accumulated tokens is used to compare against the theoretical elapsed time or required tokens to determine whether or not the current packet is conformance or in-profile. If the accumulated tokens are less then the required tokens, where all "L" tokens can be borrowed from the subsequent intervals, then the packet is considered out-of-profile and subject to the non-conformance action, which is either, for example, to drop the packet or to forward it. A "peak rate policer discard" ("PPOLD") field indicates whether the current state of the peak rate policer is the discard state. This is to remember to drop the rest of the current packet.

A "committed rate policer discard" ("CPOLD") field indicates whether the current state of the committed rate policer is the discard state. This is to remember to drop the rest of the current packet. A "peak rate drop count" ("peak non-conformance count") field includes the count of packet dropped because it does not pass the peak rate policer. When the "peak rate policer discard" is enabled, this field is incremented by one each time a packet is found to be non-conforming. When the counter rolls over, the PCU reports this rollover to an HIF unit. A "committed rate count" ("committed non-conformance count") field includes the count of drop packet because it does not pass the committed rate policer. When the "committed rate policer field" is enabled, this field is incremented by one each time a packet is found to be non-conforming. When the counter rolls over, the PCU reports this rollover to the HIF and reset the counter to zero. A "peak rate debt" ("peak debt") field indicates the number of tokens that was borrowed from the previous intervals in order for the previous packets to conform to the peak rate policer. A "committed rate debt" ("committed debt") field indicates the number of tokens that was borrowed from the previous intervals in order for the previous packet to conform to the committed rate policer.

b. Marking

The marking unit sets the DiffServ field (i.e., the TOS field) of an IP packet to a particular DSCP. The network processor includes a marking unit that can be configured to perform the following markings:

Incoming packet is an unmarked packet and the outgoing packet is to be marked: In this mode, the network processor marks the packet after classifying it into a particular flow. The marking mode is a per-flow value and is specified in a PCI.

Incoming packet is a marked packet and the outgoing packet is also a marked packet: The network processor checks whether the packet is in-profile using the traffic metering unit 245 (shown in FIG. 38) and remarks the packet according to the output of the traffic metering unit 245 and a storage congestion metering unit 265 (shown in FIG. 38).

Figure 38:
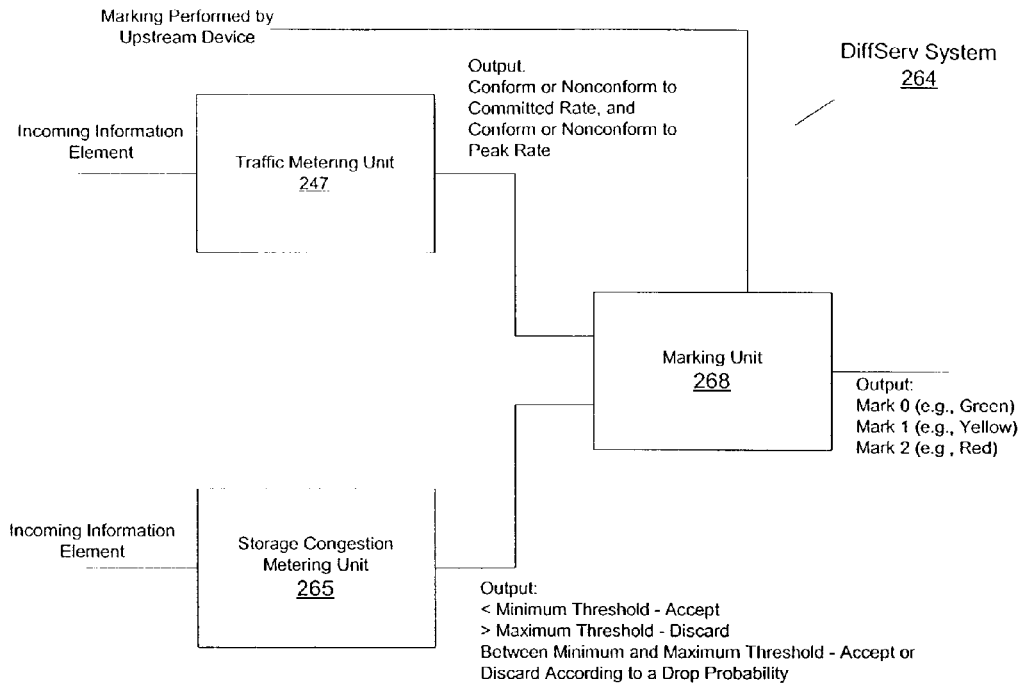
FIG. 38 shows an embodiment of a differentiated services system according to the present invention.

FIG. 38 shows an embodiment of a DiffServ system 264 according to the present invention. The DiffServ system 264 includes the traffic metering unit 245 that provides as its output whether the incoming information element conforms to the committed rate and whether the incoming information element conforms to the peak rate. The DiffServ system 264 also includes a storage congestion metering unit 265 that determines the degree of memory space occupancy of a class of a storage unit to which the flow of the incoming information element belongs. If the memory space occupancy is less than a minimum threshold, then the incoming information element is accepted. If the memory space occupancy is between a minimum threshold and a maximum threshold, then the incoming information element is accepted or dropped according to a drop probability. If the memory space occupancy is above a maximum threshold, then the incoming information element may be dropped. The Diffserv system 264 also includes a marking unit 268 that is coupled to the traffic metering unit 245 and the storage congestion metering unit 265. The marking unit 268 marks the incoming information element one of multiple values (e.g., red, green, or yellow) based on the result of either the traffic metering unit 245 or the storage congestion metering unit 265. The marking of the incoming information element by the marking unit 268 may also depend on the marking performed by an upstream device, such as a router or switch located upstream from the network processor.

Figure 39:
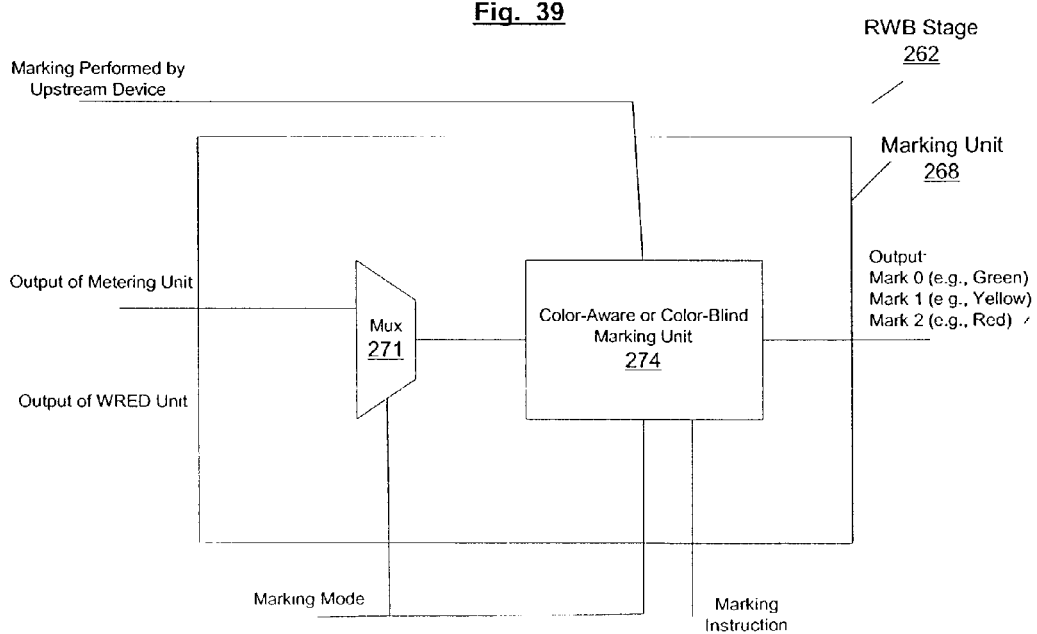
FIG. 39 shows an embodiment of the marking unit according to the present invention.

FIG. 39 shows an embodiment of the marking unit 268 according to the present invention. The RWB stage 262 of the PCU pipeline 252 includes the marking unit 268. The marking unit 268 includes a multiplexer 271 and a color-aware or color-blind marking unit 274. The multiplexer 271 is coupled to the color-aware or color-blind marking unit 274 and the multiplexer 271 selects between the output of the traffic metering unit 245 and the output of the storage congestion metering unit 265. In this embodiment, the output of the multiplexer 271 (i.e., whether it is the output of the traffic metering unit 245 or the output of the storage congestion metering unit 265) is determined by the "marking mode" ("mark mode") field of the PCI. The color-aware or color-blind marking unit 274 marks the incoming information element based on the output of the multiplexer 271. In addition, the marking of the information element is also based on whether the color-aware or color-blind marking unit 274 is in a color-blind mode or a color-aware mode. In this embodiment, whether the color-aware or color-blind marking unit 274 is in the color-blind or the color-aware mode is specified by the "marking mode" field of the PCI. If in the color-aware mode, the marking of the information element by upstream devices is also considered when marking the incoming information element. For example, in a color-blind mode, an information element marked yellow is processed in the same way as an information element marked green or red. In a color-aware mode, the information element is processed differently depending on its color. A "marking instruction" that is, for example, physical port specific is also input into the color-aware or color-blind marking unit 274 to specify, for example, where in the packet to mark and the location of the mark values.

i. Marking Mode

The "marking mode" input into the marking unit 268 can be configured on a per-flow basis. The PCI has a "marking mode" field that specifies one of the following modes:

| | |
|---|---|
| 000 | No Marking |
| 001 | Color-Blind and use the Policer result as input |
| 010 | Color-Blind and use the WRED result as input |
| 011 | Reserved |
| 100 | No Marking |
| 101 | Color-Aware and use the Policer result as input |
| 110 | Color-Aware and use the WRED result as input |
| 111 | Reserved |

The color remarking mode are defined as followed

Color-Blind—no checking of the color (e.g., mark) of the incoming packet while it does the marking.

Color-Aware—checking the color (e.g., mark) of the incoming packet while it does the marking. The objective of the color-aware mode is not to mark packets that are already out-of-profile back to in-profile.

ii. Marking Instruction

The network processor provides two sets of marking instruction for the marking unit 268. The marking instruction is specified per physical port. Each marking instruction includes the following data structures:

16 offsets (bytes from beginning of packet) to locate the marked value (color) of the incoming packet—one offset per ingress physical port 16 sets of 3 mark values with one mask for checking the color of the incoming packet in the color-aware mode—one set per ingress physical port 1 shift value for right-aligning the marked value (color) for indexing to the Encap->PHB mapping table 16 offsets (bytes from beginning of packet) to locate where to remark the packet—one offset per egress physical port 16 sets of 3 mark values with one mask for remarking the packet—one set per egress physical port The network processor also provides two tables for converting the encapsulation to the PHB and vice versa. Two conversions are performed by the network processor. The first conversion occurs so that the network processor can understand the marking of the arriving packet by an upstream device, and the second conversion occurs so that the next device can understand the marking provided by the network processor. The size of the two tables may be, for example:

Encapsulation->PHB–256 entries×8 bits/entry

PHB->Encap–256 entries×8 bits/entry

In this embodiment, the marking unit 268 marks the packet with three different colors (marking values). The values are defined as 8-bit values with a mask for flexibility in selecting which bits to be remarked. All three marking values share one mask value to form a four 8-bit fields register as defined below.

| Field Name | | Default Value | Mode | Description |
|---|---|---|---|---|
| [31:24] | Mask | 0x0 | R/W | This field indicates the mask to use with the Mark Value when the packet is remarked. |
| [23:16] | Mark Value 2 | 0x0 | R/W | This field indicates the value along with the mask for use to remark the packet when the packet fails both policers. |

-continued

| Field Name | Default Value | Mode | Description |
|---|---|---|---|
| [15:8] Mark Value 1 | 0x0 | R/W | This field indicates the value along with the mask for use to remark the packet when the packet fails policer 1 and passes policer 2. |
| [7:0] Mark Value 0 | 0x0 | R/W | This field indicates the value along with the mask for use to remark the packet when the packet passes both policers. |

For the color-aware mode, the network processor provides two of the above register, one for incoming color check and one for color remarking. This is done to support proprietary marking within a DiffServ domain. A marked packet from an upstream DiffServ domain can have a different marking for the same PHB. The ingress node of the down stream DiffServ domain can use one set of marking value for checking and then remark the traffic to different values. This is also necessary to support MPLS DiffServ, which requires conversion from DSCP to experiment ("EXP") and vice versa.

The marking location is also specified. The network processor provides configurable offsets, in bytes from the beginning of the packet, to both of the mark values, before and after. These offsets are on a per-physical-port basis since each physical port can support different L2 protocols, resulting in different locations of the DSCP and the EXP fields.

The network processor provides two sets of marking instructions to support the label exchange router ("LER") application in the MPLS domain. In MPLS, the incoming packet on the same physical port can be either labeled or not labeled; meaning different marking values and offsets are possible on the same physical port.

A PPU is responsible for determining whether the incoming packet is labeled or not since it does a lookup on the protocol type. The PPU has an 8-bit register to indicate which set to use. Each bit of the 8-bit corresponds to the result of the first indirect lookup one to one. For example, if the result of the lookup is a hit with index 0, bit 0 of this register is sent to the PCU to select the Marking Instruction set.

Figure 40:
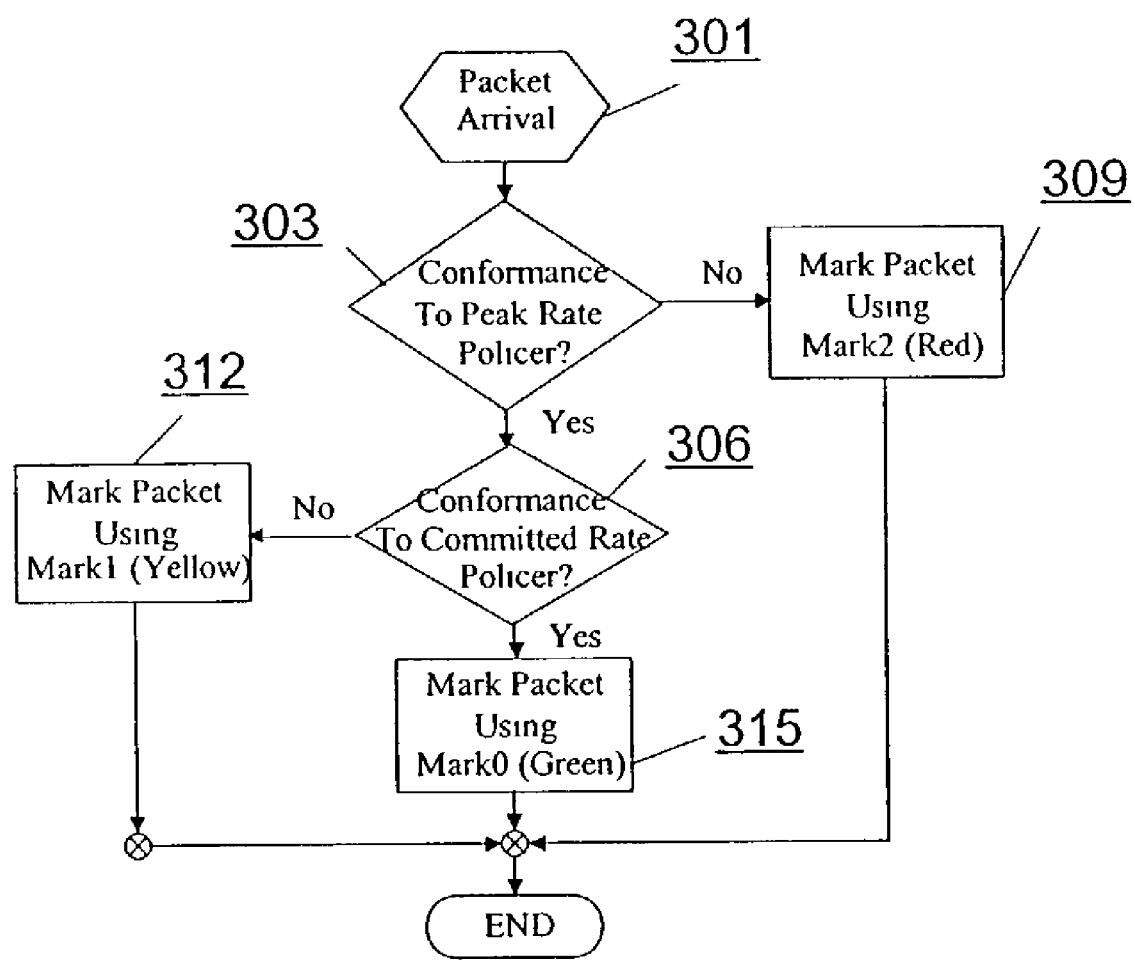
FIG. 40 shows an embodiment of a color-blind marking process using the policer result.

The traffic metering unit 245 and the storage congestion metering unit 265 can be configured to mark or drop a non-conforming packet. If the packet is dropped, the marking unit 268 will not see the packet. FIG. 40 shows an embodiment of a color-blind marking process using the output of the traffic metering unit 245. In FIG. 40, the multiplexer 271 selects as its output the output of the traffic metering unit 245, and the color-aware or color-blind marking unit 274 operates in the color-blind mode. In step 301, the packet is received at the marking unit 268. In step 303, it is determined if the packet conforms to the peak rate. Whether the packet conforms to the peak rate was previously determined by the traffic metering unit 245. If the packet does not conform to the peak rate, then, in step 309, it is marked with the "mark value 2" (e.g., it is marked "red"). For example, the "mark value 2" is specified by bits 23 to 16 of the marking instruction which is input into the color-aware or color-blind marking unit 274. If the packet conforms to the peak rate, then in step 306, it is determined if the packet conforms to the committed rate. If the packet does not conform to the committed rate, then in step 312, it is marked with "mark value 1" (e.g., it is marked "yellow"). If the packet conforms to the committed rate, then in step 315, it is marked with "mark value 0" (e.g., it is marked "green").

Figure 41:
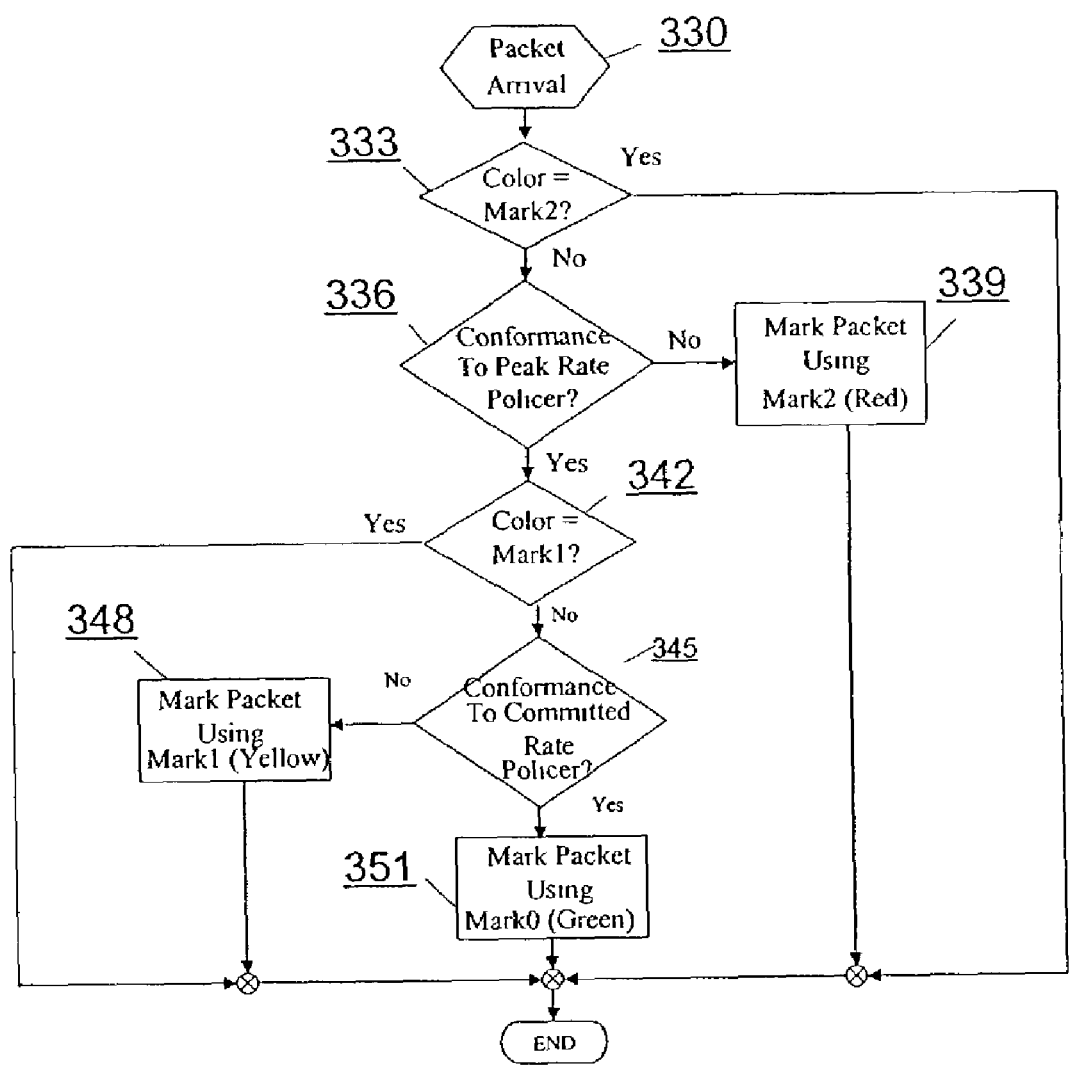
FIG. 41 shows an embodiment of a color-aware marking process using the policer result.

FIG. 41 shows an embodiment of a color-aware marking process using the output of the traffic metering unit 245. In FIG. 41, the multiplexer 271 selects as its output the output of the traffic metering unit 245 and the color-aware or color-blind marking unit 274 operates in the color-aware mode. In step 330, the packet is received at the marking unit 268. In step 333, it is determined if the packet has been previously marked with the "mark value 2" by an upstream device. If the packet has been previously marked with the "mark value 2" by an upstream device, then this marking is maintained, i.e., the marking unit 268 does not mark as conforming packets that are already marked as nonconforming. If the packet has not been previously marked with the "mark value 2" by an upstream device, then in step 336, it is determined if the packet conforms to the peak rate. If the packet does not conform to the peak rate, then in step 339, it is marked with the "mark value 2". If the packet does conform to the peak rate, then in step 342, it is determined if the packet has been previously marked with the "mark value 1" by an upstream device. If the packet has been previously marked with the "mark value 1" by an upstream device, then this marking is maintained. If the packet has not been previously marked with the "mark value 1" by an upstream device, then in step 345, it is determined if the packet conforms to the committed rate. If the packet does not conform to the committed rate, then in step 348, it is marked with "mark value 1" (e.g., it is marked "yellow"). If the packet conforms to the committed rate, then in step 351, it is marked with "mark value 0" (e.g., it is marked "green").

The metering function can also be performed by the storage congestion metering unit 265. In this embodiment, the marking unit 268 marks the packets that have not been dropped by the storage congestion metering unit 265. If the storage congestion metering unit 265 is configured to drop packets according to the drop probability, then the marking unit 268 marks the packet yellow or green since the marking unit 268 does not see any packets that are marked red since these are dropped. If the storage congestion metering unit 265 is configured not to drop, then the marking unit 268 marks the packet with any one of multiple colors, for example, with any of the three colors red, yellow, and green.

Figure 42:
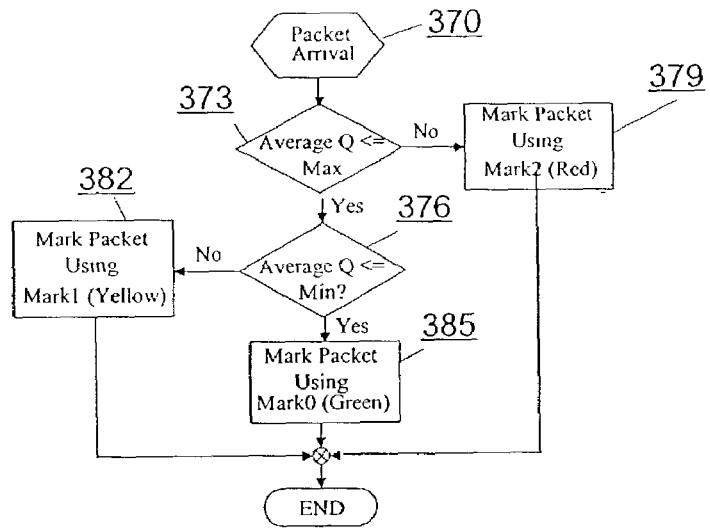
FIG. 42 shows an embodiment of a color-blind marking process using the output of the storage congestion metering unit.

FIG. 42 shows an embodiment of a color-blind marking process using the output of the storage congestion metering unit 265. In FIG. 42, the multiplexer 271 selects as its output the output of the storage congestion metering unit 265, and the color-aware or color-blind marking unit 274 operates in the color-blind mode. In step 370, the packet is received at the marking unit 268. In step 373, it is determined if the average "information segment storage unit" usage ("Average Q") of a class to which the flow of the received information element belongs is less than or equal to a maximum threshold. If the average "information segment storage unit" usage is greater than the maximum threshold, then in step 379, the packet is marked with the "mark value 2" (e.g., it is marked "red"). If the "information segment storage unit" usage is less than or equal to the maximum threshold, then in step 376, it is determined if the "information segment storage unit" usage is less than or equal to a minimum threshold. If the "information segment storage unit" usage is greater than the minimum threshold, then in step 382, it is marked with "mark value 1" (e.g., it is marked "yellow"). If the "information segment storage unit" usage is less than or equal to the minimum threshold, then in step 385, the packet is marked with "mark value 0" (e.g., it is marked "green").

Figure 43:
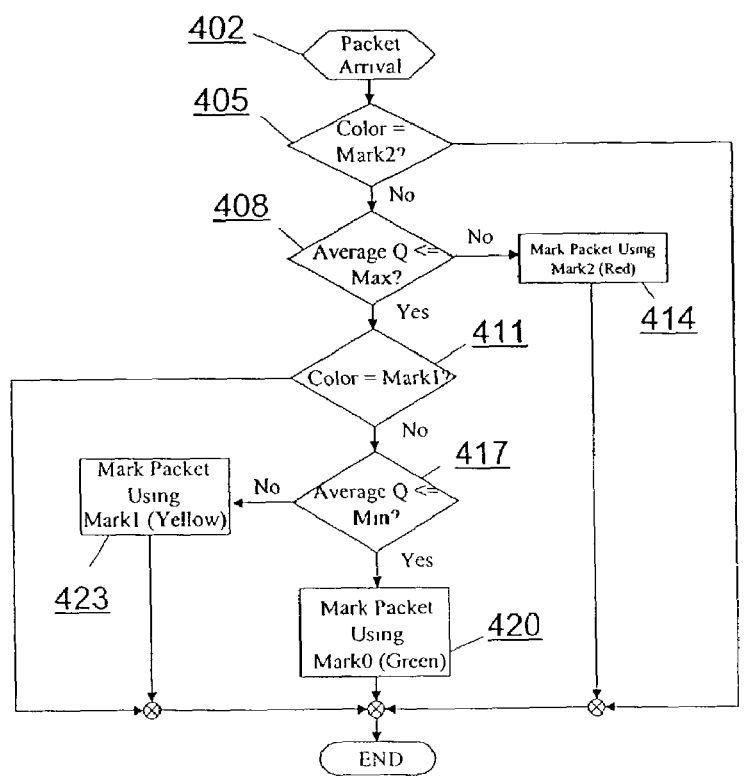
FIG. 43 shows an embodiment of a color-aware marking process using the output of the storage congestion metering unit.

FIG. 43 shows an embodiment of a color-aware marking process using the output of the storage congestion metering unit 265. In FIG. 43, the multiplexer 271 selects as its output the output of the storage congestion metering unit 265 and the color-aware or color-blind marking unit 274 operates in the color-aware mode. In step 402, the packet is received at the marking unit 268. In step 405, it is determined if the packet has been previously marked with the "mark value 2" by an upstream device. If the packet has been previously marked with the "mark value 2" by an upstream device, then this marking is maintained, i.e., the marking unit 268 does not mark as conforming packets that are already marked as nonconforming. If the packet has not been previously marked with the "mark value 2" by an upstream device, then in step 408, it is determined if the "information segment storage unit" average usage of a class of a storage unit to which the flow of the received packet belongs is less than or equal to a maximum threshold. If the "information segment storage unit" average usage is greater than the maximum threshold, then in step 414, the packet is marked with the "mark value 2" (e.g., it is marked "red"). If the "information segment storage unit" average usage is less than or equal to the maximum threshold, then in step 411, it is determined if the packet has been previously marked with the "mark value 1" by an upstream device. If the packet has been previously marked with the "mark value 1" by an upstream device, then this marking is maintained. If the packet has not been previously marked with the "mark value 1" by an upstream device, then in step 417, it is determined if the "information segment storage unit" average usage is less than or equal to a minimum threshold. If the "information segment storage unit" usage is greater than the minimum threshold, then in step 423, it is marked with "mark value 1" (e.g., it is marked "yellow"). If the "information segment storage unit" usage is less than or equal to the minimum threshold, then in step 420, the packet is marked with "mark value 0" (e.g., it is marked "green").

In a "single rate three color marking" mode, the PCU uses both the traffic metering unit 245 and the storage congestion metering unit 265 with one rate, the committed information rate ("CIR") and two different burst sizes, committed burst size ("CBS") and excess burst size ("EBS"). In this mode, both the traffic metering unit 245 and the storage congestion metering unit 265 are enabled with non-conforming packets marked rather than dropped.

In a "two rate three color marking" mode, two rates, peak information rate ("PIR") and CIR, and two burst sizes, peak burst size ("PBS") and CBS used by the traffic metering unit 245 and the storage congestion metering unit 265. The TPU is programmed to control the output rate and let the storage congestion metering unit 265 mark the packets.

The PCU uses the PCI and the PCS. The PCI and the PCS are described below:

IV. Policy Control Instruction ("PCI")

The PCI is a per-flow instruction for the Policy Control Unit. Various execution units within the PCU are enabled and disabled based on this instruction. The upper layer stack initializes all fields within the instruction when the flow is created. The Internetworking Processor ("InP") internal hardware does not modify or alter any of these fields.

| | | | | | | | | | | | |
|---|---|---|---|---|---|---|---|---|---|---|---|
| Cell Mode Policy Control Instruction | | | | | | | | | | | |
| DW0 | VALID | ING TYPE (3) | ING PPORT (4) | EG TYPE (3) | EG PPORT (4) | EPDE | PPDE | CRCD | POL MOD (2) | POP HEADER LENGTH (6) | POP HEADER OFFSET (6) |
| DW1 | | WRED DROP PRECEDENCE (8) | | NCA (4) | RSVD | L1F (3) | | | LIMIT 1 (13) RESERVED (16) | | |
| DW2 | | RESERVED (7) | | L2F (3) | | | | INCREMENT 2 (22) | | | |
| DW3 | | | | | PACKET HEADER 1 (32) PACKET HEADER 3 (32) | | | | | | |

| | | | | | | | |
|---|---|---|---|---|---|---|---|
| DW0 | PUSH HEADER LENGTH (5) | PUSH HEADER OFFSET (6) | OAC (3) | RSVD (2) | SHAPER NUMBER (11) | SHAPER OFFSET (5) MC EGRESS PPORT (4) | |
| DW1 | | INCREMENT 1 (22) | | | | LIMIT 2 (13) | |
| DW2 | | | | PACKET HEADER 0 (32) | | | |
| DW3 | | | | PACKET HEADER 2 (32) PACKET HEADER 4 (32) EGRESS ATM CELL HEADER (32) | | | |

1. Double Word 0 ("DW0")

a. VALID (1) Valid

This bit validates the PCI. This field is set after the flow is created and the various fields within the PCI are properly initialized. Software clears this bit when the flow is closed.

b. [62:60]ING TYPE (3) Ingress Type

This field specifies the input flow type. The PCU decodes and processes this field as follows:

| | |
|---|---|
| 000 | AAL5 cell-data plane. The PCU stores cells in the Payload Buffer and forwards them to the FPU according to egress type. The PCU also detects in-band F5 OAM cells and forwards them to HIF as defined in the OAM Cell Action field. |
| 001 | AAL5 cell-control plane. The PCU reassembles cells and stores them in the Inter-processor Buffer for external CPU processing. The PCU detects F4 OAM cells and forwards them to HIF as defined in the OAM Cell Action field. |
| 010 | Packet-data plane. The PCU stores packets in the Payload Buffer and forwards them to the FPU according to egress type. |

-continued

| | |
|---|---|
| 011 | Packet-data plane with protocol type look up for in-band control. The PCU stores packets in the Payload Buffer and forwards them to the FPU according to egress type. The PCU also checks for in-band control packets using the protocol type field and stores them in the Inter-processor Buffer through the HIF. |
| 100 | Packet-control plane using the Inter-processor Buffer. The PCU stores the packet in the Inter-processor Buffer through the HIF and sends a command along with the packet to the CPU command ring in the Inter-processor Buffer. |
| 101 | Packet-control plane using the Payload Buffer. The PCU stores the packet in the Payload Buffer and sends the command only to the CPU command ring in the Inter-processor Buffer. |
| 110 | Filter. Drop packet and count. |
| 111 | Filter and send 64-byte header to CPU. Drop packet, count, and send 64 bytes of packet header to the Inter-processor Buffer through HIF. | c. [59:56]ING PPORT (4) Ingress Physical Port

This field specifies the ingress physical port number of the flow. An incoming cell's port number is compared against the value in this field. If the comparison is a match, the cell is forwarded; otherwise, the cell is dropped.

d. [55:53] EG TYPE (3) Egress Type

This field specifies the egress payload type. The PCU decodes this field as follows:

| | |
|---|---|
| 000 | Per-flow store and forward cell mode. |
| 001 | Per-flow cut through cell mode. |
| 010 | Per-flow store and forward packet mode. |
| 011 | Reserved. |
| 100 | Per-physical-port store and forward cell mode. |
| 101 | Per-physical-port cut through cell mode. |
| 110 | Reserved. |
| 111 | Reserved. | e. [52:49] EG PPORT (4) Egress Physical Port

This field contains the egress physical port number for this flow. The PCU checks the port number field against the Physical Port Fail register and discards traffic that addresses a failed physical port.

f. [48] EPDE (1) Early Packet Discard Enable

If this bit is set, the Early Packet Discard feature is enabled for this flow. When a start-of-packet cell arrives, the decision to either accept or discard the packet is made. If the InP cannot accept this cell for some reason, it will wait for the EOP cell and then send the buffer to the Packet Ready Queue (PRQ) for buffer recycling.

g. [47] PPDE (1) Partial Packet Discard Enable

If this bit is set, the Partial Packet Discard feature is enabled for this flow. When a cell within a packet is discarded for some reason-non-conformance, error, etc.—all the subsequent cells belonging to this flow will be discarded. When the EOP cell arrives, the partial packet is passed on to the PRQ for buffer recycling.

h. [46] CRCD (1) CRC Discard

If this bit is set, the cell is discarded if there is a CRC error.

i. [45:44] POL MOD (2) Policing Mode

This field indicates the Policing Mode of the dual policer. It is defined as follows:

| | |
|---|---|
| 00 | No policing. |
| 01 | Policer 1 is enabled. |
| 10 | Policers 1 & 2 are enabled. |
| 11 | Reserved. | j. [43:38] POP HEADER LENGTH (6) Pop Packet Header Length

Valid for C-P mode only: This field contains the number of bytes that the PCU will strip off. This length is counted from the POP HEADER OFFSET byte.

k. [37:32] POP HEADER OFFSET (6) Pop Packet Header Offset

Valid for C-P mode only: This field contains the byte offset from which the packet header is popped. The number of bytes to be popped is defined in the POP HEADER LENGTH field.

l. [31:27]PUSH HEADER LENGTH (5) Push Packet Header Length

Valid for C-P mode only: This field contains the number of bytes that the PCU will encapsulate in the packet before it is sent to the FPU for forwarding. The FPU can add more encapsulation. The PCU inserts the packet header into the packet at the offset location specified in the PUSH HEADER OFFSET field.

m. [26:21] PUSH HEADER OFFSET (6) Push Packet Header Offset

Valid for C-P mode only: This field contains the byte offset at which the InP pushes the packet header onto the packet before it is transmitted. The number of bytes to be pushed is specified in the PUSH HEADER LENGTH field.

n. [20:18]OAC (3) OAM Cell Action

Valid for OAM cells only: This field indicates the action to be taken if the incoming cell is detected as an Operation, Administration and Maintenance ("OAM") cell. This field is decoded as follows:

| | |
|---|---|
| 000 | Pass segment and end to end OAM cells to external CPU. |
| 001 | Pass segment OAM cells to external CPU and queue end to end OAM cells to R2. |
| 010 | Queue segment OAM cells to R2 and pass end to end OAM cells to external CPU. |
| 011 | Queue segment and end to end OAM cells to R2. |
| 100 | Reserved. |
| 101 | Reserved. |
| 110 | Reserved. |
| 111 | Drop all OAM cells. |

The Ingress Type field determines whether the OAM cell is a F4 OAM or a F5 OAM:

Ingress OAM Type

Type

000 F5.

001 F4.

o. [17:16] RSVD (2) Reserved

This field is reserved.

p. [15:5] SHAPER NUMBER (11) Traffic Shaper Number

Valid for C-P mode and for C-C mode when traffic is not UBR: This field specifies the shaper number that the flow is queued to within the TPU while waiting to be scheduled. This, combined with the Shaper Offset field, is passed to the Packet Ready Queue PRQ for the Egress Queuing Unit (EQU) to know exactly which active bit to set in the Active Bit Map.

q. [4] MC (1) Multicast

Valid only if the operating mode is C-C and the traffic type is UBR: A 1 in this field indicates that this is a Multicast flow. It tells the EQU to link the UBR packet to the Multicast link list.

r. [3:0] EGRESS PPORT (4) Egress Physical Port

Valid only if the operating mode is C-C and the traffic type is UBR: This field specifies the egress physical port. This allows the EQU to know to which UBR packet link list to link the packet. There are 17 UBR link lists, one for each physical port and one for the Multicast.

s. [4:0] SHAPER OFFSET (5) Traffic Shaper Offset

Valid for C-P mode and for C-C mode when traffic is not UBR: This field indicates where a flow is within the traffic shaper. Each traffic shaper has up to 32 flows attached to it via a table and this field identifies where the flow is within this table.

2. Double Word 1 ("DW1")

a. [63:56] WRED DROP PRECEDENCE (8) WRED IP Drop Precedence

This field contains one of a possible 256 WRED IP Drop Precedence value. Each precedence value uses different parameters to determine whether to accept or discard the cell.

b. [55:52] NCA (4) Non-conformance Action

This field specifies the action taken for a non-conformance cell. Policer-1 follows the leaky bucket algorithm. Policer-2 can be used as another policer in the dual leaky bucket algorithm for VBR traffic. This field is decoded as follows.

| | |
|---|---|
| 0000 | Drop all non-conformance (NC) cells. |
| 0001 | CLP Tag NC cell for Policer-1 and drop NC cell for Policer-2. |
| 0010 | CLP Tag NC cell for Policer-2 and drop NC cell for Policer-1. |
| 0011 | CLP Tag all NC cells. |
| 0100 | Forward cell for Policer-1 and CLP tag for Policer-2. |
| 0101 | Forward cell for policer-2 and CLP tag for Policer-1. |
| 0110 | Forward all NC cells. |
| 0111 | Drop NC cells for Policer-1 and pass for Policer-2. |
| 1000–1111 | Reserved. | c. [51] RSVD (1) Reserved

This field is reserved.

d. [50:48]L1F (3) Limit-1 Factor

Policer-1 uses this field as the scale factor for the limit-1 value when applying the leaky bucket algorithm. It multiplies the limit-1 value by the L1F value within this field to determine the limit-1 parameter used during the policing function. This field is decoded as follows:

| | |
|---|---|
| 000 | 1. |
| 001 | 2. |
| 010 | 4. |
| 011 | 8. |
| 100 | 16. |
| 101 | 32. |
| 110 | 64. |
| 111 | Reserved. | e. [47:32] RSVD (16) Reserved–Policing Mode=00

When Policing Mode=00 (no policing), this field is reserved.

f. [31:0] PACKET HEADER 0 (32) Packet Header 0

Valid only when the Policing Mode=00 and C-P mode: This field contains part of the packet header that can be inserted into the outgoing packet. The packet header insertion is only valid when Egress Type is packet, since there is no header manipulation in C-C mode.

g. [47:35] LIMIT-1 (13) Limit-1

Valid only when the Policer-1 function is enabled: This field is essentially the cell delay variation tolerance (CDVT). Policer-1 uses this field to determine the conformance status of a cell. Policer-1 multiplies this value by the limit-1 factor field prior to using the value in the leaky bucket algorithm.

h. [34:13]INCREMENT-1 (22) Increment-1

Valid only when Policer-1 function is enabled: This field contains the increment value used by Policer-1. This field is essentially the PCR parameter. The policer-1 uses this value as the increment of the token bucket in the leaky bucket algorithm. Using 22 bits yields roughly 17 Kbps granularity.

i. [12:0] LIMIT-2 (13) Limit-2

Valid only when Policer-2 function is enabled: This field is the CDVT and the burst tolerance (BT) parameter for VBR. Policer-2 uses this field to determine the conformance status of a cell. Policer-2 multiplies this value by the limit-2 factor field prior to using the value in the leaky bucket algorithm.

3. Double Word 2 a. [63:32] PACKET HEADER 1 (32) Packet Header 1

Valid only for C-P mode and Policing Mode=0: This field contains part of the packet header that can be inserted into the outgoing packet.

b. [63:57] RSVD (7) Reserved

This field is reserved.

c. [56:54] L2F (3) Limit-2 Factor

Valid only when Policing Mode=10: Policer-2 uses this field as the scale factor for the limit-2 value when applying the leaky bucket algorithm. It multiplies the limit-2 value by the L2F factor value to determine the limit-2 parameter used during the policing function. This field is decoded as follows:

| | |
|---|---|
| 000 | 1. |
| 001 | 2. |
| 010 | 4. |
| 011 | 8. |
| 100 | 16. |
| 101 | 32. |
| 110 | 64. |
| 111 | Reserved. | d. [53:32]INCREMENT 2 (22) Increment-2

Valid only when Policing Mode=10: This field contains the increment value used by policer-2. This field is essentially the SCR parameter. Policer-2 uses this value to increment the token bucket in the leaky bucket algorithm. This 22-bit field provides roughly 17 Kbps granularity.

e. [31:0] PACKET HEADER 2 (32) Packet Header 2

Valid only for C-P mode: This field contains part of the packet header that can be inserted into the outgoing packet.

4. Double Word 3 a. [63:32] PACKET HEADER 3 (32) Packet Header 3

Valid in C-P mode only: This field contains part of the packet header that can be inserted into the outgoing packet.

b. [31:0] EGRESS ATM CELL HEADER (32) Egress ATM Cell Header

Valid in C-C mode, ATM traffic: This field is the header of the ATM cell that will be transmitted out. This field is stored within the cell buffer header for the FPU to send out.

c. [31:0] PACKET HEADER 4 (32) Packet Header 4

Valid in C-P mode only: This field contains part of the packet header that can be inserted into the outgoing packet.

The Policy Control State is a per-flow state for the Policy Control Unit. Various execution units within the PCU use this to keep the current state of the flow in order to process multiple active flows simultaneously. Upper layer stack initializes all fields within the state when the flow is created and does not alter them afterwards. The PCU maintains and controls these fields during normal operation.

to locate the end of the link. This field is also used in the buffer header of the EOP buffer of a UBR packet. Since UBR uses per-port packet queuing, the next packet in the link uses a different buffer pointer. The buffer header of the EOP buffer contains the next buffer of the next packet's Channel Sequence Number. The FPU uses this to find the Channel ID to access the payload.

g. [58:57]WRED ST (2) WRED State

This field maintains the WRED state. The upper layer stack initializes this field to "0" when the flow is created and does not alter it during flow processing. The WRED algorithm controls this field after its initialization. It is decoded as follows:

| | | | | | | | | | | | | | | | |
|---|---|---|---|---|---|---|---|---|---|---|---|---|---|---|---|
| Cell Mode Policy Control State | | | | | | | | | | | | | | | |
| DW0 | NEW | EOP | EPD | PPD | RSVD | FCSN (2) WRED ST (2) | RSVD | LCID (2) | CELL COUNT (22) | RSVD (4) | PCO (4) | RSVD | FCID (2) | RSVD<br><br>RSVD (4) | CURRENT/ LAST BUFFER POINTER (20)<br>CPU BUFFER ADDRESS (16) |
| DW1 | | | PARTIAL CRC-32 (32) | | | | | | | | BUFFER COUNT (11) | | | RSVD | FIRST BUFFER POINTER (20) |
| DW2 | NON-CONF CELL COUNT 2 (16) | | | | | NON-CONF CELL COUNT 1 (16) | | | | POL2D | POI1D | CIPT | OCI | LAST CONFORMANCE TIME (28) | |
| DW3 | TOKEN BUCKET 2 (22) | | | | | | | | TOKEN BUCKET 1 (22) | | | | | RSVD (20) | |

1. Double Word 0 a. [63] NEW (1) New

This bit identifies a new flow. The upper layer stack sets this bit when the flow is created. When the PCU detects this bit set, it requests two buffer pointers. It then clears this bit. The PCU controls this bit during operation.

b. [62] EOP (1) End of Packet

This bit identifies the incoming cell as an EOP cell. The PCU uses this field to delineate packet boundaries for packet processing.

c. [61] EPD (1) Early Packet Discard

This bit indicates that the packet's first cell was discarded due to any of the discard conditions discussed in the Cell Discard section. The entire packet is discarded until the EOP cell arrives. A counter is kept for this kind of discard for statistics purposes.

d. [60] PPD (1) Partial Packet Discard

This bit is set when cells of the current packet have been discarded and the packet is subject to partial packet discard. The remainder of the packet is discarded until the EOP cell arrives, at which time it is passed on to the FPU for buffer recycling. A counter is kept for this kind of discard for statistics purposes.

e. [59] RSVD (1) Reserved

This field is reserved.

f. [58:57]FCSN (2) First Channel Sequence Number

Valid for UBR traffic only: This field contains the Channel Sequence Number of the current buffer pointer. It is used when the egress traffic type is UBR. This field is used by the FPU to pre-fetch the payload when necessary. It is passed in the PRQ to the FPU, which keeps it in the per-port link state. The FPU uses this field along with the Last Buffer Pointer

| | |
|---|---|
| 00 | Accept First. |
| 01 | Accept Cell. |
| 10 | Discard Next. |
| 11 | Discard Cell. | h. [56] RSVD (1) Reserved

This field is reserved.

i. [55:54]LCID (2) Last Channel ID

This field indicates the channel ID of the previous buffer. This is used along with the Current/Last Buffer Pointer field to update the valid size of the previous payload buffer header when the actual end of payload data is not in the EOP cell in the C-P mode.

j. [53:32]CELL COUNT (22) Cell Count

This field contains the cell count of the flow. The PCU increments this field by one for each cell that arrives and is accepted. Discarded cells (due to CRC, EPD, WRED, etc.) are not counted in this field. When the cell count rolls over, the PCU notifies external intelligence through the statistic command. After reporting, the PCU continues incrementing the cell count field, which will restart from zero. At 44 ns per cell slot time, the counter rolls over every 184 ms.

k. [31:28] RSVD (4) Reserved

This field is reserved.

l. [27:24]PCO (4) Payload Channel Occupancy

This field indicates which Payload Buffer (DDR SDRAM) channels are currently used. If a channel is used, its corresponding bit is set. This method of saving the buffer pool bitmap uses the same buffer address (bit in the bitmap) across all channels. If all channels are in use, a new buffer pointer is fetched.

m. [23] RSVD (1) Reserved

This field is reserved.

n. [22:21]FCID (2) First Buffer Channel ID

This field contains the payload channel ID of the first buffer of the current packet. The PCU uses this field along with the First Buffer Pointer to update the packet header when the packet is to be discarded. The packet discard information is written in the packet header to signal the FPU to recycle all the buffers belonging to this packet.

o. [20] RSVD (1) Reserved

This field is reserved.

p. [19:16]RSVD (4) Reserved

This field is reserved.

q. [15:0] CPU BUFFER ADDRESS (16) CPU Buffer Address

Valid only for Ingress Type=001: This field contains the buffer address of the control payload that is passed to the CPU for processing. This is a byte-address such that it can have headroom (offset) allocated for CPU processing. The headroom offset is defined globally since there is only one global CPU for each InP. Each time a cell is received, this address is incremented by 48 bytes. At EOP, the 256-byte aligned buffer address is reported to the CPU through the CPU ring.

r. [19:0] CURRENT/LAST BUF POINTER (20) Current/Last Buffer Pointer

Valid only for Ingress Type=000: This field contains the current buffer pointer. When a cell arrives, the buffer pointer addresses the buffer in which to store the new cell. It always points to one of the four Payload Memory (DDR SDRAM) channels. If the New bit is set when the cell arrives, the address in this field is not valid, and the PCU requests a buffer pointer to be loaded into this field. When the buffer pointer is valid, it can be used for four actual buffers, one per Payload Memory channel. When the last of the four buffers is used, the PCU requests another buffer pointer and keeps it in this field. This new buffer is also written to the previous buffer's buffer header to build the packet link list.

2. Double Word 1 a. [63:32] PARTIAL CRC-32 (32) Partial CRC-32

This field contains the partial CRC-32 of an AAL5 PDU. Since the CRC-32 is calculated over the entire AAL5 PDU, a partial value is accumulated as each cell arrives. The partial value is stored in this field. When the last cell of a packet arrives, the final CRC-32 is computed and compared against the actual CRC-32 value that is contained within the last cell of the packet. If the CRC-32 values match, the packet is ready for further processing, such as shaping and forwarding. If the PCU detects a CRC-32 error, the PCU may discard the packet, depending on the CRCD bit within the PCI. This field is initialized to 0xFFFF_FFFF when the flow is created.

b. [31:21]BUFFER COUNT (11) Buffer Count

This field contains a count of the number of buffers used by the current packet. Each time a buffer is used, this field is incremented by one. If the packet is to be discarded, this buffer count is updated to the packet header when the EOP cell arrives to enable the FPU to recycle the buffers.

c. [20] RSVD (1) Reserved

This field is reserved.

d. [19:0] FIRST BUFFER POINTER (20) First Buffer Pointer

This field contains the pointer to the first buffer of the current packet. The PCU uses this field along with the First Buffer Channel ID to update the packet header when the packet is to be discarded. The packet discard information is written in the packet header so that the FPU can know to recycle all the buffers belonging to this packet.

3. Double Word 2

Valid only when Policing Mode 1=00 a. [63:48]NON-CONF CELL COUNT 2 (16) Non-Conformance

Cell Count 2

This field contains the count of the number of non-conforming cells going through policer-2. Policer-2 increments this field for each non-conformance to UPC one. When the count reaches 64K, the PCU reports this condition to the internal CPU through a statistic report command and resets the value to zero.

b. [47:32]NON-CONF CELL COUNT 1 (16) Non-Conformance

Cell Count 1

This field contains the count of the number of non-conforming cells going through policer-1. Policer-1 increments this field for each non-conformance to UPC one. When the count reaches 64K, the PCU reports this condition to the internal CPU through a statistic report command and resets the value to zero.

c. [31] POL2D (1) Policer-2 Discard

This bit indicates that at least one incoming cell was discarded because it failed policer-2 conformance tests. If the Partial Packet Discard feature is enabled, then this packet is subjected to partial packet discard. A counter keeps statistics for this type of discard.

d. [30] POL1D (1) Policer-1 Discard

This bit indicates that at least one incoming cell was discarded because it failed Policer-1 conformance tests. If the Partial Packet Discard feature is enabled, then this packet is subjected to partial packet discard. A counter keeps statistics for this type of discard.

e. [29] CLPT (1) Cell Loss Priority (CLP) Tagged

This bit indicates that at least one cell within a packet is CLP tagged. The PCU sets this bit when the CLP bit within the incoming cell is set. This bit is cleared when the entire packet is reassembled.

f. [28] OCI (1) One Congestion Indication

This bit indicates that at least one of the incoming cells of this packet has a congestion (EFCI) notification tagged. The PCU sets this bit when the cell arrives with congestion notification. This bit is cleared when the entire packet is reassembled.

g. [27:0] LAST CONFORMANCE TIME (28) Last Conformance Time

This field contains the Last Conformance Time of a cell. When a cell is accepted, this field is updated with the time stamp of the cell. The policer uses this field to calculate the time unit between the last conformance cell and the current cell. The difference is the amount of token that was drained since the last accepted cell.

4. Double Word 3

Valid only when Policing Mode 1=00 a. [63:42] TOKEN BUCKET 2 (22) Token Bucket 2

This field contains the policer-2 token bucket. Policer-2 keeps track of the fill level of this bucket and does not allow the bucket to be filled when the bucket is over the fill level. The drain rate is a token per unit of time (system clock). The fill rate is the allowed rate. If a cell arrives when the bucket is at its limit, the cell is considered non-conforming.

b. [41:20] TOKEN BUCKET 1 (22) Token Bucket 1

This field contains the policer-1 token bucket. Policer-1 keeps track of the fill level of this bucket and does not allow the bucket to be filled when the bucket is over the fill level. The drain rate is a token per unit of time (system clock). The fill rate is the allowed rate. If a cell arrives when the bucket is at its limit, the cell is considered non-conforming.

c. [19:0] RSVD (20) Reserved

This field is reserved

While the present invention has been particularly described with respect to the illustrated embodiments, it will be appreciated that various alterations, modifications and adaptations may be based on the present disclosure, and are intended to be within the scope of the present invention. While the invention has been described in connection with what are presently considered to be the most practical and preferred embodiments, it is to be understood that the present invention is not limited to the disclosed embodiment but, on the contrary, is intended to cover various modifications and equivalent arrangements included within the scope of the claims.

What is claimed is:

1. A method for processing an incoming information element belonging to a flow, the incoming information element comprising at least one information element segment, the method comprising:
   receiving a particular one of the at least one information element segment;
   stacking the particular one of the at least one information element segment so that a plurality of bits of the particular one of the at least one information element segment are parallel to each other in a vertical direction;
   fetching a plurality of instructions corresponding to the flow to which the incoming information element belongs;
   fetching a plurality of registers corresponding to the flow to provide adequate memory space to execute the plurality of instructions without performing a context switch; and
   executing the plurality of instructions to perform a function on the particular one of the at least one information element segment.

2. The method of claim 1 further comprising dividing the incoming information element into the at least one information element segment.

3. The method of claim 2, wherein the stacking comprises upon receiving the particular one of the at least one information element segment, stacking the particular one of the at least one information element segment so that the plurality of bits of the particular one of the at least one information element segment are parallel to each other in the vertical direction.

4. The method of claim 1, wherein the fetching of the plurality of instructions and the fetching of the plurality of registers are triggered upon production of a stacked one of the at least one information element segment.

5. The method of claim 1, wherein the fetching of the plurality of instructions comprises fetching the plurality of instructions in one memory access.

6. The method of claim 1 further comprising, if the plurality of registers is modified when executing the plurality of instructions, then storing a modified plurality of instructions within a policy control state ("PCS") memory.

7. The method of claim 1, wherein the function comprises a complex function, wherein the complex function includes:
   determining a number of fixed-size buffers to store the particular one of the at least one information element segment, and
   adding the number of fixed-size buffers to a chain of at least one fixed-size buffer where the chain corresponds to the flow and each of the at least one fixed-size buffer are linked together.

8. The method of claim 1, wherein the function comprises a complex function, wherein the complex function includes updating a count of rollovers of a timer for the flow in order to accurately time stamp the incoming information element, wherein the updating process includes:
   determining if the incoming information element conforms to a burst tolerance;
   resetting a count of timer rollovers to zero if the information element conforms to the burst tolerance; and
   incrementing by one the count of timer rollovers upon an occurrence of the timer rollover if the count of timer rollovers is less than $(2^N-1)$, where N is the number of bits that represent the number of timer rollovers.

9. The method of claim 7, wherein the fixed-size buffer is 64-bytes in length.

10. The method of claim 7, wherein the fixed-size buffer is 128-bytes in length.

11. The method of claim 1, wherein the function comprises a complex function, wherein the complex function includes converting a first protocol of the incoming information element having a first length to a second protocol, wherein the conversion process includes:
   stripping-off a first number of bytes specified by a policy control instruction ("PCI") from the incoming information element starting at a first offset specified by the PCI to remove the first protocol of the information element and produce a stripped-off information element; and
   inserting an encapsulated data that includes the second protocol to the stripped-off information element starting at a second offset specified by the PCI to produce an encapsulated information element.

12. The method of claim 1, wherein the function comprises a complex function, wherein the complex function includes maintaining an activity-level of the flows, wherein the maintaining process includes:
   upon receiving the information element belonging to the flow, setting a first one of a plurality of bits in a recently-used bitmap that corresponds to the flow to indicate activity; and
   upon an external processor polling the activity-level of the flow, resetting the first one of the plurality of bits corresponding to the flow to indicate no activity.

13. The method of claim 1 further comprising, if the incoming information element is a cell, storing the particular one of the at least one information element segment within a data portion of a first one of an at least one fixed-size buffer.

14. The method of claim 1 further comprising, if the incoming information element is a packet, then:
   determining if an earlier-arriving information element that has the same priority and arrived at the same input logical port produced a remainder data that did not fit into an earlier-filled one of an the-at least one fixed-size buffer;
   rotating backward the particular one of the at least one information element segment to produce at least one of:
   a matching segment portion that combined with any remainder data fills as much as possible a particular one of the least one fixed-size buffer and
   a remainder segment portion that includes any excess data that could not fit into the particular one of the at least one fixed-size buffer after combining any remainder data with the particular one of the at least one information element segment; and mixing any remainder data with the matching segment portion to produce a fixed-size buffer.

15. The method of claim 1 further comprising, if the flow to which the incoming information element belongs is in an unassigned bit rate ("UBR") mode, then:

determining if any one of at least one fixed-size buffer in which the incoming information element is stored is an end-of-packet ("EOP") buffer;

storing the particular one of the at least one fixed-size buffer that is the EOP buffer in an entry of a deferred buffer that corresponds to an output port to which the information element is destined; and storing each of the at least one fixed-size buffer that is not the EOP buffer in an output port based chain for the output port to which the information element is destined, the output port based chain includes at least one buffer and each of the at least one buffer are connected together.

16. The method of claim 1, wherein the plurality of instructions comprises a very long instruction.

17. The method of claim 16, wherein the very long instruction includes a plurality of bits, each of the plurality bits are parallel to each other.

18. The method of claim 17, wherein the very long instruction is 256-bits in length.

19. The method of claim 1, wherein a rotated particular one of the at least one information element segment is 512-bits in length.

20. The method of claim 1 wherein the plurality of instructions comprises a very long instruction that is composed of multiple smaller sets of basic instructions.

21. The method of claim 1 wherein the plurality of instructions is executed simultaneously.

22. The method of claim 1 wherein executing the plurality of instructions comprises executing the plurality of instructions while the plurality of bits of the particular one of the at least one information element segment are parallel to each other in a vertical direction.

23. A data pipelined processor to process an incoming information element belonging to a flow, comprising:

a program counter ("PCNT") stage to receive a particular one of at least one segment of the incoming information element and upon receiving the particular one of the at least one segment, to parallelize the particular one of the at least one segment of the incoming information element so that a plurality of bits of the particular one of the at least one segment are parallel to each other in a vertical direction;

an instruction and register fetch ("IRF") stage to fetch a plurality of instructions corresponding to the flow to which the incoming information element belongs and to fetch a plurality of registers corresponding to the flow to provide adequate memory space to execute the plurality of instructions without performing a context switch; and an execution ("EXE") stage, coupled to the IRF stage, to execute the plurality of instructions to perform a function on the parallelized particular one of the at least one information element segment.

24. The data pipelined processor of claim 23, wherein the PCNT stage is 512-bits wide.

25. The data pipelined processor of claim 23, wherein the IRF stage is 512-bits wide.

26. The data pipelined processor of claim 23, wherein the EXE stage is 512-bits wide.

27. The data pipelined processor of claim 23, wherein the plurality of instructions comprises a very long instruction.

28. The data pipelined processor of claim 27, wherein the very long instruction includes a plurality of bits, each of the plurality bits are parallel to each other.

29. The data pipelined processor of claim 23, wherein the parallelized particular one of the at least one segment is 512-bits in length.

30. The data pipelined processor of claim 23, wherein the PCNT stage combines a plurality of first subsegments to produce the particular one of the at least one segment of the incoming information element.

31. The data pipelined processor of claim 30, wherein the plurality of first subsegments, upon arrival at the PCNT stage, are immediately combined by the PCNT stage to produce the particular one of the at least one segment of the incoming information element.

32. The data pipelined processor of claim 31 further comprising an input/output unit, coupled to the PCNT stage, to combine a plurality of second subsegments to produce the plurality of first subsegments, and also to parallelize each of the plurality of first subsegments.

33. The data pipelined processor of claim 32 further comprising a framer, coupled to the input/output unit, to combine a plurality of serial bits of the incoming information element to produce the plurality of second subsegments, and to parallelize each of the plurality of second subsegments.

34. The data pipelined processor of claim 23, wherein the EXE stage includes a link management unit to determine a number of fixed-size buffers needed to store the particular one of the at least one information element segment, and to add the number of fixed-size buffers to a chain of at least one fixed-size buffer where the chain corresponds to the flow and each of the at least one fixed-size buffer are linked together.

35. The data pipelined processor of claim 23, wherein the EXE stage includes a policer unit to update a count of rollovers of a timer for the flow in order to accurately time stamp the incoming information element belonging to the flow, the policer unit comprising:

the timer for the flow;

a time stamp rollover recovery state table that includes at least one entry, a particular one of the at least one entry includes a rollover count of the timer;

a policing unit to determine if the incoming information element conforms to a burst tolerance, and if the incoming information element conforms to the burst tolerance, to reset the rollover count to zero;

a mixer, coupled to the time stamp rollover recovery state table, that if the rollover count is reset to zero by the policing unit, to modify the particular one of the at least one entry to include the rollover reset to zero and to write the modified particular one of the at least one entry into the time stamp rollover recovery state table; and a time stamp rollover recovery circuit that:

increments by one the rollover count within the particular one of the at least one entry if the timer for the flow rolls over and if the rollover count is less than $(2^N-1)$, where N is the number of bits used to implement the rollover count, and writes the particular one of the at least one entry to the time stamp rollover recovery state table.

36. The data pipelined processor of claim 23 wherein the EXE stage includes a protocol translator unit to convert a first protocol of the incoming information element having a first length to a second protocol, the protocol translator unit comprising:
a first rotator to rotate forward the incoming information element by a first number of bytes specified by a policy control instruction ("PCI") to produce a rotated information element;
a first mixer to combine the rotated information element with the incoming information element to strip-off the first protocol from the incoming information element by removing the first number of bytes starting at a first offset to produce a stripped-off information element;
a second rotator to rotate backward the stripped-off information element by a second number of bytes specified by the PCI to produce a second rotated information element; and
a second mixer to combine the incoming information element, the second rotated information element, and an encapsulated data to insert the encapsulated data in the stripped-off information element starting at a second offset specified by the PCI to produce an encapsulated information element.

37. The data pipelined processor of claim 23, wherein the function comprises a complex function.

38. The data pipelined processor of claim 23 wherein the IRF stage is further configured to fetch the plurality of instructions and the plurality of registers upon production of the parallelized particular one of the at least one information element segment.

39. The data pipelined processor of claim 23 wherein the IRF stage is further configured to fetch the plurality of instructions in one memory access.

40. The data pipelined processor of claim 39 wherein the plurality of instructions comprises a very long instruction.

41. The data pipelined processor of claim 23 wherein the plurality of instructions comprises a very long instruction that is composed of multiple smaller sets of basic instructions.

42. A method for updating a count of rollovers of a timer for a flow in order to accurately time stamp an incoming information element belonging to the flow, comprising:
determining if the incoming information element conforms to a burst tolerance;
resetting a count of timer rollovers to zero if the information element conforms to the burst tolerance; and
incrementing by one the count of timer rollovers upon an occurrence of the timer rollover if the count of timer rollovers is less than $(2^N-1)$, where N is the number of bits that represent the number of timer rollovers.

43. The method of claim 42 further comprising if the count of timer rollovers is at least one of: (1) greater than $(2^N-1)$, where N is the number of bits that represent the number of timer rollovers and (2) equal to $(2^N-1)$, where N is the number of bits that represent the number of timer rollovers, then setting the count of timer rollovers to a "don't care" value.

44. The method of claim 42, wherein the count of timer rollovers is represented using two bits.

45. A system for updating a count of rollovers of a timer for a flow in order to accurately time stamp an incoming information element belonging to the flow, comprising:
the timer for the flow;
a time stamp rollover recovery state table that includes at least one entry, a particular one of the at least one entry includes a rollover count of the timer;
a policing unit to determine if the incoming information element conforms to a burst tolerance, and if the incoming information element conforms to the burst tolerance, to reset the rollover count to zero;
a mixer, coupled to the time stamp rollover recovery state table, if the rollover count is reset to zero by the policing unit, to modify the particular one of the at least one entry to include the rollover reset to zero and to write the modified particular one of the at least one entry into the time stamp rollover recovery state table; and
a time stamp rollover recovery circuit that
increments by one the rollover count within the particular one of the at least one entry if the timer for the flow rolls over and if the rollover count is less than $(2^N-1)$, where N is the number of bits used to implement the rollover count, and
writes the particular one of the at least one entry to the time stamp rollover recovery state table.

46. The system of claim 45, wherein the time stamp rollover recovery circuit writes an the-updated rollover count to the particular one of the at least one entry in the time stamp rollover recovery state table at intervals of $((2^N-1)$, where N is the number of bits used to implement the timer/the number of the at least one entry in the time stamp rollover recovery state table).

47. The system of claim 45, wherein the at least one entry within the time stamp rollover recovery state table equals 2K (2 kilobytes) entries within the time stamp rollover recovery state table.

48. The system of claim 45, wherein the rollover count of the timer is represented using two bits.

49. The system of claim 45, wherein the particular one of the at least one entry is represented using 32-bits.

50. For a port, a method to create a chain associated with the port, the chain includes a plurality of information segment storage units belonging to at least one flow that is an unassigned bit rate ("UBR") flow and assigned to the port, comprising:
receiving an end-of-packet ("EOP") segment of at least one segment of a first information element belonging to a particular one of the at least one flow;
removing from a deferred storage unit an EOP segment of at least one segment of a second information element belonging to a specific one of the at least one flow; and
if the EOP segment of the at least one segment of the first information element is not a start-of-packet ("SOP"), then:
storing the EOP segment of the second information element to a first one of the plurality of information segment storage units;
storing an SOP segment of the at least one segment of the first information element to a second one of the plurality of information segment storage units, and
linking the first one of the plurality of information segment storage units to the second one of the plurality of information segment storage units.

51. The method of claim 50 further comprising
storing the EOP segment of the at least one segment of the first information element to the deferred storage unit.

52. A method for storing within at least one fixed-size buffer a current one of at least one information element that all have the same input logical port number and priority, wherein each one of the at least one information element includes at least one information element segment, comprising:
(1) performing at least one of:
determining if an immediately earlier arriving one of the at least one information element segment of the current one of the at least one information element has data remaining that did not fit into an earlier-filled one of the at least one fixed-size buffer; and determining if a last one of the at least one information element segment of an immediately earlier arriving one of the at least one information element has data remaining that did not fit into an earlier-filled one of the at least one fixed-size buffer;

(2) rotating backward an incoming one of the at least one information element segment of the current one of the at least one information element to produce at least one of:

a matching segment portion that combined with any remaining data fills as much as possible a particular one of the at least one fixed-size buffer; and a remainder segment portion that includes any excess data from the combining of the remaining data and the incoming one of the at least one information element segment that could not fit into the particular one of the at least one fixed-size buffer; and (3) mixing any remaining data with the matching segment to produce a fixed-size buffer.

53. The method of claim 52 further comprising mixing the remainder segment portion with a buffer header to produce an excess data buffer.

54. The method of claim 53 further comprising storing the excess data buffer in an alignment temporary storage.

55. The method of claim 52 further comprising transmitting the fixed-size buffer to at least one of a memory and a deferred buffer.

56. The method of claim 52, wherein the fixed-size buffer has a length of 64-bytes.

57. The method of claim 52, wherein the fixed-size buffer has a length of 128-bytes.

58. A system for storing within at least one fixed-size buffer a current one of at least one information element that all have the same input logical port number and priority, wherein each one of the at least one information element includes at least one information element segment, comprising:

an alignment intermediate data fetch ("ALF") unit to do at least one of:

determine if an immediately earlier arriving one of the at least one information element segment of the current one of the at least one information element has data remaining that did not fit into an earlier-filled one of the at least one fixed-size buffer; and determine if a last one of the at least one information element segment of an immediately earlier arriving one of the at least one information element has data remaining that did not fit into an earlier-filled one of the at least one fixed-size buffer;

a rotator, coupled to the ALF unit, to rotate backward an incoming one of the at least one information element segment of the current one of the at least one information element to produce at least one of:

a matching segment portion that combined with any remaining data fills as much as possible a particular one of the at least one fixed-size buffer; and a remainder segment portion that includes any excess data from the combining of the remaining data and the incoming one of the at least one information element segment that could not fit into the particular one of the at least one fixed-size buffer; and a mixer, coupled to the rotator, to mix any remaining data with the matching segment to produce a fixed-size buffer.

59. The system of claim 58, wherein the mixer mixes the remainder segment portion with a buffer header to produce an excess data buffer.

60. The system of claim 59 further comprising an alignment temporary storage to store the excess data buffer.

61. The system of claim 58 further comprising at least one of a memory and a deferred buffer to receive the fixed-size buffer.

62. The system of claim 58, wherein the fixed-size buffer has a length of 64-bytes.

63. The system of claim 58, wherein the fixed-size buffer has a length of 128-bytes.

64. A method for processing an incoming information element belonging to a flow, the incoming information element comprising at least one information element segment, the method comprising:

receiving a particular one of the at least one information element segment;

stacking the particular one of the at least one information element segment so that a plurality of bits of the particular one of the at least one information element segment are parallel to each other in a vertical direction;

fetching a very long instruction that is composed of multiple smaller sets of basic instructions in response to the incoming information element;

fetching a plurality of registers in response to the incoming information element to provide adequate memory space to execute the very long instruction without performing a context switch; and executing the very long instruction to perform a function on the particular one of the at least one information element segment.

65. The method of claim 64 wherein the very long instruction is executed while the plurality of bits of the particular one of the at least one information element segment are parallel to each other in the vertical direction.

66. The method of claim 64 wherein the fetching a very long instruction comprises fetching the very long instruction in one memory access.

* * * * *